US010004098B2

United States Patent
Kim et al.

(10) Patent No.: US 10,004,098 B2
(45) Date of Patent: Jun. 19, 2018

(54) METHOD AND APPARATUS FOR TRANSMITTING AND RECEIVING DATA USING A PLURALITY OF CARRIERS IN MOBILE COMMUNICATION SYSTEM

(71) Applicant: Samsung Electronics Co., Ltd., Suwon-si, Gyeonggi-do (KR)

(72) Inventors: Soeng-Hun Kim, Suwon-si (KR); Gert Jan Van Lieshout, Staines (GB); Jae-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/608,736

(22) Filed: Jan. 29, 2015

(65) Prior Publication Data

US 2015/0215987 A1 Jul. 30, 2015

(30) Foreign Application Priority Data

Jan. 29, 2014 (KR) .................. 10-2014-0011775
Feb. 10, 2014 (KR) .................. 10-2014-0014890
(Continued)

(51) Int. Cl.
*H04W 76/00* (2018.01)
*H04W 36/02* (2009.01)
(Continued)

(52) U.S. Cl.
CPC .............. *H04W 76/04* (2013.01); *H04L 1/00* (2013.01); *H04L 1/18* (2013.01); *H04W 36/02* (2013.01);
(Continued)

(58) Field of Classification Search
CPC ... H04W 36/02; H04W 76/025; H04W 47/34; H04W 49/552; H04W 2012/565; H04L 47/34; H04L 49/552; H04L 2012/565
See application file for complete search history.

(56) References Cited

U.S. PATENT DOCUMENTS

2007/0258591 A1* 11/2007 Terry .................. H04L 1/187
                                                         380/247
2009/0016301 A1*  1/2009 Sammour ............ H04L 49/90
                                                         370/331
(Continued)

FOREIGN PATENT DOCUMENTS

CN        102104535 A      6/2011
WO    2013/140138 A1       9/2013

OTHER PUBLICATIONS

Author Unknown, Overall Signaling flow over S1/Xn for 3C, CATT Submission to 3GPP TSG RAN WG3 Meeting No. 82, Doc No. R3-132037, Nov. 15, 2013, pp. 1-7.*
(Continued)

*Primary Examiner* — Christopher Crutchfield
(74) *Attorney, Agent, or Firm* — Jefferson IP Law, LLP

(57) ABSTRACT

A bearer reconfiguration method performed by a User Equipment (UE) in a wireless communication system supporting a multi-bearer is provided. The bearer reconfiguration method includes, if the UE performs a bearer reconfiguration from a single bearer to the multi-bearer, reordering Packet Data Convergence Protocol (PDCP) Protocol Data Units (PDUs) received through the multi-bearer, using a timer after a completion of the bearer reconfiguration, and processing the reordered PDCP PDUs into at least one PDCP Service Data Unit (SDU). The method may also include, if the UE performs bearer reconfiguration from the multi-bearer to the single bearer, reordering PDCP PDUs received through the multi-bearer, using a timer until a
(Continued)

predetermined condition is satisfied, and processing the reordered PDCP PDUs into at least one PDCP SDU.

22 Claims, 25 Drawing Sheets

(30) Foreign Application Priority Data

| | | |
|---|---|---|
| Mar. 21, 2014 | (KR) | 10-2014-0033716 |
| Mar. 31, 2014 | (KR) | 10-2014-0038265 |
| Jun. 9, 2014 | (KR) | 10-2014-0069127 |
| Jul. 1, 2014 | (KR) | 10-2014-0082139 |
| Jul. 18, 2014 | (KR) | 10-2014-0091164 |
| Sep. 26, 2014 | (KR) | 10-2014-0129620 |

(51) Int. Cl.
*H04L 1/00* (2006.01)
*H04L 1/18* (2006.01)
*H04W 76/04* (2009.01)
*H04L 5/00* (2006.01)
*H04W 76/02* (2009.01)
*H04W 76/06* (2009.01)

(52) U.S. Cl.
CPC ......... *H04L 5/0098* (2013.01); *H04W 76/025* (2013.01); *H04W 76/064* (2013.01)

(56) References Cited

U.S. PATENT DOCUMENTS

2013/0170496 A1 7/2013 Kim et al.
2014/0362829 A1* 12/2014 Kazmi ............... H04W 36/22
370/332
2016/0183103 A1* 6/2016 Saily ................. H04W 36/02
370/216
2016/0374036 A1* 12/2016 Wang ................. H04W 76/00

OTHER PUBLICATIONS

Author Unknown, Assumptions to base reordering at PDCP, Nokia Submission to 3GPP TSG-RAN WG2 Meeting No. 84, Doc No. R2-133873, Nov. 15, 2013, pp. 1-3.*
Ericsson, PDCP reordering for split bearers, 3GPP TSG RAN WG2 #84, R2-134229, Nov. 1, 2013, San Francisco, USA.
LG Electronics, Inc., Bearer Reconfiguration with Architectures 1A and 3C, 3GPP TSG RAN WG2 #84, R2-134023, Nov. 2, 2013, San Francisco, USA.
NSN, Nokia Corporation, Assumptions to base reordering at PDCP, 3GPP TSG RAN WG2 #84, R2-133873, Nov. 1, 2013, San Francisco, USA.
Samsung, Discussion on PDCP reordering in 3C, 3GPP TSG RAN WG2 #84, R2-133860, Nov. 2, 2013, San Francisco, USA.
Samsung, Discussion on UP Protocol Stack Options in Inter-ENB Carrier Aggregation, 3GPP TSG-RAN WG2 Meeting #82, May 20-24, 2013, R2-131833, Fukuoka, Japan.
Interdigital Communications, User Plane Architecture for Dual-Connectivity, 3GPP TSG-RAN WG2 #82, May 20-24, 2013, Tdoc R2-131939, Fukuoka, Japan.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300, V12.0.0, Dec. 2013, Sophia Antipolis, France.
European Search Report dated Sep. 1, 2017, 15743327.7, issued in the European Application No. 15743327.7.
Chinese examination report dated Apr. 20, 2018, issued in the Chinese application No. 201580016867.9.

* cited by examiner

METHOD AND APPARATUS FOR TRANSMITTING AND RECEIVING DATA USING A PLURALITY OF CARRIERS IN MOBILE COMMUNICATION SYSTEM

CROSS-REFERENCE TO RELATED APPLICATION(S)

This application claims the benefit under 35 U.S.C. § 119(a) of a Korean patent application filed on Jan. 29, 2014 in the Korean Intellectual Property Office and assigned Serial number 10-2014-0011775, a Korean patent application filed on Feb. 10, 2014 in the Korean Intellectual Property Office and assigned Serial number 10-2014-0014890, a Korean patent application filed on Mar. 21, 2014 in the Korean Intellectual Property Office and assigned Serial number 10-2014-0033716, a Korean patent application filed on Mar. 31, 2014 in the Korean Intellectual Property Office and assigned Serial number 10-2014-0038265, a Korean patent application filed on Jun. 9, 2014 in the Korean Intellectual Property Office and assigned Serial number 10-2014-0069127, a Korean patent application filed on Jul. 1, 2014 in the Korean Intellectual Property Office and assigned Serial number 10-2014-0082139, a Korean patent application filed on Jul. 18, 2014 in the Korean Intellectual Property Office and assigned Serial number 10-2014-0091164, and a Korean patent application filed on Sep. 26, 2014 in the Korean Intellectual Property Office and assigned Serial number 10-2014-0129620, the entire disclosure of each of which is incorporated herein by reference.

TECHNICAL FIELD

The present disclosure relates to a method and apparatus for transmitting and receiving data using a plurality of carriers in a mobile communication system.

BACKGROUND

Mobile communication systems have been developed to provide communication services while ensuring a user's mobility. Recently, the mobile communication systems have reached a stage capable of providing not only the voice communication services but also the high-speed data communication services.

In recent years, a Long Term Evolution (LTE) system proposed by the 3rd Generation Partnership Project (3GPP) is providing its services in many countries as one of the next-generation mobile communication systems. The LTE system is technology for implementing high-speed packet-based communication having a transfer rate of about 100 Mbps.

To meet the demand for wireless data traffic having increased since deployment of 4G (4th-Generation) communication systems such as the LTE system, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, the commercialization of an LTE-Advanced (LTE-A) communication system that has improved its transfer rate by combining a variety of new technologies for the LTE communication system is underway. The most typical one of the technologies to be newly introduced may include Carrier Aggregation (CA). The term 'carrier aggregation' as used herein may refer to technology in which one terminal or User Equipment (UE) uses a plurality of forward carriers and a plurality of reverse carriers in transmitting and receiving data, unlike the technology according to the related art in which a UE transmits and receives data using one forward carrier and one reverse carrier.

Currently, however, only the intra-Evolved Node B (ENB) CA is defined in LTE-A. This may result in reducing the applicability of the CA function, thus causing the possible problems that macro cells and pico cells cannot be aggregated especially in a scenario where a plurality of pico cells and one macro cell are operated in an overlapping manner. The pico cell may be referred to as another term such as 'micro cell', 'small cell' or the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently transmitting and receiving data using a plurality of carriers in a mobile communication system.

Another aspect of the present disclosure is to provide a method and apparatus for inter-Evolved Node B (ENB) carrier aggregation (CA).

Another aspect of the present disclosure is to provide a method and apparatus for Packet Data Convergence Protocol (PDCP) operation switching in a mobile communication system supporting multi-bearer.

Another aspect of the present disclosure is to provide a method and apparatus for PDCP reordering in a mobile communication system supporting multi-bearer.

In accordance with an aspect of the present disclosure, a bearer reconfiguration method performed by a User Equipment (UE) in a wireless communication system supporting a multi-bearer is provided. The bearer reconfiguration method includes, if the UE performs a bearer reconfiguration from a single bearer to the multi-bearer, reordering PDCP Protocol Data Units (PDUs) received through the multi-bearer, using a timer after a completion of the bearer reconfiguration, and processing the reordered PDCP PDUs into at least one PDCP Service Data Unit (SDU).

In accordance with another aspect of the present disclosure, a bearer reconfiguration method performed by a UE in a wireless communication system supporting a multi-bearer is provided. The bearer reconfiguration method includes, if the UE performs a bearer reconfiguration from the multi-bearer to a single bearer, reordering PDCP PDUs received through the multi-bearer, using a timer until a predetermined condition is satisfied, processing the reordered PDCP PDUs into at least one PDCP SDU.

In accordance with another aspect of the present disclosure, a UE in a wireless communication system supporting a multi-bearer is provided. The UE includes a receiver configured to receive data and a controller configured to, reorder PDCP PDUs received through a multi-bearer, using a timer after a completion of the bearer reconfiguration if the UE performs a bearer reconfiguration from a single bearer to the multi-bearer, and process the reordered PDCP PDUs into at least one PDCP SDU.

In accordance with another aspect of the present disclosure, a UE in a wireless communication system supporting a multi-bearer is provided. The UE includes a receiver configured to receive data and a controller configured to, reorder PDCP PDUs received through a multi-bearer, using a timer until a predetermined condition is satisfied if the UE performs a bearer reconfiguration from the multi-bearer to a single bearer and process the reordered PDCP PDUs into at least one PDCP SDU.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Descriptions of some well-known technologies that possibly obscure the disclosure will be omitted, if necessary. The disclosure now will be described more fully hereinafter with reference to the accompanying drawings, in which illustrative embodiments of the disclosure are shown. Prior to a description of the present disclosure, the Long Term Evolution (LTE) system and carrier aggregation (CA) will be described in brief. In various embodiments of the present disclosure, the LTE system may be construed to include an LTE-Advanced (LTE-A) system.

Figure 1:
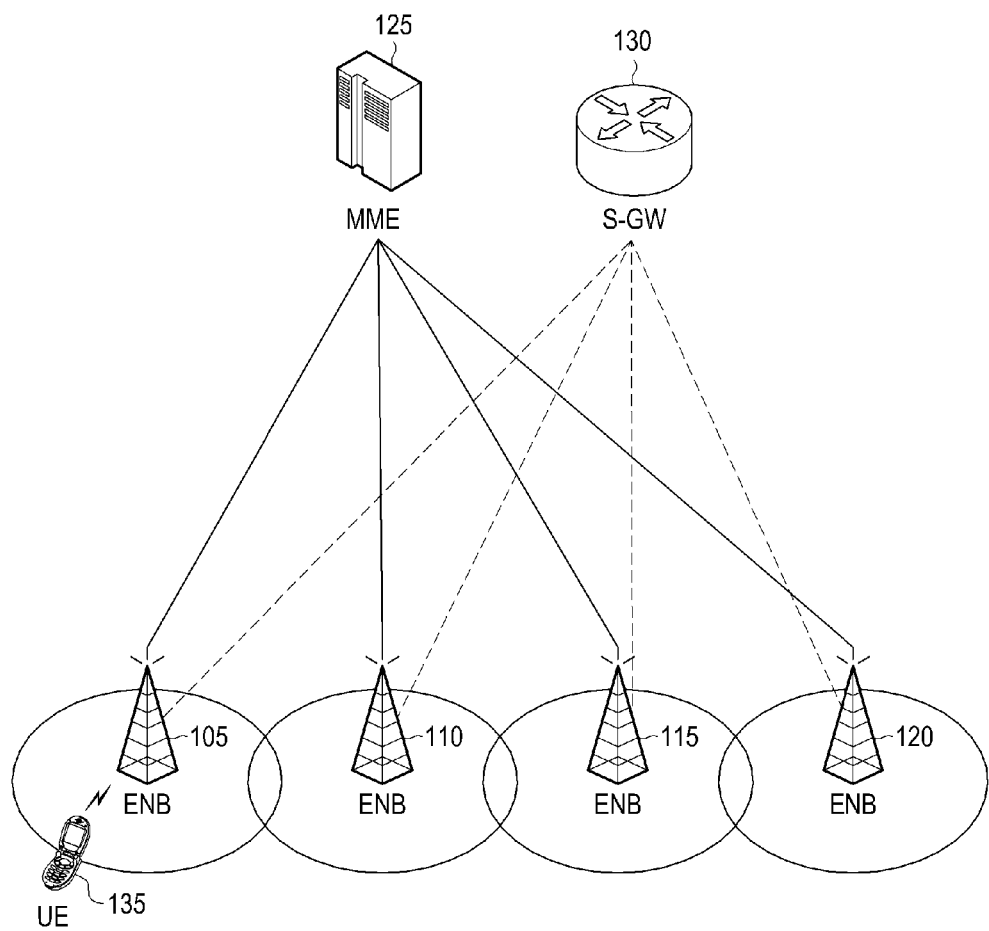
FIG. 1 illustrates a structure of a Long Term Evolution (LTE) system according to an embodiment of the present disclosure.

FIG. 1 illustrates a structure of an LTE system according to an embodiment of the present disclosure.

Referring to FIG. 1, a Radio Access Network (RAN) of an LTE system may include Evolved Node Bs (ENBs) (or Node Bs or base stations) 105, 110, 115 and 120, a Mobility Management Entity (MME) 125 and a Serving-Gateway (S-GW) 130. A User Equipment (UE) (or a terminal) 135 may access an external network (not shown) through the ENBs 105, 110, 115 and 120 and the S-GW 130.

The ENBs 105, 110, 115 and 120 may correspond to the legacy Node B in the Universal Mobile Telecommunication System (UMTS) system. The ENBs 105, 110, 115 and 120 may be connected with the UE 135 over a wireless channel, and may perform a more complex role than the legacy Node B. In the LTE system, since all user traffic including real-time services such as Voice over Internet Protocol (VoIP) is serviced over a shared channel, there is a need for a device that performs scheduling by collecting status information such as buffer status, available transmission power status and channel status of UEs, and the scheduling is managed by the ENBs 105, 110, 115 and 120. Each of the ENBs 105, 110, 115 and 120 may usually control a plurality of cells. For example, in order to implement a transfer rate of 100 Mbps, the LTE system may use an Orthogonal Frequency Division Multiplexing (OFDM) scheme in a 20-MHz bandwidth as its radio access technology. In addition, the ENBs 105, 110, 115 and 120 may use an Adaptive Modulation & Coding (AMC) scheme for adaptively determining a modulation scheme and a channel coding rate according to the channel status of the UE 135. The S-GW 130, which is a device that provides data bearers, may create or remove a data bearer under control of the MME 125. The MME 125, which is responsible not only for the mobility management function for the UE 135 but also for a variety of control functions, may be connected to a plurality of ENBs.

Figure 2:
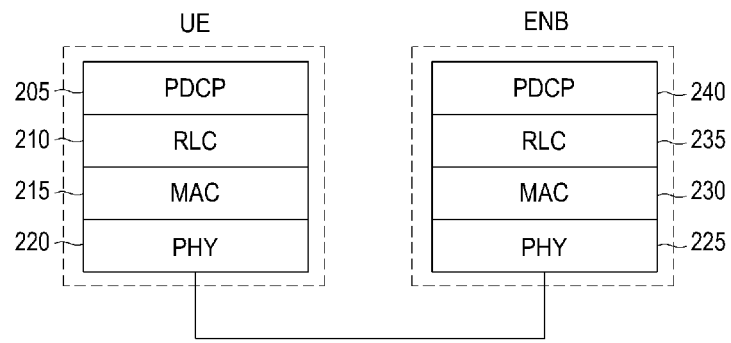
FIG. 2 illustrates a radio protocol structure in an LTE system according to an embodiment of the present disclosure.

FIG. 2 illustrates a radio protocol structure in an LTE system according to an embodiment of the present disclosure.

Referring to FIG. 2, in a radio protocol structure of the LTE system, a UE and an ENB may include Packet Data Convergence Protocols (PDCPs) 205 and 240, Radio Link Controls (RLCs) 210 and 235, and Medium Access Controls (MACs) 215 and 230, respectively.

The PDCPs 205 and 240 are responsible for operations such as Internet Protocol (IP) header compression/decompression, and the RLCs 210 and 235 may reconstruct PDCP Protocol Data Units (PDUs) in a proper size to perform an Automatic Repeat reQuest (ARQ) operation. The MACs 215 and 230, which are connected to multiple RLC layer devices configured in one UE, may perform an operation of multiplexing RLC PDUs in a MAC PDU, and demultiplexing RLC PDUs from a MAC PDU. Physical layers (PHY) 220 and 225 may channel-code and modulate upper layer data to make OFDM symbols, and transmit them over a wireless channel, and the physical layers 220 and 225 may demodulate and channel-decode OFDM symbols received over a wireless channel, and deliver them to their upper layers.

Figure 3:
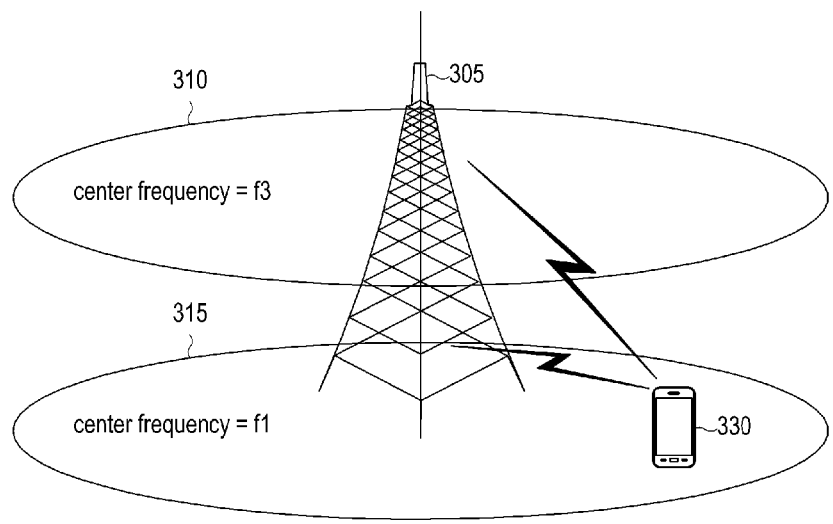
FIG. 3 illustrates an intra-Evolved Node B (ENB) carrier aggregation (CA) in an LTE system according to an embodiment of the present disclosure.

FIG. 3 illustrates an intra-ENB CA in an LTE system according to an embodiment of the present disclosure.

Referring to FIG. 3, one ENB may generally transmit and receive multiple carriers over a plurality of frequency bands. For example, when a carrier 315 with a forward center frequency f1 and a carrier 310 with a forward center frequency f3 are transmitted from an ENB 305, one UE may transmit and receive data using any one of the two carriers f1 and f3, according to the related art. However, a UE 330 having the CA capability may transmit and receive data over multiple carriers at the same time. The ENB 305 may allocate more carriers to the UE 330 having the CA capability depending on the situation, thereby increasing a transfer rate of the UE 330. This approach of aggregating a forward (or downlink) carrier and a reverse (or uplink) carrier that one ENB transmits and receives may be referred to as intra-ENB CA. However, in some cases, there may be a need to aggregate downlink carriers and uplink carriers that are transmitted and received from/at different ENBs, unlike in the example shown in FIG. 3.

Figure 4:
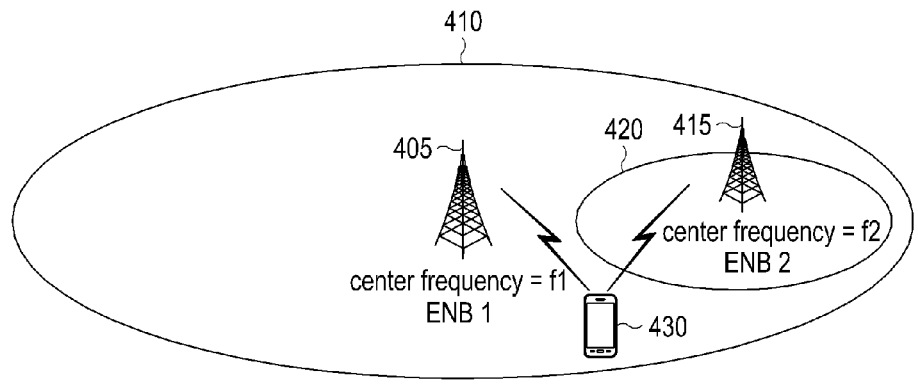
FIG. 4 illustrates an inter-ENB CA in an LTE system according to an embodiment of the present disclosure.

FIG. 4 illustrates an inter-ENB CA in an LTE system according to an embodiment of the present disclosure.

Referring to FIG. 4, when an ENB1 405 transmits and receives data over a carrier with a center frequency f1 and an ENB2 415 transmits and receives data over a carrier with a center frequency f2, a UE 430 may aggregate (or combine) the carrier with a downlink center frequency f1 and the carrier with a downlink center frequency f2, leading to the results that one UE aggregates carriers from two or more ENBs. Herein, this will be referred to as inter-ENB CA. In this specification, inter-ENB CA will be referred to as Dual Connectivity (DC), and for example, the expression that DC is set may refer to the expression that inter-ENB CA is set; the expression that one or more cell groups are set; the expression that a Secondary Cell Group (SCG) is set; the expression that at least one secondary serving cell (SCell), which is controlled by another ENB other than the serving ENB (SeNB), is set; the expression that a primary serving cell (PCell or pSCell) is set; the expression that a MAC entity for an SeNB is set; and the expression that two MAC entities are set in a UE.

The terms used herein will be described below.

In the traditional sense, when one downlink carrier that one ENB transmits and one uplink carrier that the ENB receives constitute one cell, 'carrier aggregation' may be construed as an operation in which a UE transmits and receives data through multiple cells at the same time. In this case, the maximum transfer rate and the number of carriers aggregated may have a positive correlation.

Herein, the expression that a UE receives data over any downlink carrier or transmits data over any uplink carrier has the same meaning as the expression that the UE transmits and receives data using a control channel and a data channel that are provided by a cell corresponding to a center frequency and a frequency band characterizing the carrier. Herein, CA will be expressed as 'a plurality of serving cells is set', and the terms such as a PCell and an SCell or an enabled serving cell will be used. These terms may have the same meanings as those used in the LTE mobile communication system. In the present disclosure, the terms such as a carrier, a component carrier and a serving cell will be interchangeably used.

Herein, a set of serving cells controlled by the same ENB will be defined as a Cell Group or a Carrier Group (CG). A cell group may be divided again into a Master Cell Group (MCG) and a Secondary Cell Group (SCG). MCG refers to a set of serving cells controlled by an ENB (e.g., a master ENB (MeNB)) that controls the PCell, and SCG refers to a set of serving cells controlled by an ENB (e.g., a slave ENB (SeNB)) that controls only the ENBs (e.g., SCells) other than the ENB controlling the PCell. As to information about whether a serving cell belongs to an MCG or an SCG, an ENB provides the information to a UE in a process of setting the serving cell. One MCG and one or more SCGs may be set for one UE. Although it will be assumed herein that one SCG is set for convenience purpose only, details of the present disclosure may be applied as it is, even though one or more SCGs are set. The PCell and SCell are the terms indicating the type of the serving cell, which is set for a UE. There are some differences between the PCell and the SCell. For example, while the PCell keeps an active status at all times, the SCell may alternate between an active status and an inactive status under instruction of the ENB. The UE's mobility may be controlled on the basis of the PCell, and the SCell may be construed as an additional serving cell for data transmission/reception. The PCell and SCell herein may refer to a PCell and an SCell, which are defined in the LTE standard TS36.331 or TS36.321 proposed by the 3rd Generation Partnership Project (3GPP).

In the present disclosure, macro cells and pico cells will be considered. A macro cell, which is a cell controlled by a macro ENB, may provide services in a relatively large area. On the other hand, a pico cell, which is a cell controlled by an SeNB, may provide services in an area that is significantly narrower compared with the typical macro cell. Although there are no strict criteria for distinguishing between the macro cell and the pico cell, it may be assumed that for example, an area of the macro cell may have a radius of about 500 meters and an area of the pico cell may have a radius of about tens of meters. Herein, the pico cell and the small cell will be interchangeably used.

Referring to FIG. 4, if the ENB1 405 is an MeNB and the ENB2 415 is an SeNB, a serving cell 410 with a center frequency f1 may be a serving cell belonging to an MCG and a serving cell 420 with a center frequency f2 may be a serving cell belonging to an SCG.

In the following description, other terms instead of MCG and SCG may be used for better understanding. For example, terms such as a master set and a secondary set, or a primary carrier group and a secondary carrier group may be used. However, in this case, it should be noted that though the terms are different, their meanings are the same. The main purpose of these terms is to determine whether a certain cell is controlled by an ENB that controls a PCell of a particular UE, and the operating mode of the UE and the cell may vary depending on whether or not the cell is controlled by the ENB that controls the PCell of the particular UE.

Although one or more SCGs can be set for a UE, it will be assumed herein that a maximum of one SCG is set for convenience purpose only. An SCG may include a plurality of SCells, any one of which may have a special attribute.

In the typical intra-ENB CA, a UE may transmit not only a Hybrid ARQ (HARQ) feedback and Channel Status Information (CSI) for a PCell but also an HARQ feedback and CSI for an SCell, over a Physical Uplink Control Channel (PUCCH) of the PCell. This is to apply CA even to a UE incapable of simultaneous uplink transmission.

In the case of inter-ENB CA, it may be impossible in reality to transmit an HARQ feedback and CSI of CSG SCells over a PUCCH which is an uplink control channel of the PCell. The HARQ feedback should be delivered within an HARQ Round Trip Time (RTT) (commonly 8 ms), since the transmission delay between the MeNB and the SeNB may be longer than the HARQ RTT. Because of these problems, PUCCH transmission resources may be set in one of the SCells belonging to an SCG, and an HARQ feedback and CSI for SCG SCells may be transmitted over the PUCCH. The special SCell will be referred to as a pSCell. In the following description, the inter-ENB CA will be interchangeably used with the DC.

Generally, one user service may be serviced by one Evolved Packet System (EPS) bearer, and one EPS bearer may be connected with one radio bearer. A radio bearer may be configured with PDCP and RLC, and in inter-ENB CA, it is possible to increase the data transmission/reception efficiency by disposing a PDCP device and an RLC device of one radio bearer on different ENBs. In this case, different approaches are needed depending on the type of the user service.

Figure 5:
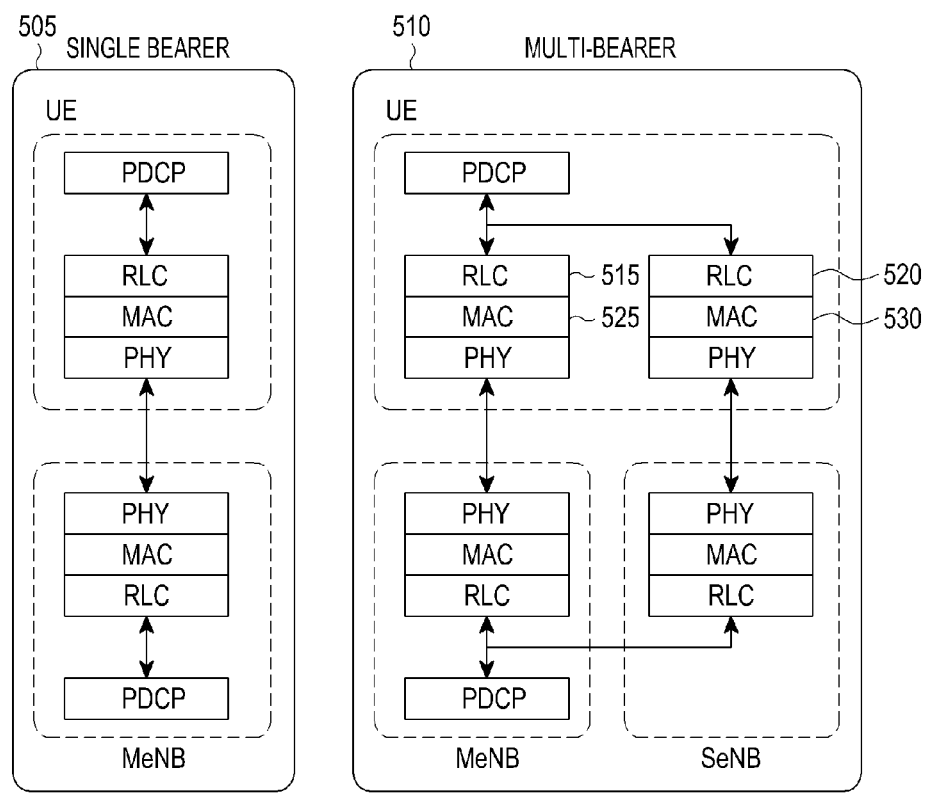
FIG. 5 illustrates a connection structure of a Packet Data Convergence Protocol (PDCP) device in an LTE system according to an embodiment of the present disclosure.

FIG. 5 illustrates a connection structure of a PDCP device in an LTE system according to an embodiment of the present disclosure.

Referring to FIG. 5, in the case of, for example, a high-capacity data service, a user service may transmit and receive data to/from both of an MeNB and an SeNB by forming two RLC devices as shown by reference numeral 510. If the user service is a service with strict Quality of Service (QoS) requirements like Voice over LTE (VoLTE), the user service may transmit and receive data using only the serving cell of the MeNB by disposing an RLC device only on the MeNB as shown by reference numeral 505. Hereinafter, for convenience of description, a bearer 505 will be referred to as a single bearer, and a bearer 510 will be referred to as a multi-bearer. A PDCP device of a single bearer may be connected with one RLC device, and a PDCP device of a multi-bearer may be connected with two RLC devices. An RLC device (which is connected with a MAC device associated with serving cells of an MCG) from/at which data is transmitted and received through an MCG will be referred to as an MCG RLC 515, and an RLC device from/at which data is transmitted and received through an SCG will be referred to as an SCG RLC 520. A MAC 525 associated with data transmission/reception through the MCG will be referred to as MCG-MAC, and a MAC 530 associated with data transmission/reception through the SCG will be referred to as an SCG-MAC. The MAC and RLC devices may be interconnected by a logical channel. A logical channel between the MCG RLC and the MCG-MAC will be referred to as an MCG logical channel, and a logical channel between the SCG RLC and the SCG-MAC will be referred to as an SCG logical channel.

Hereinafter, for convenience of description, a macro-cell area refers to an area where no small-cell signal is received and only the macro-cell signal is received, and a small-cell area refers to an area where a macro-cell signal is received and a small-cell signal are received together. When a UE with a large demand for downlink data has moved from the macro-cell area to the small-cell area, a small cell may be additionally set for the UE, and a bearer having a large amount of downlink data like a File Transfer Protocol (FTP) among some bearers of the UE may be reconfigured from a single bearer to a multi-bearer. In other words, when a UE moves from a macro-cell area to a small-cell area, and back to the macro-cell area, a certain bearer may be reconfigured from a single bearer to a multi-bearer, and back into the single bearer. Since a PDCP device of a single bearer is connected with one RLC and the RLC delivers in-sequence (or ordered) packets to the PDCP, the PDCP device may process the packets delivered by the RLC in order. On the other hand, a PDCP device of a multi-bearer may be connected with two RLCs, and each RLC may deliver in-sequence packets. However, since packets may not be in sequence (or may be out of sequence) between the RLC devices, the PDCP device may process the packets after ordering them. Therefore, as for the PDCP device, when the bearer is reconfigured from a single bearer to a multi-bearer, or reconfigured from a multi-bearer to a single bearer, an operation performed by the PDCP device may also be changed at a proper time.

In an embodiment of the present disclosure, an operation of a UE may be divided into a PDCP operation 1, a PDCP operation 2 and a PDCP operation 3.

The PDCP operation 1 is an operation that is applied to a PDCP of a single bearer. Details of the above operation follow Section 5.1.2 of the 3GPP standard TS36.323. The PDCP operation 2 is another operation that is applied to the PDCP of the single bearer, and the PDCP operation 1 is applied in the general case.

The PDCP operation 2 may be applied in an exceptional case where a lower layer device cannot perform reordering (e.g., during a handover situation or a Radio Resource Control (RRC) connection reestablishment procedure). Details of the above operation also follow Section 5.1.2 of the 3GPP standard TS36.323. When operating in the PDCP operation 1, the PDCP may perform the necessary process under the assumption that the order of the received packets is correct, and then deliver to, an upper layer, the received packet and packets having lower sequence number than that of the received packet. On the other hand, in a case where a lower layer device does not perform reordering, since the order of received packets may not be correct in, for example, the PDCP operation 2, the PDCP may store the packets in a reordering buffer without delivering then to the upper layer. Thereafter, at the time the lower layer device provides again the reordering (e.g., if the handover is completed or the RRC connection reestablishment procedure is completed), the PDCP may switch to the PDCP operation 1, and the stored PDCP Service Data Units (SDUs) may be delivered to the upper layer together with the newly received PDCP SDUs. Switching between the PDCP operation 1 and the PDCP operation 2 may occur immediately the moment the PDCP receives, for example, a control message for instructing a handover, and the PDCP operation 2 may be applied for a short time right after the handover has occurred. In an embodiment of the present disclosure, the PDCP operation 3 is newly introduced.

The PDCP operation 3, which is an operation that is applied to a PDCP of a multi-bearer, has been designed to be used in a situation where two RLC devices connected with the PDCP device receive PDCP PDUs, and PDCP PDUs received from one RLC device are in sequence (or ordered), whereas PDCP PDUs received from different RLC devices are not in sequence (or are out of sequence). In the PDCP operation 1 and the PDCP operation 2, the PDCP may first process the received PDCP PDUs into PDCP SDUs, and then determine whether they are reordered. On the other hand, in the PDCP operation 3, the PDCP may first determine whether the received PDCP PDUs are reordered, and then process only the in-sequence PDCP PDUs into PDCP SDUs and deliver them to the upper layer. Even in the PDCP operation 3, the PDCP may process PDCP PDUs into PDCP SDUs, and then perform reordering. Details of the PDCP operation 1, the PDCP operation 2, and the PDCP operation 3 will be described below. As described above, while the PDCP operation 2 may be temporarily applied in the handover situation, the PDCP operation 3 may be continuously applied while the PDCP is operating with a multi-bearer. In a single bearer, the PDCP operation 1 may be applied, and in a multi-bearer, the PDCP operation 3 may be applied. When an arbitrary bearer is switched from a single bearer to a multi-bearer or vice versa, the PDCP may switch a PDCP operation from the PDCP operation 1 to the PDCP operation 3, or from the PDCP operation 3 to the PDCP operation 1. If the operation switching is made in an early time, an unnecessary delay may occur when the PDCP device delivers data to the upper layer device. If the operation switching is made in a late time, data loss may occur.

Figure 6:
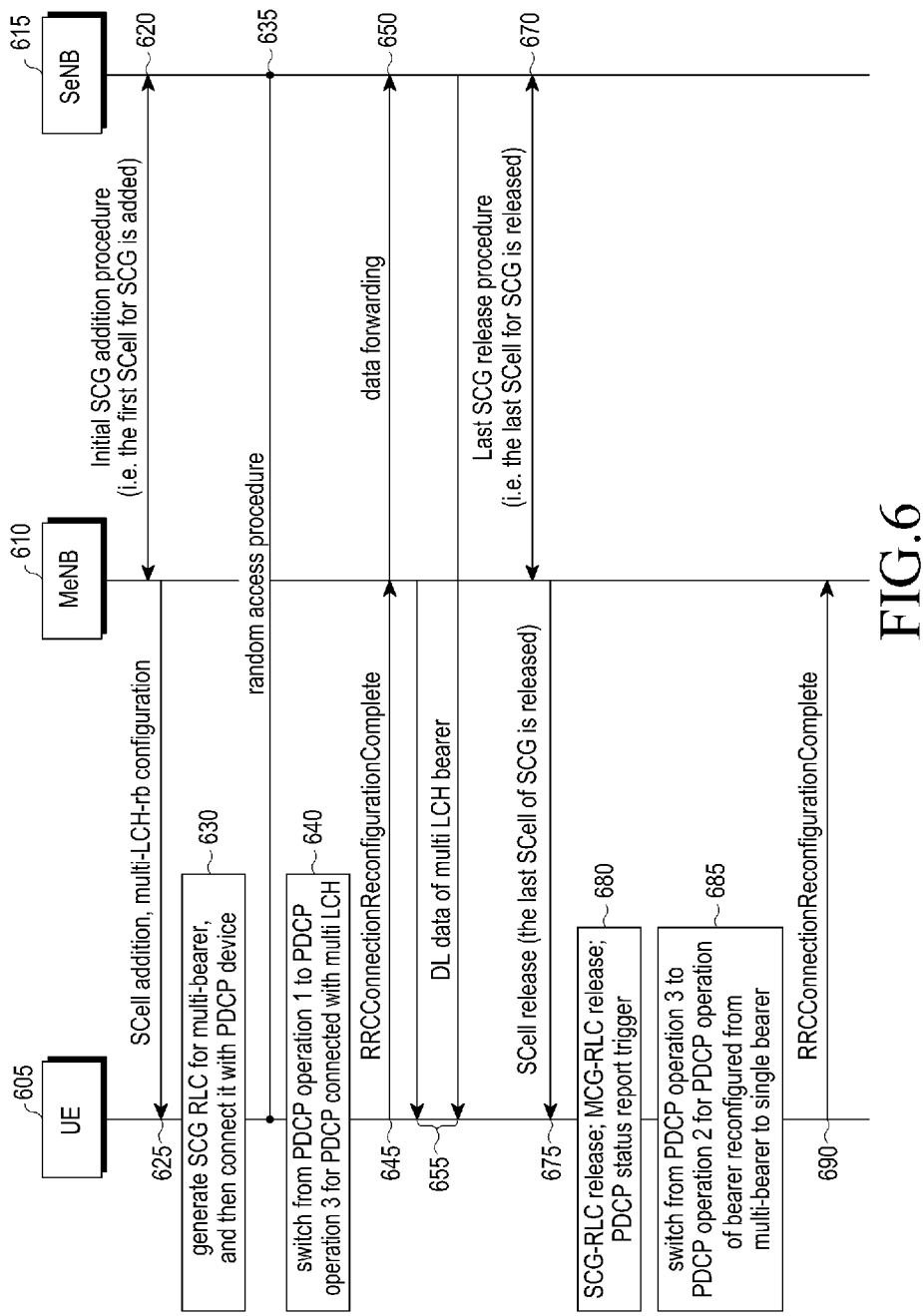
FIG. 6 illustrates a PDCP operation switching process in an LTE system according to an embodiment of the present disclosure.

FIG. 6 illustrates a PDCP operation switching process in an LTE system according to an embodiment of the present disclosure.

Referring to FIG. 6, operations of a UE and an ENB, which are associated with bearer reconfiguration including a process in which the UE performs the PDCP operation switching at a proper time, will be described in detail.

Referring to FIG. 6, in a mobile communication system including a UE 605, an MeNB 610 and an SeNB 615, the MeNB 610 may determine to add a serving cell of the SeNB 615 to the UE 605 at an arbitrary time and perform a procedure for serving cell addition with the SeNB 615 in operation 620. If the MeNB 610 first sets an SCell of the SeNB 615 for the UE 605 (e.g., if the MeNB 610 sets a first SCG SCell), the MeNB 610 and the SeNB 615 may determine which bearer the MeNB 610 will service and which bearer the SeNB 615 will service. The MeNB 610 and the SeNB 615 may reconfigure a bearer (e.g., a bearer requiring high-speed data transmission on a downlink) which meets the predetermined condition, into a multi-bearer. Hereinafter, for convenience of description, it will be assumed that a bearer x is reconfigured from a single bearer to a multi-bearer.

In operation 625, the MeNB 610 may send a predetermined RRC control message to the UE 605. The RRC control message may contain SCell configuration information and multi-bearer information. The SCell configuration information is for the newly added SCell, and may also include information indicating whether the SCell is an MCG SCell or an SCG SCell. The multi-bearer configuration information is information about a radio bearer that is reconfigured from a single bearer to a multi-bearer, and may include an identifier of the radio bearer and SCG RLC configuration information.

In operation 630, upon receiving the control message, the UE 605 may generate an SCG RLC device for a bearer indicated by a bearer identifier, to connect it with a PDCP device, and may connect the SCG RLC device to a MAC device for an SCG. The UE 605 may switch from the PDCP operation 1 to the PDCP operation 3 at the time the configuration of the multi-bearer is completed or at the time the below-described random access is completed. The existing RLC device (e.g., the MCG RLC) of the bearer may perform a normal data transmission/reception operation even during the reconfiguration process (e.g., an operation of delivering the in-sequence PDCP PDUs to the PDCP device, and storing the out-of-sequence (or unordered) PDCP PDUs in an RLC buffer to make an attempt to recover the missing PDUs through an ARQ process. As will be described below, unlike in the reconfiguration process from a single bearer to a multi-bearer, in a reconfiguration process from a multi-bearer to a single bearer, the MCG RLC device may also stop the RLC reception operation, and then perform the RLC reconfiguration process.

In operation 635, the UE 605 may perform random access in the newly added SCG SCell. Through the random access procedure, the UE 605 may establish uplink synchronization with the newly added SCG SCell and set the uplink transmission power. If the random access procedure is completed, the UE 605 may switch an operation of the PDCP device that is reconfigured to the multi-bearer, from the PDCP operation 1 to the PDCP operation 3 in operation 640. The time the random access procedure is completed may include the time the UE receives a valid random access response message in a case where a dedicated preamble is used, and the time the UE receives an uplink grant or a downlink assignment, which is addressed to a Cell-Radio Network Temporary Identifier (C-RNTI) and indicates new transmission, in a case where a random preamble is used. Other details related to the random access follow the LTE standard TS36.321.

In operation 645, the UE 605 may send a predetermined RRC control message to the MeNB 610 to report the completion of the SCell configuration and multi-bearer reconfiguration. In operation 650, upon receiving the reported information, the MeNB 610 may forward downlink data of the multi-bearer to the SeNB 615, and the SeNB 615 may initiate transmission of the downlink data to the UE 605 through the SCG RLC of the multi-bearer.

In operation 655, the UE 605 may send the RRC control message, and then receive the downlink data of the multi-bearer from the MCG RLC device and the SCG RLC device, and apply the PDCP operation 3 for the received PDCP PDUs.

Thereafter, in operation 670, the MeNB 610 or the SeNB 615 may determine to release the SCG SCell at an arbitrary time. After performing the procedure for releasing the SCG SCell, the MeNB 610 or the SeNB 615 may send an RRC control message to the UE 605 to instruct release of the SCG SCell in operation 675.

In operation 680, upon receiving the control message, the UE 605 may release the SCG SCell in response to the instruction. If the control message indicates the release of the last SCG SCell (e.g., if the UE 605 releases the SCG SCell in response to the instruction of the control message), the UE 605 may perform the procedure necessary for reconfiguration from a multi-bearer to a single bearer even though there is no more SCG SCell or there is no separate instruction. The UE 605 may perform an operation for reconfiguration from a multi-bearer to a single bearer similarly, even if the control message explicitly indicates the reconfiguration from a multi-bearer to a single bearer.

Reconfiguration Operation from Multi-Bearer to Single Bearer:
1) Release an indicated SCG RLC of a multi-bearer;
2) Reconfigure an indicated MCG RLC reception device of a multi-bearer;
3) Discard downlink HARQ buffer data of MCG-MAC; and
4) Trigger a PDCP status report.

In the process of releasing the SCG RLC, the UE 605 may reconfigure the downlink RLC PDUs stored in the SCG RLC into RLC SDUs, and then deliver them to the PDCP, and may discard the uplink RLC PDUs and downlink RLC SDUs stored in the SCG RLC. The RLC SDUs/PDCP PDUs delivered from the SCG RLC are out-of-sequence RLC SDUs/PDCP PDUs (i.e., there are RLC SDUs that have not been received yet even though they were transmitted earlier than the RLC SDUs).

The expression that a UE reconfigures an MCG RLC reception device may refer to an expression that the UE initializes a reception window, initializes a reception sequence number, delivers to the PDCP the downlink RLC PDUs that can be reconfigured into RLC SDUs, among the downlink RLC PDUs stored in its reception buffer, and discards the remaining downlink RLC PDUs. The UE may not discard the uplink RLC PDUs and RLC SDUs stored in its transmission buffer.

A PDCP status report may be triggered for each radio bearer, and the UE 605 may check a sequence number of a PDCP packet stored in its buffer of the PDCP of the bearer that is reconfigured from a multi-bearer to a single bearer, to generate a PDCP status report including information associated with a sequence number of a missing PDCP packet. The PDCP buffer may store therein the PDCP PDUs delivered from the SCG RLC, and the PDCP PDUs delivered from the MCG RLC.

The PDCP status report is control information that is used to prevent the loss of the PDCP packet in the handover or RRC connection reestablishment procedure. The handover or RRC connection reestablishment procedure may accompany reestablishment (e.g., reestablishment of a lower layer from the perspective of the PDCP device) of all RLC devices configured in the UE 605. If the handover or RRC connection reestablishment procedure is initiated, the UE 605 may trigger the PDCP status report for all Data Radio Bearers (DRBs) that satisfy the following PDCP status report generation condition 1. If the last SCG SCell is released, the UE 605 may trigger the PDCP status report for all DRBs satisfying the following PDCP status report generation condition 2. If a bearer is reconfigured from a multi-bearer to a single bearer, the UE 605 may check whether the bearer satisfies the following PDCP status report generation condition 3, to determine whether to generate a PDCP status report.

PDCP status report generation condition 1:
  A DRB in which statusReportRequired is set, among the DRBs in which an RLC Acknowledgement Mode (AM) is set.
PDCP status report generation condition 2:
  A multi-bearer among the DRBs in which the RLC AM and the statusReportRequired are set.

PDCP status report generation condition 3:
At least one of the SCG RLC and MCG RLC of the multi-bearer operates in RLC AM.

The statusReportRequired follows the description in the standards TS36.331 and TS36.323.

If the UE 605 reconfigures the multi-bearer into the single bearer, the UE 605 may switch the operation of the PDCP of the reconfigured bearer from the PDCP operation 3 to the PDCP operation 2 in operation 685. The PDCP may store therein the out-of-sequence PDCP SDUs delivered from the MCG RLC, and the out-of-sequence PDCP SDUs delivered from the SCG RLC. The PDCP may store the PDCP SDUs delivered in the reconfiguration process of the MCG RLC and the PDCP SDUs delivered in the release process of the SCG RLC in its PDCP buffer in the order of COUNT, generate a PDCP status report in which both of the reception status of the PDCP SDUs delivered from the MCG RLC and the reception status of the PDCP SDUs delivered from the SCG RLC are reflected, and transmit the PDCP status report to the MeNB 610.

In operation 690, the UE 605 may send a predetermined RRC control message to the MeNB 610 to report the successful completion of the above procedure, and the UE 605 and the MeNB 610 may exchange uplink data and downlink data with each other through the MCG SCells.

Especially in the reconfiguration process from a multi-bearer to a single bearer, the UE may not only release the SCG RLC device, but also reconfigure the MCG RLC device. In principle, the MCG RLC device is not affected in the reconfiguration process from a multi-bearer to a single bearer, so it is not necessary to reconfigure the MCG RLC device.

Figure 7:
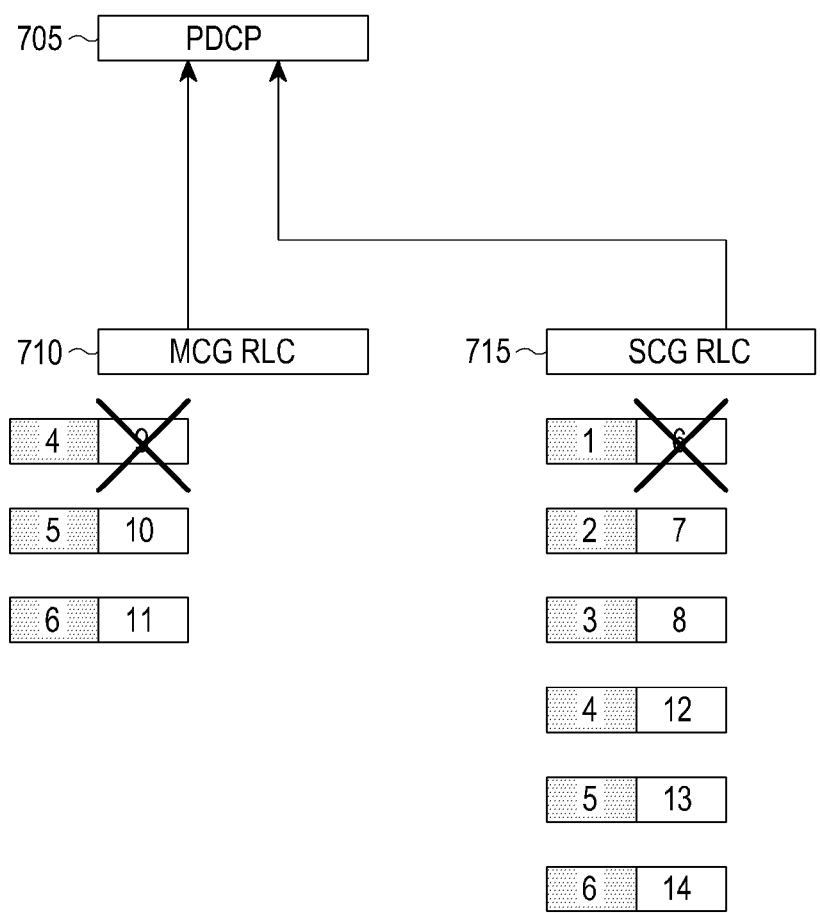
FIG. 7 illustrates a reconfiguration of a Radio Link Control (RLC) device during a PDCP operation switching process in an LTE system according to an embodiment of the present disclosure.

However, in an embodiment of the present disclosure, the MCG RLC device may be artificially reconfigured in order to make efficient switching of the PDCP operation as shown in the example of FIG. 7.

FIG. 7 illustrates a reconfiguration of an RLC device during a PDCP operation switching process in an LTE system according to an embodiment of the present disclosure.

Referring to FIG. 7, at the time the reconfiguration from, for example, a multi-bearer to a single bearer is instructed, out-of-sequence PDCP PDU [10] and PDCP PDU [11] may be stored in an MCG RLC 710 (i.e., a PDCP PDU [9] is missing), and out-of-sequence PDCP PDU [7], PDCP PDU [8], PDCP PDU [12], PDCP PDU [13] and PDCP PDU [14] may be stored in an SCG RLC 715. For reference, it will be assumed that a front number of a rectangle represents an RLC sequence number. For example, an RLC sequence number of the PDCP PDU [10] is 5, and an RLC sequence number of the PDCP PDU [11] is 6. If only the SCG RLC delivers PDCP PDUs when the reconfiguration from a multi-bearer to a single bearer is instructed, it may be difficult for the PDCP 705 to determine whether the packets following the PDCP PDU [12] are reordered, until the PDCP PDUs [10] and [11] are delivered from the MCG RLC, so another reordering operation should be introduced. In an embodiment of the present disclosure, in order to solve the above problems, if the reconfiguration from a multi-bearer to a single bearer is made, reconfiguration may be applied even for the MCG RLC device so that all the PDCP SDUs that are out of sequence at that time may be stored in the PDCP buffer.

In addition, the PDCP may first apply the PDCP operation 2 without immediately operating the PDCP operation 1 so that the out-of-sequence PDCP SDUs may not be immediately delivered to the upper layer. In other words, the UE may release the SCG RLC device and reconfigure the MCG RLC device, and then switch the PDCP operation from the PDCP operation 3 to the PDCP operation 2. If a first PDCP PDU is received after the bearer is reconfigured into a single bearer, the PDCP may switch from the PDCP operation 2 to the PDCP operation 1.

Figure 8:
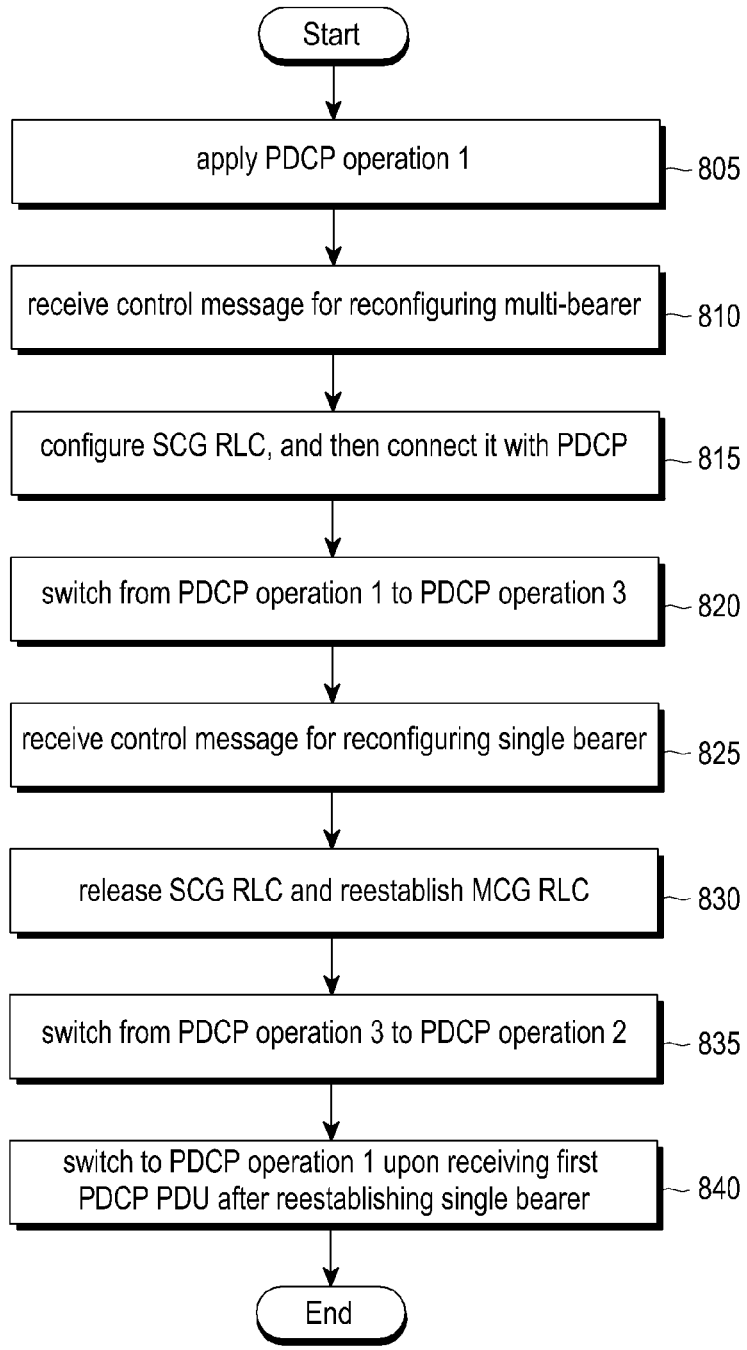
FIG. 8 illustrates an operation of a User Equipment (UE) during a bearer reconfiguration in an LTE system according to an embodiment of the present disclosure.

FIG. 8 illustrates an operation of a UE during a bearer reconfiguration in an LTE system according to an embodiment of the present disclosure. In the example of FIG. 8, a UE's operation of reconfiguring an arbitrary bearer x from a normal bearer to a multi-bearer and back to the normal bearer will be described.

Referring to FIG. 8, in operation 805, a UE may apply the PDCP operation 1 for a bearer x which is a single bearer. In operation 810, the UE may receive a control message for reconfiguring the bearer x into a multi-bearer. In operation 815, the UE may generate/configure an SCG RLC device to be connected with the multi-bearer depending on the configuration information indicated by the control message, and then connect the SCG RLC device with the PDCP. In operation 820, the UE may switch the PDCP operation from the PDCP operation 1 to the PDCP operation 3. In other words, the UE may check whether PDCP PDUs are reordered, beginning at the PDCP PDU that is first received after the bearer is reconfigured into a multi-bearer, and then apply the PDCP operation 3 for determining whether to deliver the PDCP PDUs to the upper layer. Thereafter, by applying the PDCP operation 3 for the PDCP PDUs of the reconfigured bearer, the UE may perform an operation of converting the PDCP PDUs into PDCP SDUs, and delivering the in-sequence PDCP SDUs to the upper layer.

Upon receiving a control message for instructing to reconfigure the multi-bearer into a single bearer in operation 825, the UE may release the SCG RLC and reestablish the MCG RLC in operation 830. In this case, the UE may release both of the transmission device and the reception device for the SCG RLC, and reestablish only the reception device for the MCG RLC. In other words, the UE may normally process the RLC SDUs and RLC PDUs stored in the MCG RLC transmission device without discarding them, and may assemble, as RLC SDUs, all the RLC PDUs that can be assembled in RLC SDUs, among the RLC PDUs stored in the RLC reception device, and then deliver them to the PDCP and discard the remaining RLC PDUs.

In operation 835, the UE may first switch the PDCP operation to the PDCP operation 2, without immediately switching the PDCP operation from the PDCP operation 3 to the PDCP operation 1. In other words, the UE may convert PDCP PDUs delivered from the MCG RLC and SCG RLC into PDCP SDUs by processing the PDCP PDUs according to the COUNT, and then store all the SDUs following the first missing SDU in the buffer.

In operation 840, the UE may apply the PDCP operation 1 for the PDCP PDUs, beginning at the PDCP PDU that is first received after the bearer is reestablished into a single bearer. In other words, after the UE converts the first PDCP PDU into an SDU, even though there is a missing SDU among the SDUs with COUNT that is lower than COUNT of the received SDU, the UE may deliver the SDUs whose COUNTs are consecutive around that of the received SDU, to the upper layer, determining that the SDUs are in sequence.

Operations 830, 835, and 840 may be modified as follows. The UE may release the SCG RLC and keep the MCG RLC in operation 830, and may switch the PDCP operation from the PDCP operation 3 to the PDCP operation 2 in operation 835. In other words, the UE may process the PDCP PDUs delivered from the SCG RLC, and store the out-of-sequence PDCP SDUs in the PDCP buffer without delivering them to the upper layer. In operation 840, if the switching to a single bearer is completed, or if a first PDCP PDU is received after the switching to the single bearer, the UE may start a predetermined timer 2. The UE may keep the PDCP operation 2 while the timer 2 is in operation, and may switch from the PDCP operation 2 to the PDCP operation 1 if the timer 2 expires. In other words, while the timer 2 is in operation, the UE may wait until the out-of-sequence PDCP PDUs which have occurred due to the release of the SCG RLC are in sequence. The timer 2 should be set to a time that is long enough so that the out-of-sequence reception may be resolved. As for values of a timer 1 and a timer 2, the ENB may notify the values to the UE using a predetermined RRC control message.

As for the PDCP operation 1, the PDCP operation 2 and the PDCP operation 3, it may be understood that multiple detailed operations that should be applied for the PDCP PDUs delivered from the RLC device are listed in a series of order. Detailed operations constituting these operations and the order thereof are listed in Table 1 below. The following detailed operations may be conducted in the order from top to bottom.

TABLE 1

| PDCP operation 1 | PDCP operation 2 | PDCP operation 3 |
|---|---|---|
| PDCP PDU reception | PDCP PDU reception | PDCP PDU reception |
| Determine HFN/COUNT of PDCP PDU. Discard PDU if it is received in duplicate. | Determine HFN/COUNT of PDCP PDU. Discard PDU if it is received in duplicate. | Determine HFN/COUNT of PDCP PDU. Discard PDU if it is received in duplicate. |
| Process PDCP PDU into PDCP SDU | Process PDCP PDU into PDCP SDU | Process PDCP PDU into PDCP SDU |
| Deliver the PDCP SDU and PDCP SDUs satisfying upper layer delivery condition 1 to the upper layer. Store the remaining SDUs in the buffer. | Deliver PDCP SDUs satisfying upper layer delivery condition 2 to the upper layer. Store the remaining SDUs in the PDCP buffer. | Store PDCP SDU in the PDCP buffer. Deliver PDCP SDUs satisfying upper layer delivery condition 3 to the upper layer. Store the remaining SDUs in the PDCP buffer. |

How to determine Hyper Frame Number (HFN)/COUNT of a received PDCP PDU, which is given in Table 1, will be described below. COUNT is a 32-bit integer, and may increase one by one, starting at zero (0). One COUNT may be granted per PDCP packet, and may be used for a security-related operation such as ciphering/deciphering of a PDCP packet. COUNT may monotonically increase in the order in which a PDCP packet is delivered to a lower layer, and in principle, COUNT may assigned in the order in which a PDCP SDU is delivered from an upper layer. COUNT may be configured with (or may include) HFN and PDCP Sequence Number (SN). While PDCP SN may be transmitted by being included in a header of a PDCP packet, HFN may not be explicitly delivered. Therefore, a PDCP reception device should determine HFN of a received packet on its own. If a PDCP transmission device complies with a predetermined condition (e.g., a condition that a packet is transmitted so that the out-of-sequence of PDCP SN may be less than a half of the total of sequence numbers that can be indicated by PDCP SN) in transmitting a packet, the PDCP reception device may determine HFN, using the sequence number (received PDCP SN; see the standard 36.323) of the last received PDCP packet, the highest sequence number (Next_PDCP_RX_SN; see the standard 36.323) among the sequence numbers that have been received so far, the window with a predetermined size (Reordering_Window; see the standard 36.323), and the highest sequence number (Last_Submitted_PDCP_RX_SN; see standard 36.323) among the sequence numbers that have been delivered to the upper layer so far. If a packet with a sequence number higher than that of the received packet is already delivered to the upper layer (e.g., if the received packet has already been received, or is a delayed received packet), the PDCP reception device may perform header decompression on the received packet, and then discard the received packet. In more detail, when a packet is received in duplicate, or is received with a delay for some reasons that cannot be specified, the PDCP reception device may perform header decompression on the packet, and then discard it, since the packet may contain useful information for update of header decompression context. The process of determining the HFN may follow the description in Section 5.1.2.1.2 of the standard 36.323.

Processing a PDCP PDU whose HFN and COUNT are determined, into a PDCP SDU may refer to deciphering a PDCP PDU and decompressing a header of an IP packet contained in the PDCP PDU, and details thereof may follow the description in the standard 36.323.

Hereinafter, for convenience of description, COUNT corresponding to Last_Submitted_PDCP_RX_SN will be referred to as Last_Submitted_PDCP_RX_COUNT, COUNT corresponding to received PDCP SN will be referred to as received PDCP COUNT, and COUNT corresponding to Next_PDCP_RX_SN will be referred to as Next_PDCP_RX_COUNT. It will be assumed that Last_Submitted_PDCP_RX_COUNT is the highest COUNT (e.g., the in-sequence highest COUNT) delivered to the upper layer, received PDCP COUNT is COUNT of the received PDCP packet, and Next_PDCP_RX_COUNT is a value obtained by adding one (1) to the highest COUNT among the COUNTs that have been received so far.

An upper layer delivery condition 1 of the PDCP operation 1 is as follows.

Upper Layer Delivery Condition 1 of PDCP Operation 1

If processing for an arbitrary PDCP SDU [X] is completed in the PDCP operation 1, the UE may determine that 'SDUs with COUNT lower than X' and 'SDUs with COUNT lower than the lowest missing COUNT among the missing COUNTs greater than X', among the PDCP SDUs stored in the buffer, have satisfied the upper layer delivery condition 1, and then deliver the SDUs to the upper layer. For example, if PDCP SDU [90]~PDCP SDU [99], PDCP SDU [101] ~PDCP SDU [110], and PDCP [112]~PDCP [115] were stored in the PDCP buffer when PDCP SDU [100] is received, then PDCP SDU [100], PDCP SDU [90]~PDCP SDU [100] which are PDCP SDU with COUNT lower than that of PDCP SDU [100], and PDCP SDU [101]~PDCP SDU [110] which are PDCP SDUs preceding PDCP SDU [111] which is the first missing PDCP SDU among the PDCP SDUs with COUNT higher than that of PDCP SDU [100] may be delivered to the upper layer as they satisfy the upper layer delivery condition 1, and PDCP SDU[112]~PDCP SDU [115] may be kept being stored in the buffer. In the PDCP operation 1 that is triggered by receiving an arbitrary PDCP PDU, received PDCP SDUs may be unconditionally delivered to the upper layer, and in addition, PDCP SDUs satisfying the upper layer delivery condition 1 may also be delivered to the upper layer.

An upper layer delivery condition 2 of the PDCP operation 2 is as follows.

Upper Layer Delivery Condition 2 of PDCP Operation 2

In the PDCP operation 2 that is triggered by receiving an arbitrary PDCP PDU, if the received PDCP SDU is a missing PDCP SDU with the lowest COUNT (e.g., if Received PDCP COUNT is the same as a value obtained by adding 1 to Last_Submitted_PDCP_RX_COUNT), the next missing PDCP SDUs including the received PDCP SDU may be delivered to the upper layer. If the received PDCP SDU is not the missing PDCP SDU with the lowest COUNT, the PDCP SDU may be stored in the PDCP buffer. In the PDCP operation 3 that is triggered by receiving an arbitrary PDCP PDU, it is checked whether there are SDUs satisfying an upper layer delivery condition 3 among the PDCP SDUs stored in the PDCP buffer, including the processed PDCP SDU, and only the SDUs satisfying the upper layer delivery condition 3 may be delivered to the upper layer.

The upper layer delivery condition 3 of the PDCP operation 3 will be described below.

Upper Layer Delivery Condition 3 of PDCP Operation 3

Figure 9:
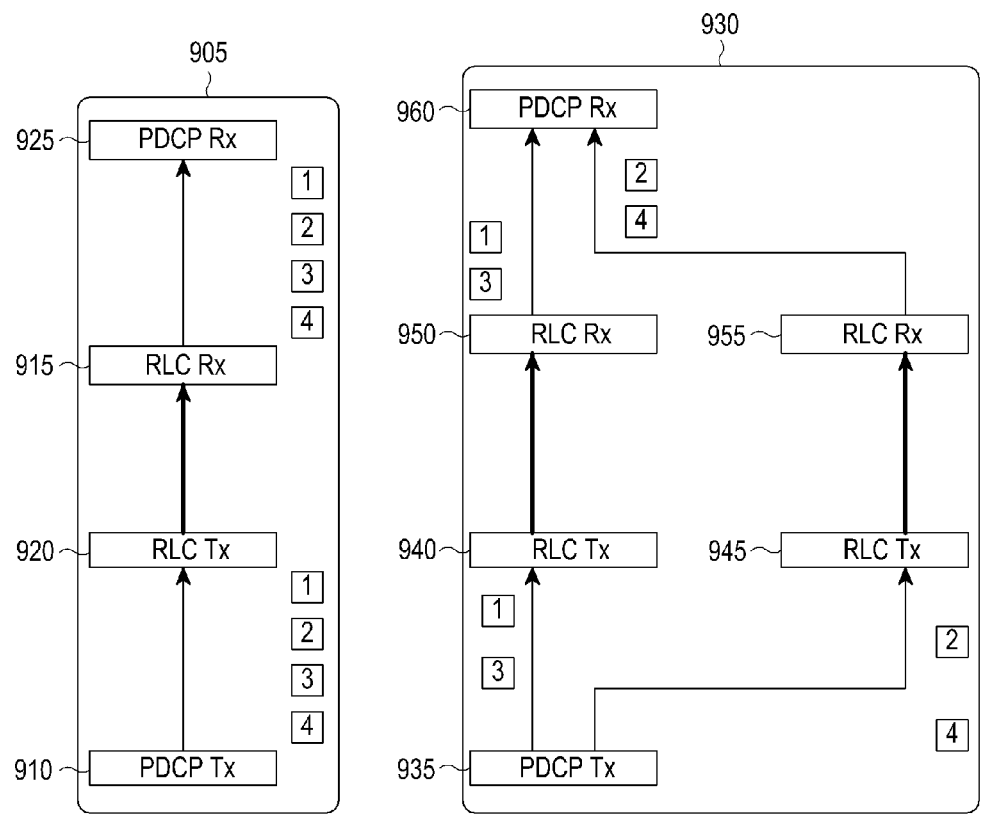
FIG. 9 illustrates an upper layer delivery condition of a PDCP operation in an LTE system according to an embodiment of the present disclosure.

FIG. 9 illustrates an upper layer delivery condition of a PDCP operation in an LTE system according to an embodiment of the present disclosure.

Referring to FIG. 9, in a single bearer 905 in which one logical channel is set up, a PDCP transmission device 910 may deliver packets to an RLC reception device 915 in the order of packet [1], packet [2], packet [3] and packet [4]. The packets may be received at an RLC transmission device 920 through a MAC device and a wireless channel. In this case, if an error occurs in the wireless channel, retransmission/error recovery may be conducted using HARQ and ARQ, so the order of packets that the RLC transmission device 920 receives in this process may be different from the order of packets that the PDCP transmission device 910 has transmitted. The RLC transmission device 920 may reorder the out-of-sequence packets, and then deliver the packets to a PDCP reception device 925. For example, the RLC transmission device 920 may deliver packets to the PDCP reception device 925 in the order of packet [1], packet [2], packet [3] and packet [4].

In the case of a multi-bearer 930 in which two logical channels are set up, a PDCP transmission device 935 may deliver packets to two RLC transmission devices 940 and 945. For example, the PDCP transmission device 935 may deliver a packet [1] and a packet [3] to the first RLC transmission device 940, and a packet [2] and a packet [4] o the second RLC transmission device 945.

The first RLC transmission device 940 may deliver packets to a first RLC reception device 950, and the second RLC transmission device 945 may deliver packets to a second RLC reception device 955. The first RLC reception device 950 may reorder the received packets in the order in which the first RLC transmission device 940 has received the packets from the PDCP transmission device 935. In other words, the first RLC reception device 950 may deliver packets to a PDCP reception device 960 in the order of packet [1] and packet [3]. Similarly, the second RLC reception device 955 may reorder the received packets in the order in which the second RLC transmission device 945 has received the packets from the PDCP transmission device 935. In other words, the second RLC reception device 945 may deliver packets to the PDCP reception device 960 in the order of packet [2] and packet [4].

However, the packets delivered by the first RLC reception device 950 and the second RLC reception device 955 may not be in sequence. For example, the packets delivered by the first RLC reception device 950 and the second RLC reception device 955 may be delivered in the order of packet [1], packet [2], packet [4] and packet [3], or in the order of packet [2], packet [4], packet [1] and packet [3]. Therefore, the PDCP reception device 960 may need to reorder the packets delivered by two or more RLC reception devices 950 and 955.

In an embodiment of the present disclosure, whether an arbitrary missing PDCP SDU [x] is reordered may be determined depending on whether a reordering condition 3 is satisfied. The reordering condition 3 may be summarized as follows.

Reordering Condition 3 of Arbitrary PDCP SDU [x]

PDCP SDUs with COUNT higher than X have been received from both of an MCG RLC and an SCG RLC, and an associated timer 1 has expired.

The timer 1 is started, if a PDCP SDU with COUNT higher than x is received from an RLC SCG, and the timer 1 is to cope with an out-of-sequence reception phenomenon between an MeNB and an SeNB.

In the following description, an expression that an arbitrary missing PDCP SDU [x] is reordered may mean performing the subsequent operation, considering that the SDU [x] is received, since there is no possibility of receiving the missing SDU [x] any longer. If the missing SDU [x] is reordered, SDUs whose COUNT is between [x+1] and y, among the received SDUs with COUNT higher than x may be delivered to the upper layer, and then Last_Submitted_PDCP_RX_COUNT may be updated to y, which is a value obtained by subtracting 1 from COUNT of the first missing PDCP SDU, which is higher than x. For example, Table 2 below shows reordering and a related operation in a PDCP reception device.

TABLE 2

| | MCG RLC | SCG RLC | Last_Submitted_PDCP_RX_COUNT | T1 timer | PDCP operation |
|---|---|---|---|---|---|
| $t_0$ | | | 10 | | |
| $t_1$ | 11 | | 11 | | Deliver [11] to upper layer |
| $t_2$ | 13 | | 11 | | Store [13] in buffer; [12] is missing SDU |
| $t_3$ | | 15 | 11 | Start T1 timer related to [15] | Store [13] and [15] in buffer |
| $t_4$ | 14 | | 11 | | Store [13], [14] and[15] in buffer |
| $t_5$ | | 15 | | T1 timer expire | Consider that [12] is no longer received. SDUs between 12 and 16 are delivered to upper layer, since the first missing COUNT higher than 12 is 16. |

For example, if SDU[11] is received from the MCG RLC at an arbitrary time t1, the SDU may be delivered to the upper layer and a related variable may be updated to 11, since the SDU is an in-sequence SDU.

If SDU[13] is received from the MCG RLC at an arbitrary time t2, a missing RLC SDU[12] may occur and the UE may store SDU[13] in the PDCP buffer.

Thereafter, the UE may receive SDU[15] from the SCG RLC at an arbitrary time t3. The UE may start a T1 timer, since COUNT of the SDU received from the SCG RLC is higher than the missing COUNT. If a missing PDU is not received before the T1 timer expires, it means that the missing PDU is not received from at least the SCG RLC.

Thereafter, the UE may receive SDU[14] from the SCG RLC at an arbitrary time t4, and thereafter, the T1 timer related to SDU[15] (or related to SDU[12]) may expire at an arbitrary time t5. Since COUNT higher than the missing COUNT has been received from both of the MCG RLC and SCG RLC, and a related T1 timer has expired, the UE may deliver PDCP SDUs [13], [14] and [15] which are SDUs whose COUNT is between COUNT=12 higher by 1 than the missing SDU and COUNT=16 of the next missing SDU, to the upper layer, and update Last_Submitted_PDCP_RX_COUNT to 15.

When it is determined that an arbitrary PDCP SDU is not received as described above, the timer 1 may be related to 'the lowest COUNT received from the SCG RLC among the COUNTs higher than the missing COUNT', 'the COUNT that is first received from the SCG RLC, among the COUNTs higher than the missing COUNT', or 'the missing COUNT'. In the above example, the timer 1 may be a timer 1 related to 12 or 15, since the sequence number of the missing SDU is 12 and COUNT that is first received from SCG RLC, among the COUNTs higher than 12, is 15. The size of the timer 1 may be determined as a size that is large enough to cope with the out-of-sequence reception which may occur between the MeNB and SeNB. In other words, the size of the timer 1 may be determined to correspond to the possible maximum value in the reception time difference between two packets which have undergone the out-of-sequence reception phenomenon, which is defined as a phenomenon in which a packet that the MeNB transmitted to the SeNB at an arbitrary time arrives at the SeNB earlier than a packet that was transmitted before the packet.

Figure 10:
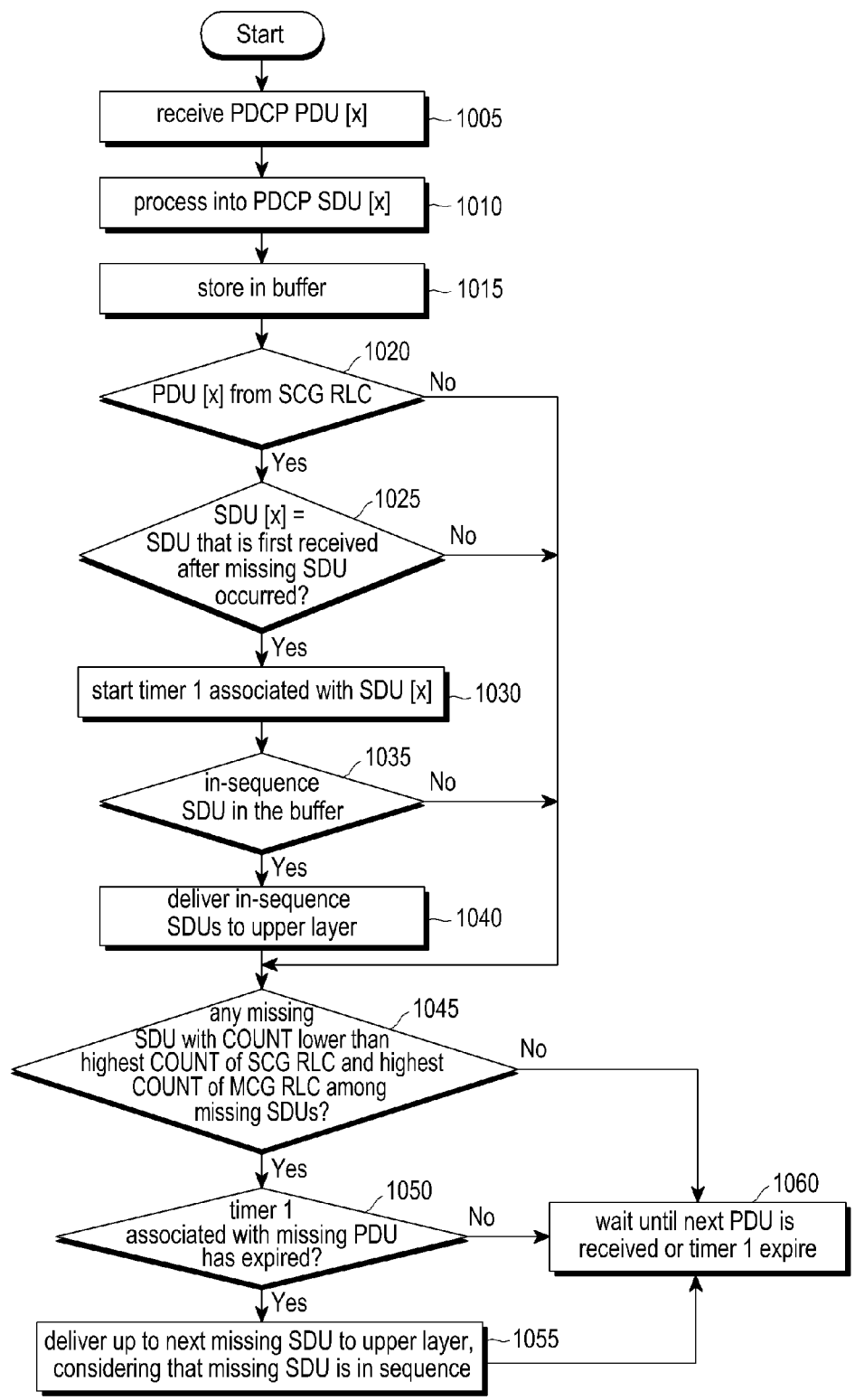
FIG. 10 illustrates an operation of a PDCP reception device in an LTE system according to an embodiment of the present disclosure.

FIG. 10 illustrates an operation of a PDCP reception device in an LTE system according to an embodiment of the present disclosure. This is an operation performed when a PDCP reception device of a multi-bearer receives a PDCP PDU from an RLC reception device.

Referring to FIG. 10, in operation 1005, the PDCP reception device may receive a PDCP PDU [x] from an RLC reception device. In operation 1010, the UE may decipher the PDCP PDU [x] and decompress a header of an IP packet contained in the PDCP PDU [x] to reconfigure (i.e., convert or restore) the PDCP PDU [x] into a PDCP SDU [x]. If the PDCP SDU [x] is received in duplicate, the UE may discard the PDCP SDU [x] and wait until the next PDU is received. If the PDCP SDU [x] is not received in duplicate, the UE may store the PDCP SDU [x] in a PDCP buffer in the order of COUNT in operation 1015.

In operation 1020, the UE may determine whether the PDCP SDU [x] has been received from the SCG RLC. If so, to UE may proceed to operation 1025, and if not so, the UE may proceed to operation 10445. In operation 1025, the UE may determine whether there is a missing SDU with a sequence number lower than that of the SDU[x] and the SDU [x] is an SDU that was first received from the SCG RLC device after the missing SDU occurred (e.g., whether there is no timer 1 that is in operation in relation to the missing SDU). If the condition is satisfied, the UE may proceed to operation 1030, and if the condition is not satisfied, the UE may proceed to operation 1045. In operation 1030, the UE may start the timer 1, and associate the timer 1 with COUNT (e.g., received COUNT, missing COUNT, or a value obtained by adding 1 to received COUNT) related to the missing SDU.

In operation 1035, the PDCP reception device may determine whether there is an in-sequence SDU among the SDUs stored in the PDCP buffer. For example, if an SDU[x] was a missing SDU, the above condition may be satisfied, and the PDCP reception device may deliver the in-sequence SDUs to the upper layer in operation 1040. The in-sequence SDUs may refer to SDUs between 'the highest COUNT delivered to the upper layer' or 'the in-sequence highest COUNT' and 'the lowest COUNT among the missing COUNTs' before the SDU [x] is received. The PDCP reception device may deliver the in-sequence SDUs to the upper layer in order in operation 1040. If the above condition is not satisfied, the UE may proceed to operation 1045.

In operations 1045 and 1050, the UE may determine SDUs that can be no longer received, among the missing SDUs, and determine whether the upper layer delivery condition 3 is satisfied, in order to deliver the in-sequence SDUs among the SDUs following the SDUs that can be no longer received, to the upper layer. First, the UE may determine whether there is a missing SDU having COUNT that is lower than the highest COUNT received from the SCG RLC and the highest COUNT received from the MCG RLC, among the missing SDUs. For example, in a case where COUNT of the missing SDU is 10, the highest COUNT received from the MCG RLC is A, and the highest COUNT received from the SCG RLC is B, if A and B are both higher than 10, the condition may be satisfied, and if even one of them is lower than 10, the condition may not be satisfied. If the condition is satisfied, the UE may proceed to operation 1050, and if the condition is not satisfied, the UE may proceed to operation 1060. Hereinafter, for convenience of description, the missing COUNT satisfying the condition will be referred to as Y.

In operation 1050, the UE may determine whether a timer 1 associated with the missing SDU or associated with Y has already expired. If so, the UE may proceed to operation 1055, and if not so, the UE may proceed to operation 1060. In operation 1055, the UE may deliver predetermined SDUs to the upper layer and then proceed to operation 1060. The predetermined SDUs may be SDUs between '[Y+1] ' and 'the lowest COUNT among the missing COUNTs higher than Y'. For example, if Y is 10 and the missing COUNTs higher than 10 are 15, 20 and 25, the UE may deliver SDU [11], SDU[12], SDU[13] and SDU[14] to the upper layer, and store the remaining SDUs in the PDCP buffer. It may be considered that SDUs up to at least SDU [14] are in sequence. In operation 1060, the UE may wait until the next PDU is received or the timer 1 expires.

Figure 11:
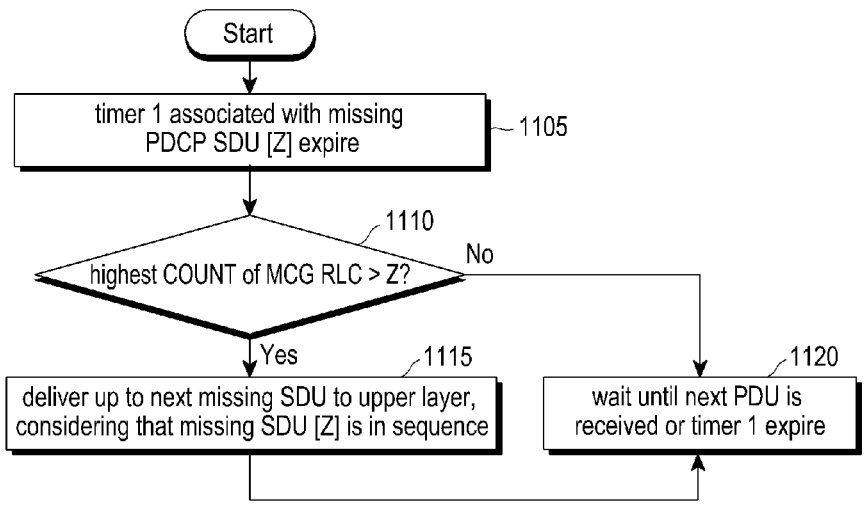
FIG. 11 illustrates an operation performed when a timer 1 expires in the PDCP reception device as illustrated in FIG. 10 according to an embodiment of the present disclosure.

FIG. 11 illustrates an operation performed when a timer 1 expires in the PDCP reception device as illustrated in FIG. 10 according to an embodiment of the present disclosure.

Referring to FIG. 11, in operation 1105, a timer 1 associated with an arbitrary missing PDCP SDU [z] expires. In this case, the UE may consider that there is no possibility that the PDCP SDU [z] is missing due to the out-of-sequence reception phenomenon between the MeNB and the SeNB. In other words, if COUNT higher than z is received from the MCG RLC, the UE may perform the subsequent operation as if SDU[z] is received.

In operation 1110, the UE may determine whether the highest COUNT received from the SCG RLC and the highest COUNT received from the MCG RLC are higher than z. Since the timer 1 associated with the missing SDU [z] is started when a PDCP SDU with COUNT higher than z is received from the SCG RLC, the UE may simply determine in operation 1110 whether the highest COUNT received from the MCG RLC is higher than z. If the condition is satisfied in operation 1110, the UE may deliver, in operation 1115, SDUs preceding the next missing SDU with COUNT higher than z among the SDUs with COUNT higher than z, to the upper layer, determining that there is no possibility that the missing SDU [z] is received any longer, and may consider that SDUs with up to the highest COUNT among the SDUs delivered to the upper layer are in sequence. In operation 1120, the UE may wait until the next PDU is received, or the timer 1 associated with another missing SDU expires. If the condition is not satisfied in operation 1110, then the UE may wait until the next PDU is received in operation 1120.

In the present disclosure, the expression that the PDCP receives a PDCP PDU from the MCG RLC may have the same meaning as receiving a PDCP PDU reconfigured from received data from the MCG serving cell or the MCG-MAC. The expression that the PDCP receives a PDCP PDU from the SCG RLC may have the same meaning as receiving a PDCP PDU reconfigured from received data from the SCG serving cell or SCG-MAC.

As another operation of reordering PDCP PDUs according to an embodiment of the present disclosure, a method may be proposed, which includes performing timer-based reordering if a bearer is reconfigured from a single bearer to a multi-bearer, determining the time the reordering operation is to be stopped, using a timer if the bearer is reconfigured from a multi-bearer to a single bearer, and using the same timers as the two timers for performing the reordering and determining the stop time. The timer may be referred to as a reordering timer.

Figure 20:
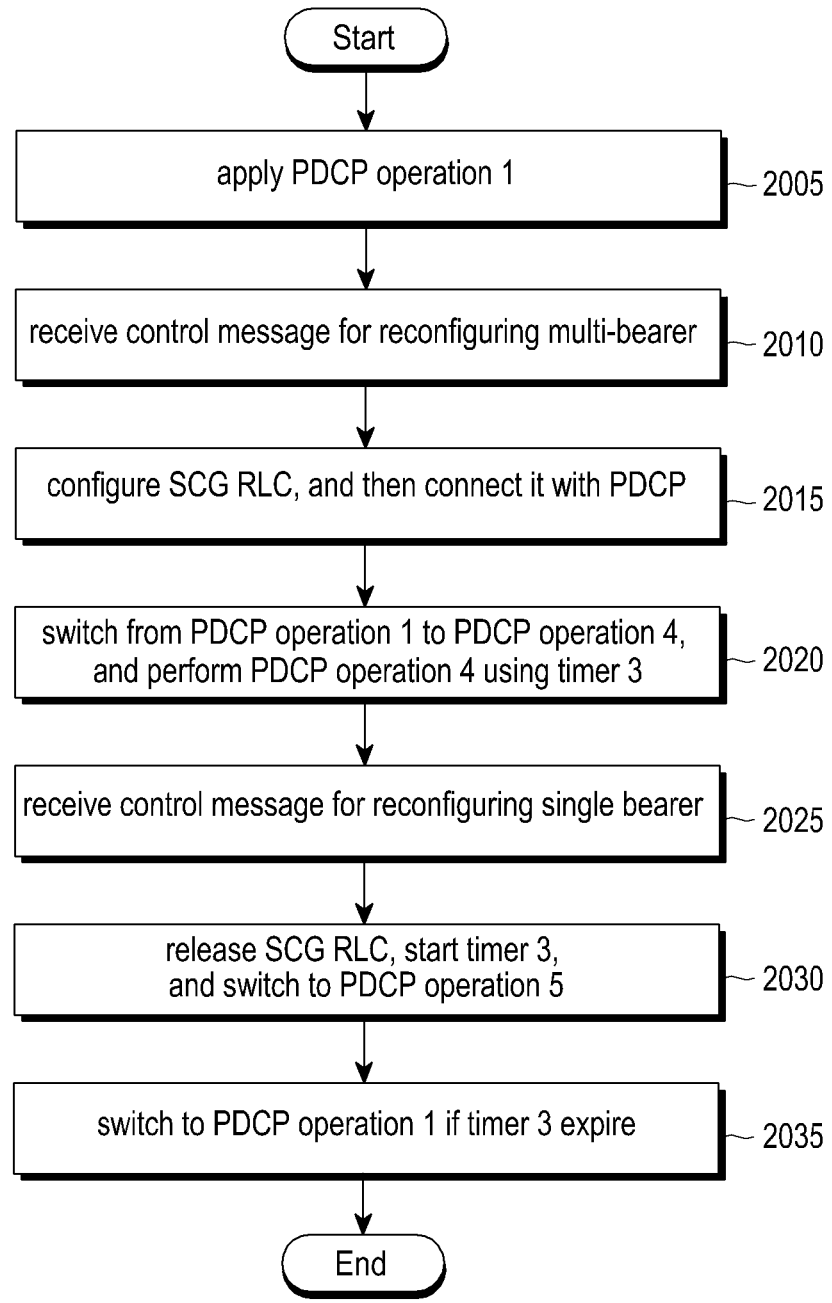
FIGS. 20, 24, 28, and 29 illustrate various examples of a UE operation during a bearer reconfiguration according to various embodiments of the present disclosure.

FIG. 20 illustrates a UE operation during a bearer reconfiguration according to an embodiment of the present disclosure. First, the UE may receive a control message for the bearer reconfiguration from the ENB, and then perform the bearer reconfiguration based on the control message.

Referring to FIG. 20, in operation 2005, a UE may apply the PDCP operation 1 for a bearer x which is a single bearer. In operation 2010, the UE may receive a control message for reconfiguring the bearer x into a multi-bearer. In operation 2015, the UE may create/configure an SCG RLC device to be connected with the multi-bearer depending on the configuration information indicated by the control message, and then connect the SCG RLC device with a PDCP device. In operation 2020, the UE may switch an operation of the PDCP device from the PDCP operation 1 to a PDCP operation 4. In other words, the UE may determine whether PDCP PDUs are reordered, beginning at a PDCP PDU that is first received after the bearer x was reconfigured into a multi-bearer, and then apply the PDCP operation 4 for determining whether to deliver the PDUs to the upper layer. Thereafter, by applying the PDCP operation 4 for the PDCP PDUs of the reconfigured bearer, the UE may perform an operation converting the PDCP PDUs into PDCP SDUs and delivering the in-sequence PDCP SDUs to the upper layer. The UE may use a timer 3 in determining whether PDCP PDUs are reordered.

Upon receiving a control message for instructing to reconfigure the multi-bearer into a single bearer in operation 2025, the UE may release the SCG RLC, switch from the PDCP operation 4 to a PDCP operation 5, and start a timer 3 in operation 2030. The UE may perform the PDCP operation 5 while the timer 3 is in operation, and if the timer 3 expires, the UE may stop the PDCP operation 5 and switch to the PDCP operation 1 in operation 2035.

As for the PDCP operation 1, the PDCP operation 4 and the PDCP operation 5, it may be understood that multiple detailed operations that should be applied for the PDCP PDUs delivered from the RLC device are listed in a series of order. Detailed operations constituting these operations and the order thereof are listed in Table 3 below. The following detailed operations may be conducted in the order from top to bottom.

TABLE 3

| PDCP operation 1 | PDCP operation 4 | PDCP operation 5 |
| --- | --- | --- |
| PDCP PDU reception Determine HFN/ COUNT of PDCP PDU. Discard PDU if it is received in duplicate. Process PDCP PDU into PDCP SDU Deliver the PDCP SDU and PDCP SDUs satisfying upper layer delivery condition 1 to the upper layer. Store the remaining SDUs in the buffer. | PDCP PDU reception Determine HFN/ COUNT of PDCP PDU. Discard PDU if it is received in duplicate. Process PDCP PDU into PDCP SDU Deliver PDCP SDU satisfying upper layer delivery condition 4 to the upper layer. Store the remaining SDUs in the PDCP buffer. | PDCP PDU reception Determine HFN/ COUNT of PDCP PDU. Discard PDU if it is received in duplicate. Process PDCP PDU into PDCP SDU Store PDCP SDU in the PDCP buffer. Deliver PDCP SDUs satisfying upper layer delivery condition 5 to the upper layer. Store the remaining SDUs in the PDCP buffer. |

Upper Layer Delivery Condition 5 of PDCP Operation 5

In the PDCP operation 5 that is applied while the timer 3 is in operation, if a sequence number of a received PDCP SDU is a sequence number of a missing PDCP SDU with the lowest sequence number/COUNT (e.g., if Received PDCP SN is the same as a value obtained by adding 1 to Last_Submitted_PDCP_RX_SN), the UE may deliver, to the upper layer, SDUs with consecutive sequence numbers/COUNTs up to the next missing PDCP SDU, including the received PDCP SDU. If the received PDCP SDU is not a missing PDCP SDU with the lowest sequence number, the PDCP SDU may be stored in the PDCP buffer. If the timer 3 expires, the UE may deliver all the PDCP SDUs that are currently stored in the PDCP buffer, to the upper layer in the order of COUNT, and store the sequence number of the last delivered PDCP SDU in Last_Submitted_PDCP_RX_SN.

Hereinafter, for convenience of description, the sequence number will be interchangeably used with COUNT.

Upper Layer Delivery Condition 4 of PDCP Operation 4

If a sequence number of a received PDCP SDU is a sequence number of a missing PDCP SDU with the lowest sequence number (e.g., if Received PDCP SN is the same as a value obtained by adding 1 to Last_Submitted_PDCP_RX_SN), the UE may deliver, to the upper layer, the sequentially received SDUs up to the next missing PDCP SDU, including the received PDCP SDU. If the received PDCP SDU is not a missing PDCP SDU with the lowest sequence number, the PDCP SDU may be stored in the PDCP buffer. If the timer 3 is in operation, the UE may wait until the next PDCP PDU is received, and if the timer 3 is not in operation, the UE may start the timer 3 and store, in Reordering_PDCP_RX_COUNT, COUNTs higher by 1 than the highest COUNT among the COUNTs of the PDCP SDUs that were received at the time. If the timer 3 expires, the UE may deliver PDCP SDUs with COUNT lower than Reordering_PDCP_RX_COUNT and PDCP SDUs associated with consecutive COUNTs higher than Reordering_PDCP_RX_COUNT, to the upper layer. For example, in a case where a PDCP SDU with Reordering_PDCP_RX_COUNT=N and COUNT=N+M is not received, and PDCP SDUs between N and [N+M] are all stored in the PDCP buffer, if the timer 3 expires, the UE may all the PDCP SDUs with COUNT lower than N and all the PDCP SDUs with COUNT between N and [N+M−1] including them, among the SDUs stored in the PDCP buffer, to the upper layer. In addition, the UE may store a sequence number of the last delivered PDCP SDU in Last_Submitted_PDCP_RX_SN.

Figure 21:
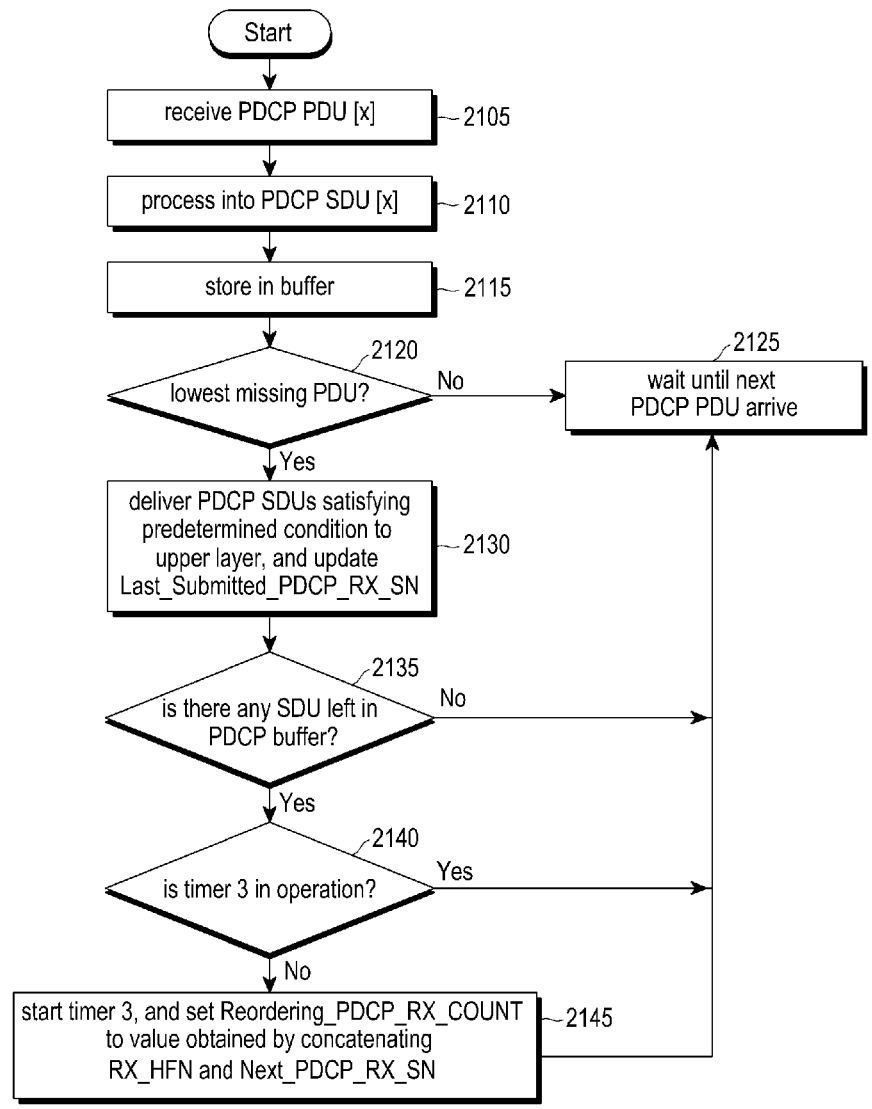
FIG. 21 illustrates an operation of a PDCP reception device operating with a multi-bearer according to an embodiment of the present disclosure.

FIG. 21 illustrates an operation of a PDCP reception device operating with a multi-bearer according to an embodiment of the present disclosure. This shows an operation of a PDCP reception operation that has received a packet from an RLC reception device.

Referring to FIG. 21, in operation 2105, the PDCP reception device may receive a PDCP PDU [x] from the RLC reception device. In operation 2110, the PDCP reception device may determine HFN of the received packet, using the received packet's sequence number (Received PDCP SN), Next_PDCP_RX_SN, Reordering_Window, and Last_Submitted_PDCP_RX_SN. The PDCP reception device may calculate COUNT associated with the PDCP packet by concatenating the determined HFN and the Received PDCP SN. In addition, the UE may decipher the PDCP PDU [x] by applying the COUNT, and decompress a header of an IP packet contained in the PDCP PDU [x] to reconfigure (i.e., convert or restore) the PDCP PDU [x] into a PDCP SDU [x]. If the PDCP SDU [x] is received in duplicate, the UE may discard the PDCP SDU [x] and wait until the next PDU is received. If the PDCP SDU [x] is not received in duplicate, the UE may store the PDCP SDU [x] in the PDCP buffer in the order of COUNT in operation 2115.

In operation 2120, the PDCP reception device may determine whether the received packet is a missing packet with the lowest COUNT. If the following condition is satisfied, meaning that the received packet is a missing packet with the lowest COUNT, the UE may proceed to operation 2130, and if the following condition is not satisfied, the UE may wait until the next PDCP PDU is received, in operation 2125. Condition for Determining Whether Received Packet is Missing Packet with Lowest COUNT Received $PDCP\ SN$=Last_Submitted_$PDCP\_RX\_SN$+1; or received $PDCP\ SN$=Last_Submitted_$PDCP\_RX\_SN$−Maximum_$PDCP\_SN$ In operation 2130, the PDCP reception device may deliver the PDCP SDUs associated with the consecutive COUNTs among the PDCP SDUs stored in the PDCP buffer to the upper layer in the order of COUNT, beginning at the COUNT of the received PDCP SDU, and set Last_Submitted_PDCP_RX_SN to a sequence number of the last delivered PDCP SDU. For example, if PDCP SDUs with COUNTs=[M], [M+1], [M+2], [M+4] and [M+5] are stored in the PDCP buffer and a PDCP SDU with COUNT=[M−1] is received, the PDCP reception device may deliver the PDCP SDUs with COUNTs=[M−1], [M], [M+1] and [M+2] to the upper layer.

In operation 2135, the PDCP reception device may determine whether at least one PDCP SDU is still stored in the PDCP buffer without being in sequence, after the PDCP reception device performed the above operation. If so, the PDCP reception device may proceed to operation 2140, and if not so, the PDCP reception device may proceed to operation 2125.

In operation 2140, the PDCP reception device may determine whether the timer 3 is in operation. If so, the PDCP reception device may proceed to operation 2125, and if the timer 3 is not in operation, the PDCP reception device may proceed to operation 2145.

In operation 2145, the PDCP reception device may start the timer 3, and set Reordering_PDCP_RX_COUNT to a value obtained by concatenating RX_HFN and Next_PDCP_RX_SN. In other others, the PDCP reception device may store, in Reordering_PDCP_RX_COUNT, a value higher by 1 than the highest COUNT that has been received so far. Thereafter, the PDCP reception device may proceed to operation 2125.

Figure 22:
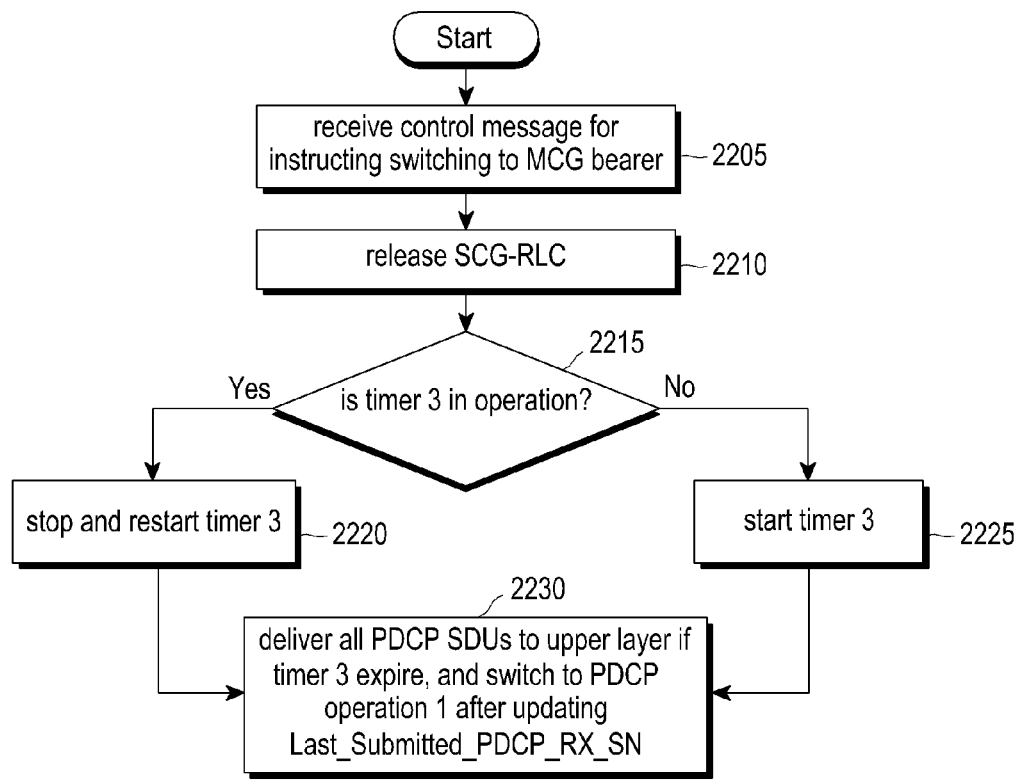
FIG. 22 illustrates an operation of a PDCP reception device that switches to a PDCP operation 5 when reconfiguring a bearer from a multi-bearer into a Master Cell Group (MCG) bearer according to an embodiment of the present disclosure.

FIG. 22 illustrates an operation of a PDCP reception device that switches to a PDCP operation 5 when reconfiguring a bearer from a multi-bearer into an MCG bearer according to an embodiment of the present disclosure.

An MCG bearer may be a bearer in which data is transmitted and received only through the MCG, among the single bearers. If the PDCP reception device releases the SeNB and the SCG while performing DC for reasons that the UE is out of the area of the SeNB, the multi-bearer may be reconfigured into an MCG bearer.

Referring to FIG. 22, in operation 2205, the PDCP reception device may receive a control message for instructing to reconfigure a multi-bearer into an MCG bearer. The control message may be, for example, an instruction to reconfigure a multi-bearer into an MCG bearer explicitly, and the control message may be a control message for releasing the last SCG cell, though the control message is not an explicit reconfiguration instruction.

In operation 2210, the PDCP reception device may release the SCG-RLC of a multi-bearer, assemble in PDCP PDUs all the PDCP SDUs that can be assembled in PDCP PDUs, among the RLC packets stored in the RLC, and then deliver the assembled PDCP PDUs to the upper layer.

In operation 2215, the PDCP reception device may determine whether the timer 3 is currently in operation. Operation 2215 may be performed, for example, as soon as the analysis of a control message for instructing switching to the MCG bearer is completed, or may be performed when a PDCP PDU is received from the released SCG-RLC.

If the timer 3 is not in operation, the PDCP reception device may proceed to operation 2225, and if the timer 3 is in operation, the PDCP reception device may proceed to operation 2220. In operation 2220, several operations are possible. The PDCP reception device may perform one of the following operations 1) to 3).

1) The PDCP reception device may stop the timer 3 that is currently in operation, restart the timer 3, and then proceed to operation 2230.

2) The PDCP reception device may restart the timer 3 after waiting for the expiry of the timer 3 that is currently in operation, and then proceed to operation 2230.

3) Upon receiving a PDCP PDU from the released SCG-RLC, the PDCP reception device may stop the timer 3 that is currently in operation, restart the timer 3, and then proceed to operation 2230. If no PDCP PDU is received from the released SCG-RLC, the PDCP reception device may keep the timer 3 that is currently in operation, and switch to the PDCP operation 1 at the time the timer 3 that is currently in operation expires, without proceeding to operation 2230.

In operation 2225, several operations are possible. The PDCP reception device may perform one of the following operations a) and b).

a) The PDCP reception device may start the timer 3, and proceed to operation 2230.

b) Upon receiving a PDCP PDU from the released SCG-RLC, the PDCP reception device may start the timer 3, and proceed to operation 2230. If no PDCP PDU is received from the released SCG-RLC, the PDCP reception device may immediately switch to the PDCP operation 1 without proceeding to operation 2230.

In operation 2230, the PDCP reception device may wait until the timer 3 expires, and if the timer 3 expires, the PDCP reception device may deliver all the PDCP SDUs which are currently stored in the PDCP buffer, to the upper layer in the order of COUNT, and set Last_Submitted_PDCP_RX_SN to a sequence number of the last delivered SDU. Thereafter, the PDCP reception device may switch to the PDCP operation 1.

Figure 23:
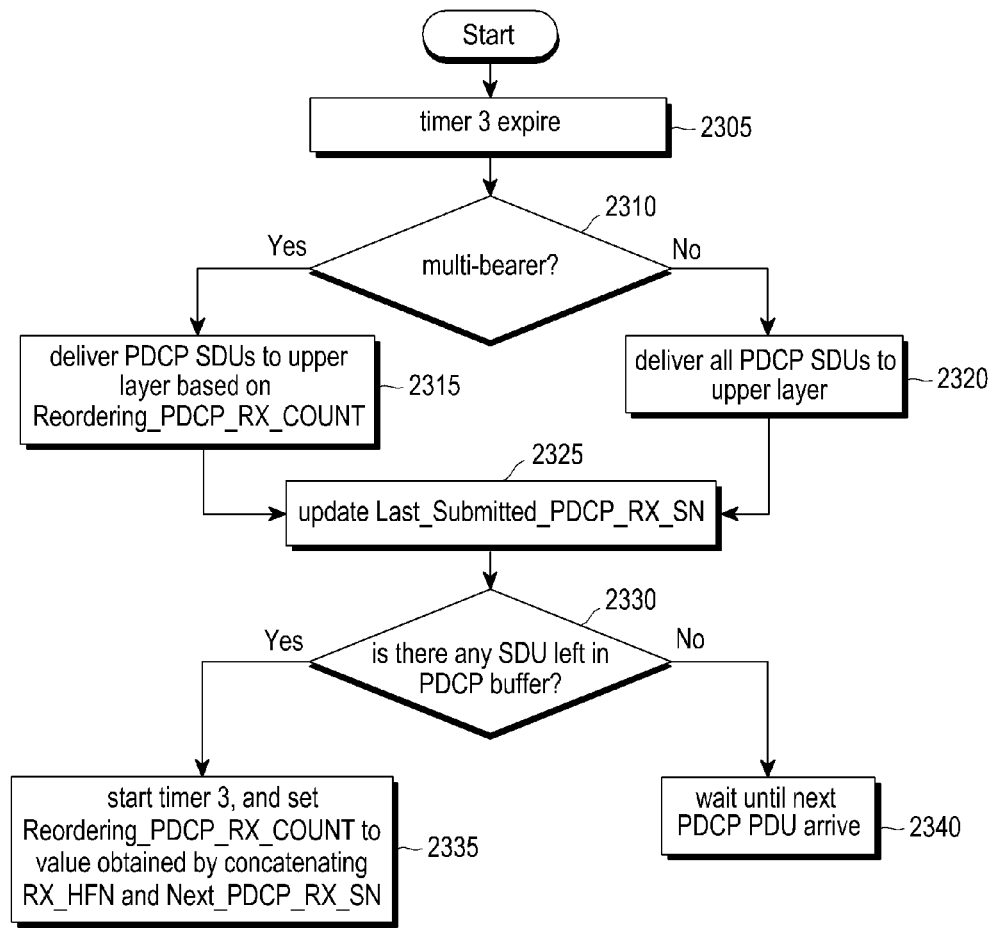
FIG. 23 illustrates an operation of a PDCP reception device performed when a timer 3 expires according to an embodiment of the present disclosure.

FIG. 23 illustrates an operation of a PDCP reception device performed when a timer 3 expires according to an embodiment of the present disclosure.

Referring to FIG. 23, in operation 2305, a timer 3 of the PDCP reception device of an arbitrary bearer may expire.

In operation 2310, the PDCP reception device may determine whether the bearer is a multi-bearer or an MCG bearer. If the bearer is a multi-bearer, the PDCP reception device may proceed to operation 2315, and if bearer is an MCG bearer, the PDCP reception device may proceed to operation 2320. Proceeding to operation 2320 means that the bearer is reconfigured from a multi-bearer into an MCG bearer, and since the timer 3 has expired, the PDCP reception device may stop the PDCP operation 5, and deliver all the PDCP SDUs currently stored in the PDCP buffer to the upper layer to switch to the PDCP operation 1.

Proceeding to operation 2315 means that the PDCP reception device operates in the PDCP operation 4, and the PDCP reception device may deliver all the PDCP SDUs with COUNTs lower than Reordering_PDCP_RX_COUNT and all the PDCP SDUs associated with consecutive COUNTs among the PDCP SDUs stored in the PDCP buffer to the upper layer beginning at the Reordering_PDCP_RX_COUNT based on the Reordering_PDCP_RX_COUNT. In other words, the PDCP reception device may deliver PDCP SDUs corresponding to the condition in Table 4 below to the upper layer.

TABLE 4 all stored PDCP SDU(s) with an associated COUNT value less than Reordering_PDCP_RX_COUNT;
all stored PDCP SDU(s) with consecutively associated COUNT value(s) starting from Reordering_PDCP_RX_COUNT;

The PDCP reception device may update the Last_Submitted_PDCP_RX_SN in operation 2325, and determine in operation 2330 whether at least one of the PDCP SDUs is left in the PDCP buffer. If at least one PDCP SDU is left in the PDCP buffer, the PDCP reception device may proceed to operation 2335, and if no PDCP SDU is left in the PDCP buffer, the PDCP reception device may proceed to operation 2340.

In operation 2335, the PDCP reception device may start the timer 3 and set Reordering_PDCP_RX_COUNT to a value obtained by concatenating RX_HFN and Next_PDCP_RX_SN.

In operation 2340, the PDCP reception device may wait until the next PDCP PDU arrives.

As shown in the above example, in determining whether a received PDCP SDU is a missing SDU, the PDCP reception device may use a variable that is managed by the sequence number of the PDCP SDU, and in determining a PDCP SDU that is to be delivered to the upper layer as the timer 3 expires, the PDCP reception device may use a variable that is managed by the COUNT.

As another operation of reordering PDCP PDUs according to an embodiment of the present disclosure, a method may be proposed, which includes performing timer-based reordering if a bearer is reconfigured from a single bearer to a multi-bearer, determining the time the reordering operation is to be stopped, using a timer if the bearer is reconfigured from a multi-bearer to a single bearer, and determining the amount of data stored in a reordering buffer and whether the lower layer is reestablished, in order to determine the stop time.

Figure 24:
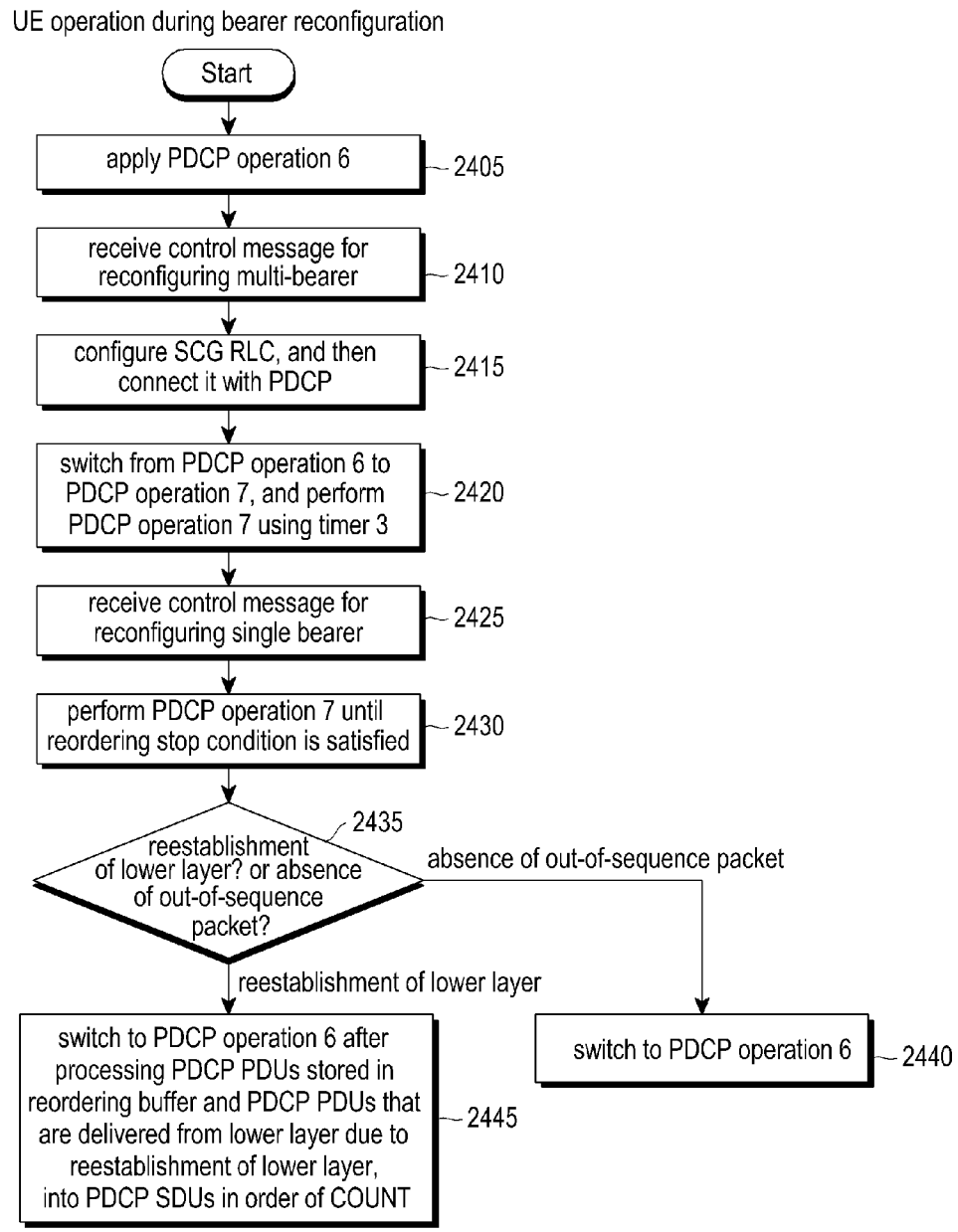

FIG. 24 illustrates a UE operation during a bearer reconfiguration according to an embodiment of the present disclosure.

Referring to FIG. 24, in operation 2405, the UE may apply a PDCP operation 6 for a bearer x which is a single bearer. In operation 2410, the UE may receive a control message for reconfiguring the bearer x into a multi-bearer. In operation 2415, the UE may generate/configure an SCG RLC device to be connected with the multi-bearer depending on the configuration information indicated by the control message, and then connect the SCG RLC device with the PDCP device. In operation 2420, the UE may switch the operation of the PDCP device from the PDCP operation 6 to a PDCP operation 7. The PDCP operation 6 will be described later. In other words, the UE may apply the PDCP operation 7 for PDCP PDUs in order beginning at the PDCP PDU that is first received after the bearer is reconfigured into a multi-bearer, and the PDCP operation 7 will be described later. Thereafter, by applying the PDCP operation 7 for the PDCP PDUs of the bearer that is reconfigured into the multi-bearer, the UE may determine whether the received PDCP PDUs are reordered, convert the in-sequence PDCP PDUs into PDCP SDUs, and deliver the PDCP SDUs to the upper layer. In determining whether the PDCP PDUs are in sequence, the UE may use a timer 3.

Upon receiving a control message for instructing to reconfigure the multi-bearer into a single bearer in operation 2425, the UE may release the SCG RLC in operation 2430. Because of the release of the SCG RLC, out-of-sequence PDCP PDUs may be delivered to the PDCP device, and the PDCP device may continue to apply the PDCP operation 7 for the PDCP PDUs. The PDCP operation 7 may be applied until a reordering stop condition is satisfied, and if the reordering stop condition is satisfied, the UE may determine in operation 2435 whether the reordering stop condition is satisfied due to 'reestablishment of lower layer' or 'absence of out-of-sequence packet'. If the reordering stop condition is satisfied due to 'absence of out-of-sequence packet', the UE may switch to the PDCP operation 6 in operation 2440, and then end the process. On the other hand, if the reordering stop condition is satisfied due to 'reestablishment of lower layer', the UE may proceed to operation 2445. The lower layer may be an MCG-RLC device. In this case, since the UE has already switched to the single bearer, the PDCP device may be connected only with one RLC device, and the only RLC device may be reestablished. In operation 2445, the UE may order the PDCP PDUs currently stored in a reordering buffer and the PDCP PDUs delivered due to the reestablishment of the lower layer, in the order of COUNT, process the PDCP PDUs into PDCP SDUs in the order of COUNT, switch to the PDCP operation 6, and then end the process. In this case, the PDCP device may process the PDCP PDUs stored in the reordering buffer as if they are PDCP PDUs delivered due to the reestablishment of the lower layer.

As for the PDCP operation 6 and the PDCP operation 7, it may be understood that multiple detailed operations that should be applied for the PDCP PDUs delivered from the RLC device are listed in a series of order. Detailed operations constituting these operations and the order thereof are listed in Table 5 below. The following detailed operations may be conducted in the order from top to bottom.

TABLE 5

| PDCP operation 6 | PDCP operation 7 |
|---|---|
| PDCP PDU reception | PDCP PDU reception |
| Determine HFN/COUNT of PDCP PDU. Process PDU received in duplicate into PDCP SDU, and then discard PDU received in duplicate | Determine HFN/ COUNT of PDCP PDU. |
| Process PDCP PDU into PDCP SDU | Process PDCP PDU satisfying upper layer delivery condition 7 into PDCP SDU, deliver PDCP SDU to the upper layer, and store the remaining PDUs in PDCP buffer |
| Deliver the PDCP SDU and PDCP SDUs satisfying upper layer delivery condition 1 to the upper layer. Store the remaining SDUs in the buffer. | |

While the UE determines in the PDCP operation 6 whether duplicate reception happens, the UE may not determine in the PDCP operation 7 whether duplicate reception happens. This is because in a case where the PDCP operation 6 is applied, the packet that has already been received after a handover is likely to be received in duplicate, but there is no such possibility in the PDCP operation 7. A PDU received in duplicate may be processed into an SDU before being discarded, in order to update a header decompression context. In a situation where the PDCP operation 7 is applied, it is not necessary for the UE to perform an operation of determining a packet received in duplicate, processing the packet received in duplicate into an SDU, and then discarding the packet received in duplicate.

In the PDCP operation 6, the UE may first process received PDUs into SDUs, and then store out-of-sequence SDUs in a buffer and deliver in-sequence SDUs to the upper layer. On the other hand, in the PDCP operation 7, the UE may first determine whether received PDUs are in sequence, and only for the in-sequence PDUs, the UE may process the PDUs into SDUs and deliver the SDUs to the upper layer. The UE may store the out-of-sequence PDUs in the buffer without processing them into SDUs. The reason is as follows.

In a case where the PDCP operation 6 is applied, if a packet [X] is received, the UE may not determine whether the received packet [X] is reordered, since a packet with a sequence number lower than that of the packet [X] is no longer received, so there is no problem with a header decompression operation even though the UE processes the received packet into SDUs. However, in a case where the PDCP operation 7 is applied, since out-of-sequence packets may be received at all times, the UE should process the received packets into SDUs after first reordering the received packets, in order to prevent errors in the header decompression operation.

An upper layer delivery condition 7 of the PDCP operation 7 may be for PDCP PDUs instead of PDCP SDUs, and the upper layer delivery condition 7 may be the same as the upper layer delivery condition 4 except that the packet satisfying the condition is delivered not to the upper layer, but to the PDCP PDU processing device.

Upper Layer Delivery Condition 7 of PDCP Operation 7

If a sequence number of a received PDCP PDU is a sequence number of a missing PDCP PDU with the lowest sequence number (e.g., if Received PDCP SN is the same as a value obtained by adding 1 to Last_Submitted_PDCP_RX_SN), the UE may deliver the sequentially received PDUs up to the next missing PDCP PDU, including the received PDCP PDU, to a processing device (e.g., a header decompression device or a deciphering device). The deciphering device may refer to a device for deciphering received PDCP PDUs. The PDUs may be delivered to the upper layer after being processed into SDUs in the processing device. If the received PDCP PDU is not a missing PDCP PDU with the lowest sequence number, the PDCP PDU may be stored in the PDCP buffer. If the timer 3 is in operation, the UE may wait until the next PDCP PDU is received, and if the timer 3 is not in operation, the UE may start the timer 3, and store, in Reordering_PDCP_RX_COUNT, COUNTs higher by 1 than the highest COUNT among the COUNTs of the PDCP PDUs that were received at the time. If the timer 3 expires, the UE may deliver the PDCP PDUs with COUNT lower than Reordering_PDCP_RX_COUNT and the PDCP PDUs associated with consecutive COUNTs higher than Reordering_PDCP_RX_COUNT, to the processing device. The UE may store a sequence number of the last delivered PDCP SDU in Last_Submitted_PDCP_RX_SN.

If the multi-bearer is reconfigured into a single bearer, the UE should switch the PDCP operation from the PDCP operation 7 to the PDCP operation 6. In an embodiment of the present disclosure, the PDCP device may continue to apply the PDCP operation 7 until the reordering stop condition is satisfied after the multi-bearer is reconfigured into a single bearer, and if the reordering stop condition is satisfied, the PDCP device may switch to the PDCP operation 6. The reordering stop condition may be satisfied, if a lower layer is reestablished (reestablishment of lower layer) or there is no more PDU to be reordered (absence of out-of-sequence packet).

The establishment of a lower layer may occur if a UE that was operating with, for example, a single bearer receives a handover instruction. In this case, the out-of-sequence PDCP PDUs stored in the MCG-RLC device are all delivered to the PDCP reception device, and the UE may switch to the PDCP operation 6 of processing the out-of-sequence PDCP PDUs currently stored in the PDCP buffer and the PDCP PDUs delivered from the lower layer, into PDCP SDUs in sequence in the order of COUNT, delivering the in-sequence SDUs to the upper layer, storing the out-of-sequence SDUs in the buffer, and then determining the SDUs to be delivered to the upper layer, based on the sequence numbers of the PDUs received from the newly established lower layer.

The expression that there is no more PDU to be reordered may refer to a case where as a result of the reordering operation using the timer 3, there is no more missing PDU after the UE processes the PDUs, which were regarded to be out of sequence by the missing PDUs as the timer 3 associated with the missing PDUs expires, into SDUs, and then delivers the SDUs to the upper layer. For example, if a value obtained by adding 1 to Last_Submitted_PDCP_RX_SN is the same as Next_PDCP_RX_SN, it may mean that there is no more missing PDU, or there is no more out-of-sequence PDU. Since the expression that the condition is satisfied means that there is no more PDU stored in the PDCP buffer, the PDCP reception device may immediately switch to the PDCP operation 6.

Figure 25:
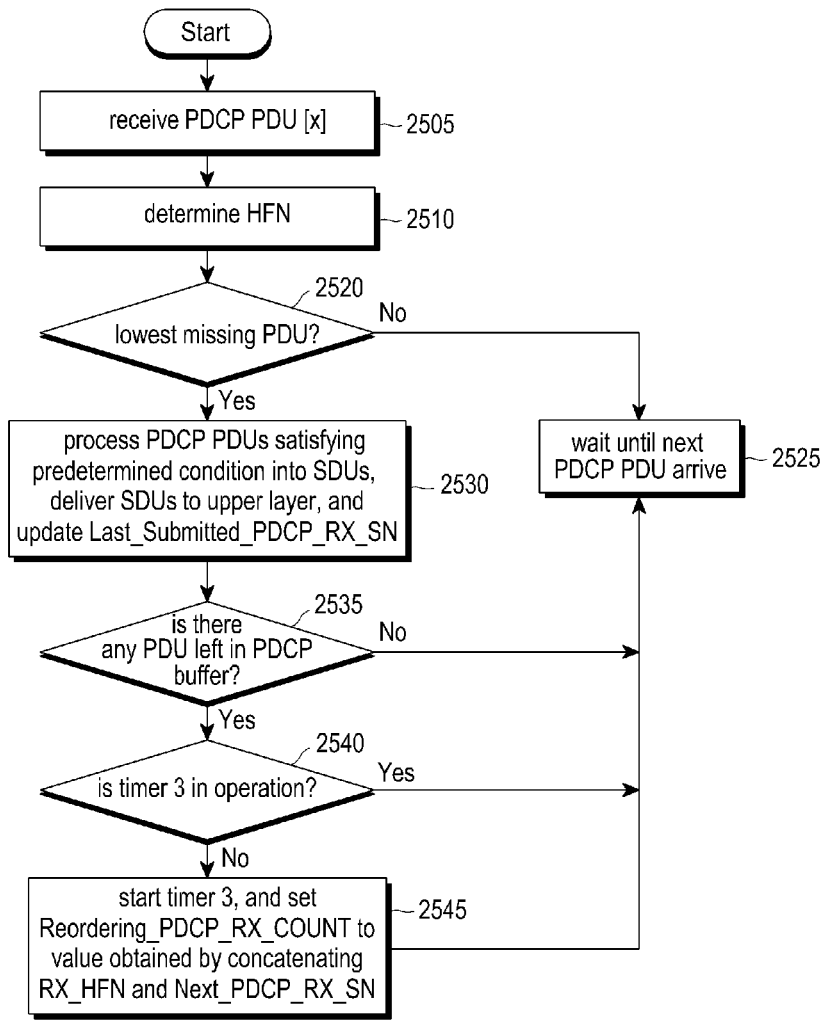
FIG. 25 illustrates a PDCP operation 7 of a PDCP reception device operating with a multi-bearer according to an embodiment of the present disclosure.

The PDCP operation 7 is the same as the PDCP operation 4 shown in FIG. 25 except for the following, so a detailed description thereof will be omitted.

FIG. 25 illustrates a PDCP operation 7 of a PDCP reception device operating with a multi-bearer according to an embodiment of the present disclosure. An example of FIG. 25 shows an operation of a PDCP reception device that has received a packet from an RLC reception device.

Referring to FIG. 25, in operation 2505, the PDCP reception device may receive a PDCP PDU [x] from the RLC reception device. In operation 2510, the PDCP reception device may determine HFN of the received packet, using the received packet's sequence number (Received PDCP SN), Next_PDCP_RX_SN, Reordering_Window, and Last_Submitted_PDCP_RX_SN. The PDCP reception device may calculate COUNT associated with the PDCP packet by concatenating the determined HFN and the Received PDCP SN. By applying the COUNT, the PDCP reception device may determine whether the received packet is a missing packet with the lowest COUNT.

If the following condition is satisfied in operation 2520, meaning that the received packet is a missing packet with the lowest COUNT, the PDCP reception device may proceed to operation 2530, and if the following condition is not satisfied, the PDCP reception device may wait in operation 2525 until the next PDCP PDU is received.

Condition for Determining Whether Received Packet is Missing Packet with Lowest COUNT Received *PDCP*
 *SN*=Last_Submitted_*PDCP_RX_SN*+1; or received *PDCP SN*=Last_Submitted_*PDCP_RX_SN*−
 Maximum_*PDCP_SN*

In operation 2530, the PDCP reception device may process PDCP PDUs associated with consecutive COUNTs among the PDCP PDUs stored in the PDCP buffer into PDCP SDUs in the order of COUNT, beginning at the COUNT of the received PDCP PDU, and then deliver the PDCP SDUs to the upper layer, and may set Last_Submitted_PDCP_RX_SN to a sequence number of the last delivered PDCP SDU. For example, if PDCP PDUs with COUNTs=[M], [M+1], [M+2], [M+4] and [M+5] are stored in the PDCP buffer and a PDCP PDU with COUNT=[M−1] is received, the PDCP reception device may deliver PDCP PDUs with COUNTs=[M−1], [M], [M+1] and [M+2] to the next processing device to convert them into PDCP SDUs, and then deliver the PDCP SDUs to the upper layer. In operation 2535, the PDCP reception device may determine whether at least one PDCP PDU is still stored in the PDCP buffer without being in sequence, after the PDCP reception device performed the above operation. If so, the PDCP reception device may proceed to operation 2540, and if not so, the PDCP reception device may proceed to operation 2525.

In operation 2540, the PDCP reception device may determine whether a timer 3 is in operation. If so, the PDCP reception device may proceed to operation 2525, and if not so, the PDCP reception device may proceed to operation 2545. In operation 2545, the PDCP reception device may start the timer 3, and set Reordering_PDCP_RX_COUNT to a value obtained by concatenating RX_HFN and Next_PDCP_RX_SN. In other words, the PDCP reception device may store, in Reordering_PDCP_RX_COUNT, a value higher by 1 than the highest COUNT that has been received so far. Thereafter, the PDCP reception device may proceed to operation 2525.

Figure 26:
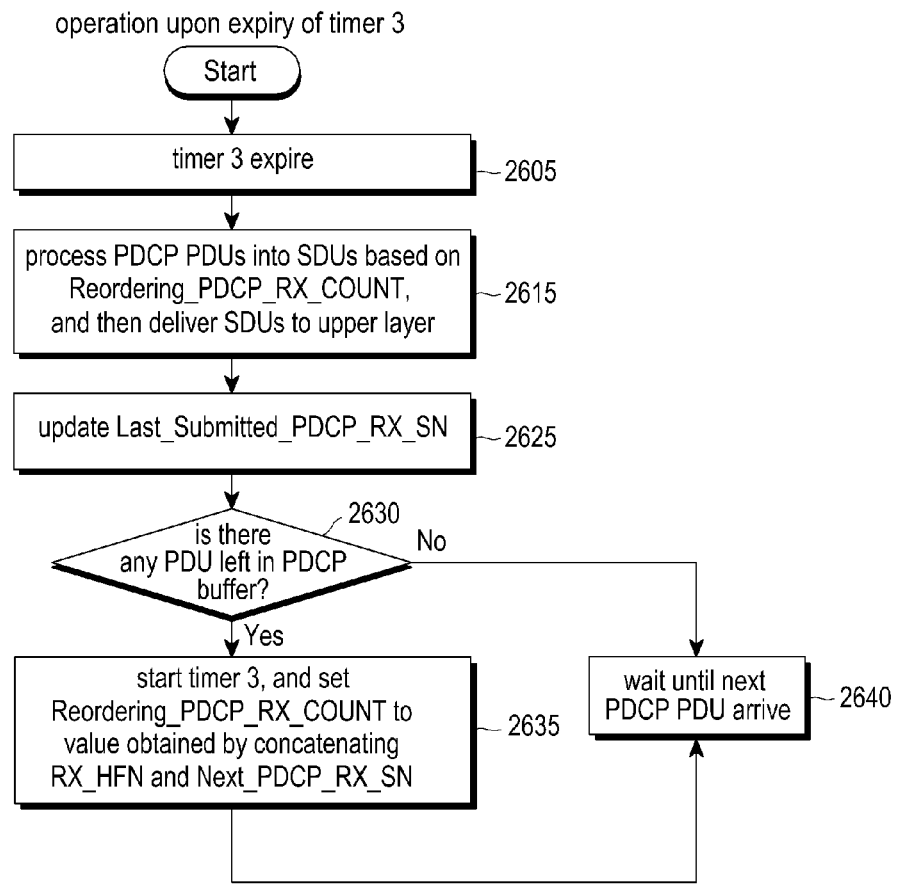
FIG. 26 illustrates an operation of a PDCP reception device performed when a timer 3 expires according to an embodiment of the present disclosure.

FIG. 26 illustrates an operation of a PDCP reception device performed when a timer 3 expires according to an embodiment of the present disclosure.

Referring to FIG. 26, in operation 2605, a timer 3 of a PDCP reception device of an arbitrary bearer expires. In operation 2615, the PDCP reception device may deliver all the PDCP PDUs with COUNTs lower than Reordering_PDCP_RX_COUNT and the PDCP PDUs associated with consecutive COUNTs among the PDCP PDUs stored in the PDCP buffer into PDCP SDUs in the order of COUNT, beginning at the Reordering_PDCP_RX_COUNT based on the Reordering_PDCP_RX_COUNT, and then deliver the PDCP SDUs to the upper layer. In other words, the PDCP reception device may process PDCP PDUs corresponding to the condition in Table 6 below into PDCP SDUs, and then deliver the PDCP SDUs to the upper layer.

TABLE 6 all stored PDCP PDU(s) with an associated COUNT value less than Reordering_PDCP_RX_COUNT;
all stored PDCP PDU(s) with consecutively associated COUNT value(s) starting from Reordering_PDCP_RX_COUNT;

The PDCP reception device may update Last_Submitted_PDCP_RX_SN in operation 2625, and determine in operation in operation 2630 whether at least one PDCP PDU is left in the PDCP buffer. If at least one PDCP PDU is left in the PDCP buffer, the PDCP reception device may proceed to operation 2635, and if at least one PDCP PDU is not left in the PDCP buffer, the PDCP reception device may proceed to operation 2640. In operation 2635, the PDCP reception device may start a timer 3, and set Reordering_PDCP_RX_COUNT to a value obtained by concatenating RX_HFN and Next_PDCP_RX_SN. In operation 2640, the PDCP reception device may wait until the next PDCP PDU arrives.

As another operation of reordering PDCP PDUs according to an embodiment of the present disclosure, a method may be proposed, in which a bearer may be reconfigured from a single bearer to a multi-bearer, and the PDCP reception device may operate with the multi-bearer. In this embodiment, if a bearer is reconfigured from a single bearer to a multi-bearer, the UE may process in-sequence PDUs among the received PDCP PDUs into PDCP SDUs, and then deliver the PDCP SDUs to the upper layer, and may process out-of-sequence PDCP PDUs into half PDCP SDUs, and then store the half PDCP SDUs in the buffer until they are in sequence. Thereafter, if the PDCP PDUs stored in the buffer are in sequence, the UE may convert the half PDCP SDUs into PDCP SDUs and deliver the PDCP SDUs to the upper layer. The PDCP processing operation may include deciphering and header decompression, and the received PDCP PDUs may be converted into PDCP SDUs after going through the entire operation (deciphering and header decompression). Here, the term 'half PDCP SDU' may refer to a packet obtained by applying only some of the PDCP processing operation to the PDCP PDU (e.g., a packet to which deciphering is applied, but header decompression is not applied).

The reason for deciphering a packet received on the multi-bearer, and then storing the deciphered packet in the reordering buffer is that if an SCG of the UE is changed, a deciphering key may be changed, and in this case, if a PDCP PDU that has not been deciphered yet is stored in the PDCP device to be reordered, the UE should apply different security keys to the previous PDCP PDU and the newly received PDCP PDU, resulting in an increase in complexity.

Figure 28:
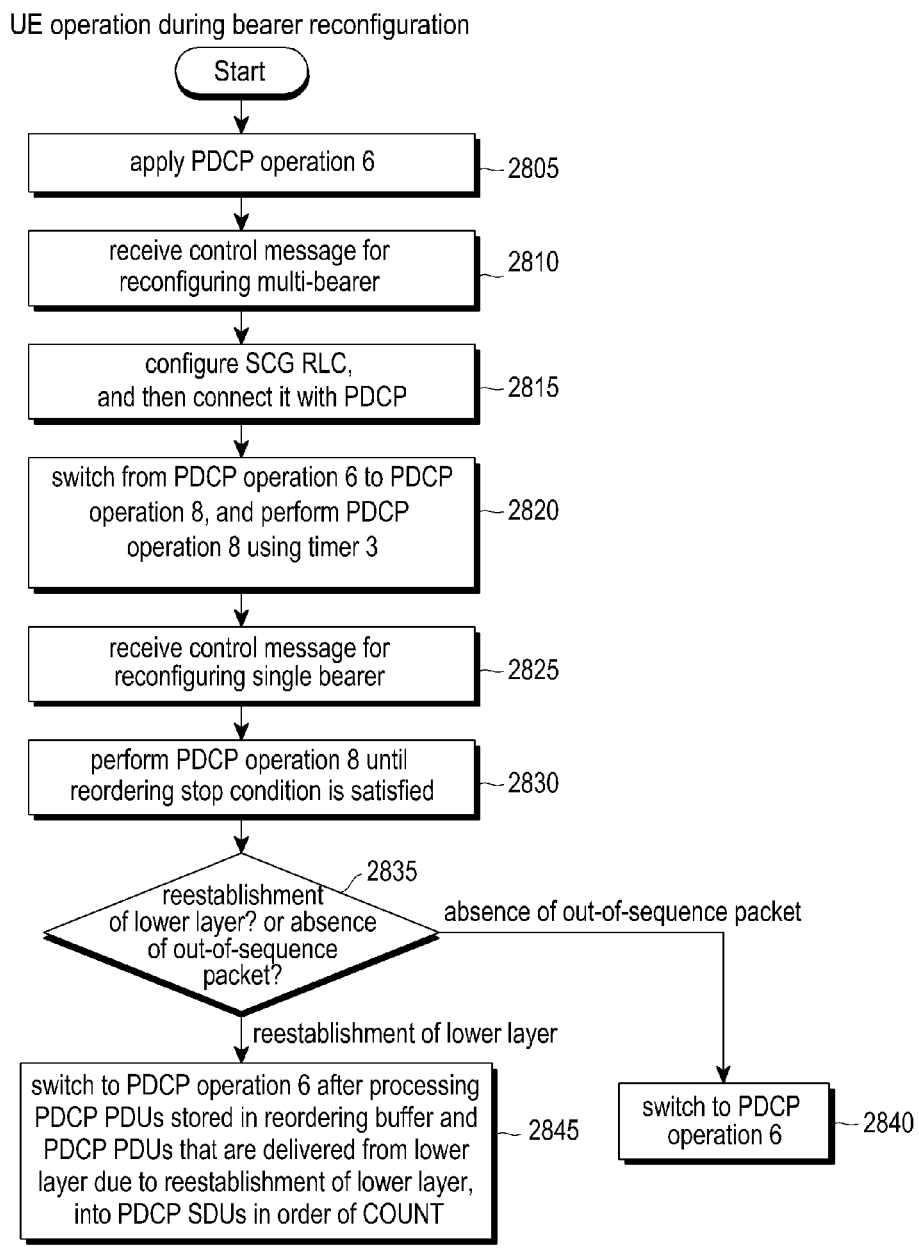

FIG. 28 illustrates a UE operation during a bearer reconfiguration according to an embodiment of the present disclosure.

Referring to FIG. 28, in operation 2805, the UE may apply the PDCP operation 6 for a bearer x which is a single bearer. In operation 2810, the UE may receive a control message for reconfiguring the bearer x into a multi-bearer. In operation 2815, the UE may generate/configure an SCG RLC device to be connected with the multi-bearer depending on the configuration information indicated by the control message, and then connect the SCG RLC device with the PDCP device. In operation 2820, the UE may switch an operation of the PDCP device from the PDCP operation 6 to a PDCP operation 8. In other words, the UE may apply the PDCP operation 8 for PDCP PDUs in sequence, beginning at the PDCP PDU that is first received after the bearer is reconfigured into the multi-bearer.

Specifically, by applying the PDCP operation 8 for the PDCP PDUs of the bearer that is reconfigured into the multi-bearer, the UE may process in-sequence PDCP PDUs among the received PDCP PDUs into PDCP SDUs, and deliver the PDCP SDUs to the upper layer, and may process out-of-sequence PDCP PDUs into half PDCP SDUs, store the half PDCP SDUs in the PDCP reordering buffer, and then start a timer 3 if necessary.

Thereafter, upon receiving a control message for instructing to reconfigure the multi-bearer into a single bearer in operation 2825, the UE may release the SCG RLC in operation 2830. Because of the release of the SCG RLC, out-of-sequence PDCP PDUs may be delivered to the PDCP device, and the PDCP device may continue to apply the PDCP operation 8 for the PDCP PDUs. The PDCP operation 8 may be applied until a reordering stop condition is satisfied, and if the reordering stop condition is satisfied, the UE may determine in operation 2835 whether the reordering stop condition is satisfied due to 'reestablishment of lower layer' or 'absence of out-of-sequence packet'. If it is determined in operation 2835 that the reordering stop condition is satisfied due to 'absence of out-of-sequence packet', the UE may switch to the PDCP operation 6 in operation 2840, and then end the process. On the other hand, if it is determined in operation 2835 that the reordering stop condition is satisfied due to 'reestablishment of lower layer', the UE may proceed to operation 2845. Here, the lower layer may be, for example, an MCG-RLC device. Since the UE has already switched to the single bearer, the PDCP device may be connected only with one RLC device, and the only RLC device may be the lower layer. In operation 2845, the UE may determine whether there is in-sequence PDCP PDU or half PDCP SDU, referring to the sequence numbers or COUNTs of the PDCP PDUs delivered due to the reestablishment of the lower layer and the half PDCP SDUs stored in the reordering buffer, and if there is in-sequence PDCP PDU or half PDCP SDU, the UE may convert the in-sequence PDCP PDU or half PDCP SDU into a PDCP SDU by applying the necessary PDCP processing operation, and then deliver the PDCP SDU to the upper layer in the order of COUNT. The UE may convert out-of-sequence half PDCP SDUs and PDCP PDUs into PDCP SDUs, and then store the PDCP SDUs in the PDCP reordering buffer in the order of COUNT. In this case, the out-of-sequence PDCP SDUs may be stored in the PDCP reordering buffer in which the half PDCP SDUs were stored. In some cases, the half PDCP SDUs and SDUs may be stored in the same storage space. In this case, the half PDCP SDUs and PDCP SDUs may be stored altogether in the order of COUNT, rather than they are stored separately (e.g., the half PDCP SDUs may be stored among themselves and the PDCP SDUs may be stored among themselves). In addition, the UE may switch to the PDCP operation 6.

The fact that it is determined in operation 2845 that there is in-sequence PDCP PDU or half PDCP SDU may refer to the fact that there is PDCP PDU or half PDCP SDU with a sequence number higher by 1 than Last_Submitted_PDCP_RX_SN among the PDCP PDUs or half PDCP SDUs.

As for the PDCP operation 6 and the PDCP operation 8, it may be understood that multiple detailed operations that should be applied for the PDCP PDUs delivered from the RLC device are listed in a series of order. Detailed operations constituting the PDCP operations 6 and 8 and the order thereof are listed in Table 7 below. In Table 7, detailed operations may be conducted in the order from top to bottom.

TABLE 7

| PDCP operation 6 | PDCP operation 8 |
| --- | --- |
| PDCP PDU reception | PDCP PDU reception |
| Determine HFN/COUNT of PDCP PDU. Process a PDU received in duplicate into PDCP SDU, and then discard PDU received in duplicate Process PDCP PDU into PDCP SDU Deliver the PDCP SDU and PDCP SDUs satisfying upper layer delivery condition 1 to the upper layer. Store the remaining SDUs in the buffer. | Determine HFN/ COUNT of PDCP PDU. Discard a PDU received in duplicate without processing it into PDCP SDU. Process PDCP PDU into half PDCP SDU Process half PDCP SDU satisfying upper layer delivery condition 8 into PDCP SDU, deliver PDCP SDU to the upper layer, and store the remaining half PDCP SDUs in the PDCP buffer. |

In the PDCP operation 6, the UE may first process received PDUs into SDUs, and then store out-of-sequence SDUs in a buffer and deliver in-sequence SDUs to the upper layer. On the other hand, in the PDCP operation 8, the UE may convert received PDUs into half PDCP SDUs by applying only a predetermined PDCP processing operation (e.g., deciphering) to the received PDUs, and then determines whether the PDUs are in sequence. In addition, the UE may process only the in-sequence half PDCP SDUs into PDCP SDUs by applying the remaining PDCP processing operation (e.g., header decompression) for the in-sequence half PDCP SDUs, and then deliver the PDCP SDUs to the upper layer, and may store the out-of-sequence half PDCP SDUs in the buffer without converting them into PDCP SDUs.

The following upper layer delivery condition 8 of the PDCP operation 8 may be for half PDCP SDUs instead of PDCP SDUs, and the upper layer delivery condition 8 may be the same as the upper layer delivery condition 7 except that the packet satisfying the condition is delivered not to a first PDCP processing device (e.g., a deciphering device), but to a second PDCP processing device (e.g., a header decompression device). In some cases, not only the out-of-sequence half PDCP SDUs but also the out-of-sequence PDCP SDUs may be stored in the PDCP reception device. In this case, in applying the upper layer delivery condition 8, the PDCP reception device may consider not only the half PDCP SDUs but also the PDCP SDUs.

Upper Layer Delivery Condition 8 of PDCP Operation 8

If a sequence number of a received PDCP PDU is a sequence number of a missing PDCP with the lowest sequence number (e.g., if Received PDCP SN is the same as a value obtained by adding 1 to Last_Submitted_PDCP_RX_SN), the UE may deliver consecutive half PDCP SDUs up to the next missing PDCP PDU (or half PDCP SDUs corresponding thereto), including the received PDCP PDU (or a half PDCP SDU corresponding thereto) to the next PDCP processing device (e.g., a header decompression device). The half PDCP SDUs may be processed into PDCP SDUs in the next PDCP processing device, and then delivered to the upper layer. If the received PDCP PDU is not a missing PDCP PDU with the lowest sequence number, the PDCP PDU may be processed into a half PDCP SDU, and then stored in the PDCP buffer. If the timer 3 is in operation, the UE may wait until the next PDCP PDU is received, and if the timer 3 is not in operation, the UE may start the timer 3, and store, Reordering_PDCP_RX_COUNT, COUNTs higher by 1 than the highest COUNT among the COUNTs of the PDCP PDUs that were received at the time. If the timer 3 expires, the UE may deliver half PDCP SDUs with COUNTs lower than Reordering_PDCP_RX_COUNT and half PDCP SDUs associated with consecutive COUNTs higher than Reordering_PDCP_RX_COUNT, to the next PDCP processing device (e.g., a header decompression device). The UE may deliver the PDCP SDUs processed in the header decompression device to the upper layer, and store a sequence number of the last delivered PDCP SDU in Last_Submitted_PDCP_RX_SN.

If the multi-bearer is reconfigured into a single bearer, the UE should switch the PDCP operation from the PDCP operation 8 to the PDCP operation 6. In an embodiment of the present disclosure, the PDCP processing device may continue to apply the PDCP operation 8 until the reordering stop operation is satisfied after the multi-bearer is reconfigured into a single bearer, and if the reordering stop operation is satisfied, the PDCP processing device may switch to the PDCP operation 6. The reordering stop condition may be satisfied, if a lower layer is reestablished (reestablishment of lower layer) or there is no more PDU to be reordered (absence of out-of-sequence packet).

The establishment of a lower layer may occur if a UE that was operating with, for example, a single bearer receives a handover instruction. In this case, the out-of-sequence PDCP PDUs stored in the MCG-RLC device are all delivered to the PDCP reception device, and the UE may switch to the PDCP operation 6 of processing the out-of-sequence half PDCP SDUs currently stored in the PDCP buffer and the PDCP PDUs delivered from the lower layer, into PDCP SDUs in sequence in the order of COUNT, delivering the in-sequence SDUs to the upper layer, storing the out-of-sequence SDUs in the buffer, and then determining the SDUs to be delivered to the upper layer, based on the sequence numbers of the PDUs received from the newly established lower layer.

The expression that there is no more PDU to be reordered may refer to a case where as a result of the reordering operation using the timer 3, there is no more missing PDU after the UE processes the half PDCP SDUs, which were regarded to be out of sequence by the missing PDUs as the timer 3 associated with the missing PDUs expires, into SDUs, and then delivers the SDUs to the upper layer. Otherwise, the expression that there is no more PDU to be reordered may refer to a case where a PDCP PDU delivered from the lower layer is a missing PDCP PDU with the lowest sequence number. For example, after the bearer is reconfigured from a multi-bearer to a single bearer, if a sequence number of the received PDCP PDU is the same as a value obtained by adding 1 to Last_Submitted_PDCP_RX_SN and Last_Submitted_PDCP_RX_SN is the same as Next_PDCP_RX_SN, it may mean that there is no more missing PDU, or there is no more out-of-sequence half PDCP SDU. Since the expression that the condition is satisfied means that there is no more half PDCP SDU stored in the PDCP buffer, the PDCP reception device may immediately switch to the PDCP operation 6.

In an embodiment of the present disclosure, an operation performed by the PDCP reception device when a bearer is reconfigured will be described.

Reconfiguration of a bearer may refer to, for example, a case where an MCG bearer is reconfigured into a multi-bearer, a multi-bearer is reconfigured into an MCG bearer, or a multi-bearer is reconfigured into a multi-bearer.

During the bearer reconfiguration, the UE may apply a PDCP operation 9 and a PDCP operation 10 alternately or sequentially.

Reference will be made to Table 8 below to describe examples of the PDCP operation 9 and the PDCP operation 10.

TABLE 8

| PDCP operation 9: operation for single bearer | PDCP operation 10: operation for multi-bearer |
| --- | --- |
| PDCP PDU reception Determine HFN/COUNT of PDCP PDU. Process PDU received in duplicate into PDCP SDU, and then discard PDU received in duplicate Process PDCP PDU into PDCP SDU Deliver PDCP PDUs satisfying condition in Table 9 to the upper layer, if received PDU is first PDU. Deliver PDCP PDUs satisfying condition in Table 10 to the upper layer, if received PDU is second PDU. | PDCP PDU reception Determine HFN/COUNT of PDCP PDU. Discard PDU received in duplicate without processing it into PDCP SDU. Process PDCP PDU satisfying upper layer delivery condition 7 into PDCP SDU, and deliver PDCP SDU to the upper layer. Store PDCP PDUs unsatisfying upper layer delivery condition 7 in the buffer, and perform timer-based reordering operation. If timer 3 expires, process in-sequence PDCP PDUs into PDCP SDUs based on Reordering_PDCP_RX_COUNT, and deliver PDCP SDUs to the upper layer. |

TABLE 9 all stored PDCP SDU(s) with consecutively associated COUNT value(s) starting from the COUNT value associated with the received PDCP SDU;

TABLE 10 all stored PDCP SDU(s) with an associated COUNT value less than the COUNT value associated with the received PDCP SDU; all stored PDCP SDU(s) with consecutively associated COUNT value(s) starting from the COUNT value associated with the received PDCP SDU;

Since the expression that the condition in Table 9 is satisfied means that a received PDCP PDU is a missing PDCP PDU (e.g., received PDCP SN=Last_Submitted_PDCP_RX_SN+1) with the lowest sequence number, an in-sequence PDCP PDU may occur as the PDU is received.

A PDCP PDU for which the condition in Table 10 is satisfied may refer to all missing PDUs with sequence numbers lower than that of the received PDCP PDU and sequentially received PDCP PDUs, including the missing PDCP PDU.

In Table 8, a first PDU may be a PDCP PDU that is received due to the reestablishment or release of a lower layer, and may occur during a handover. In other words, if a handover is instructed, out-of-sequence PDCP PDUs stored in the RLC layer may be delivered to the PDCP device, and these PDCP PDUs will be referred to as the 'first PDU'.

In Table 8, a second PDU may be a PDCP PDU that is received neither due to the reestablishment of a lower layer, nor due to the release of a lower layer, and the second PDU may be PDCP PDUs that are received from a target cell after a handover is completed.

On the basis of a handover, the first PDU may be construed as an out-of-sequence PDCP PDU received from the source cell, and the second PDU may be construed as a PDCP PDU received from the target cell.

In an embodiment of the present disclosure, an MeNB may reconfigure a specific bearer or instruct a handover, using an RRC connection reconfiguration control message. In this case, a UE may perform an optimized operation depending on the type of reconfiguration indicated in the RRC connection reconfiguration message.

Figure 29:
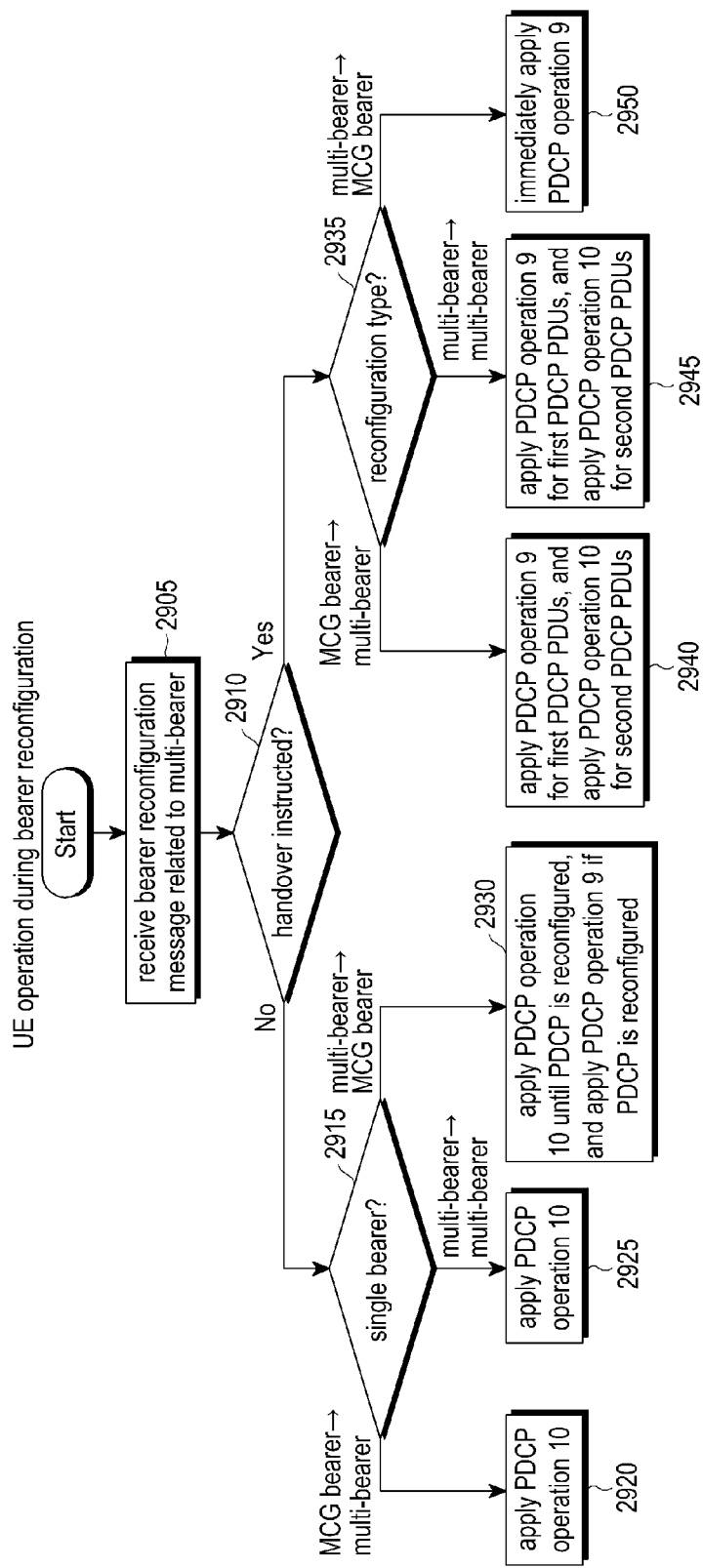

FIG. 29 illustrates a UE operation during a bearer reconfiguration according to an embodiment of the present disclosure.

Referring to FIG. 29, in operation 2905, the UE may receive a bearer reconfiguration message related to a multi-bearer. In this embodiment, the wording 'related to a multi-bearer' means that a multi-bearer is changed to, for example, an MCG bearer or a multi-bearer, or an MCG bearer is changed to a multi-bearer, using the control message.

In operation 2910, the UE may determine whether a handover is instructed, using the control message. If a handover is instructed, the PDCP may perform a reconfiguration operation. The PDCP reconfiguration may include specific operations such as applying a new security key and resetting a header compression operation, and may be performed during the handover.

If a handover is not instructed, the UE may proceed to operation 2915, and if a handover is instructed, the UE may proceed to operation 2935.

In operation 2915, the UE may check the type of reconfiguration. If the reconfiguration type indicates reconfiguration from an MCG bearer to a multi-bearer, the UE may proceed to operation 2920. If the reconfiguration type indicates reconfiguration from a multi-bearer to a multi-bearer, the UE may proceed to operation 2925. If the reconfiguration type indicates reconfiguration from a multi-bearer to an MCG bearer, the UE may proceed to operation 2930.

In operation 2935, the UE may check the type of reconfiguration. If the reconfiguration type indicates reconfiguration from an MCG bearer to a multi-bearer, the UE may proceed to operation 2940. If the reconfiguration type indicates reconfiguration from a multi-bearer to a multi-bearer, the UE may proceed to operation 2945. If the reconfiguration type indicates reconfiguration from a multi-bearer to an MCG bearer, the UE may proceed to operation 2950.

In operation 2920, the UE may stop applying the PDCP operation 9, and then apply the PDCP operation 10. In other words, the UE has received an RRC connection reconfiguration message related to a multi-bearer, and when the reconfiguration is performed, if the PDCP is not reconfigured (i.e., the reconfiguration is not the reconfiguration that is performed with the handover) and an MCG bearer is reconfigured into a multi-bearer, then the UE may stop applying the PDCP operation 9 which is an operation for an MCG bearer, and then apply the PDCP operation 10 which is an operation for a multi-bearer.

In operation 2925, the UE may continue to apply the PDCP operation 10. In other words, the UE has received an RRC connection reconfiguration message related to a multi-bearer, and when the reconfiguration is performed, if the PDCP is not reconfigured (i.e., the reconfiguration is not the reconfiguration that is performed with the handover) and a multi-bearer is reconfigured into a multi-bearer, then the UE may continue to apply the PDCP operation 10 which is an operation for a multi-bearer.

In operation 2930, the UE may apply the PDCP operation 10 until a predetermined condition is satisfied. The predetermined condition may be satisfied when the PDCP is first reconfigured after the bearer reconfiguration is completed. In other words, the UE has received an RRC connection reconfiguration message related to a multi-bearer, and when the reconfiguration is performed, if the PDCP is not reconfigured (i.e., the reconfiguration is not the reconfiguration that is performed with the handover) and a multi-bearer is reconfigured into an MCG bearer, then the UE may continue to apply the PDCP operation 10 which is an operation for a multi-bearer, even though the bearer is reconfigured into an MCG bearer. If the PDCP is reconfigured, the UE may apply the PDCP operation 9 which is an operation for an MCG bearer (i.e., the UE may continue to apply the PDCP operation 10 until a handover is instructed after the reconfiguration to an MCG bearer is completed, and if the handover is instructed, the UE may apply the PDCP operation 9).

The reason why the UE does not immediately apply the PDCP operation 9 in operation 2930 is that since there may be out-of-sequence PDCP PDUs if the bearer is reconfigured from a multi-bearer to an MCS bearer, the UE should continue to apply the PDCP operation 10 until the out-of-sequence PDUs are in sequence, in order to prevent the data loss.

In operation 2940, the UE may apply the PDCP operation 9 for first PDUs, and apply the PDCP operation 10 for second PDUs. As described above, the first PDUs may refer to PDCP PDUs received from the source cell, and if the PDCP operation 10 is applied even for the first PDUs, degradation of the reordering performance may occur. The second PDUs may refer to PDUs received from the target cell, and the second PDUs may be received after the first PDUs are received all. Since the second PDUs are received after the reconfiguration to a multi-bearer is completed, the UE may apply the PDCP operation 10 for the second PDUs. In other words, the UE has received an RRC connection reconfiguration message related to a multi-bearer, and when the reconfiguration is performed, if the PDCP is also reconfigured together (i.e., the reconfiguration is the reconfiguration that is performed with the handover) and a multi-bearer is reconfigured into an MCG bearer, then the UE may apply the PDCP operation 9 for the PDCP PDUs that have been received by the reconfiguration/release of the lower layer, and apply the PDCP operation 10 for the PDCP PDUs that have not been received by the reconfiguration/release of the lower layer.

In operation 2945, the UE may apply the PDCP operation 9 for the first PDUs and apply the PDCP operation 10 for the second PDUs, like in operation 2940. In other words, the UE has received an RRC connection reconfiguration message related to a multi-bearer, and when the reconfiguration is performed, if the PDCP is also reconfigured together (i.e., the reconfiguration is the reconfiguration that is performed with the handover) and a multi-bearer is reconfigured into a multi-bearer, then the UE may apply the PDCP operation 9 for the PDCP PDUs that have been received by the reconfiguration/release of the lower layer, and apply the PDCP operation 10 for the PDCP PDUs that have not been received by the reconfiguration/release of the lower layer.

In operation 2950, the UE may apply the PDCP operation 9 for both of the first PDUs and the second PDUs. In other words, the UE has received an RRC connection reconfiguration message related to a multi-bearer, and when the reconfiguration is performed, if the PDCP is also reconfigured together (i.e., the reconfiguration is the reconfiguration that is performed with the handover) and a multi-bearer is reconfigured into an MCG bearer, then the UE may apply the PDCP operation 9 for the PDCP PDUs that have been received by the reconfiguration/release of the lower layer, and apply the PDCP operation 9 even for the PDCP PDUs that have not been received by the reconfiguration/release of the lower layer. In other words, the UE may immediately apply the PDCP operation.

In an embodiment of the present disclosure, an operation may be proposed, in which a PDCP reception device processes PDCP PDUs received from a lower layer.

In this embodiment of the present disclosure, if a PDCP PDU is received from the lower layer, the PDCP reception device may determine whether the PDU satisfies a predetermined duplicate reception condition, and take a predetermined action for the PDU satisfying the duplicate reception condition. The PDCP reception device may perform different operations depending on whether the PDCP reception device is a device connected with a single bearer, or a device connected with a multi-bearer.

The duplicate reception condition for an arbitrary PDU may be defined as shown in Table 11 below.

TABLE 11 if received PDCP SN - Last_Submitted_PDCP_RX_SN > Reordering_Window, or 0 ≤ Last_Submitted_PDCP_RX_SN - received PDCP SN < Reordering_Window:

The duplicate reception condition is for determining whether a sequence number of a received PDU is a number lower than Last_Submitted_PDCP_RX_SN (or whether a sequence number of a received PDU is a number (e.g., an older number) that is assigned earlier than Last_Submitted_PDCP_RX_SN), instead of determining whether an arbitrary PDCP PDU has been received before, and the duplicate reception condition may be for determining whether a sequence number of a received PDU is a sequence number lower than the lowest sequence number that has already been delivered to the upper layer.

The expression that the duplicate reception condition is satisfied for an arbitrary PDCP PDU means that since a payload of the PDCP PDU is highly likely to be already delivered to the upper layer, the unnecessary malfunction is highly likely to occur if a PDCP SDU is delivered to the upper layer. Therefore, in this embodiment, the PDCP reception device may discard the PDCP PDU satisfying the duplicate reception condition, without delivering it to the upper layer.

If the PDCP PDU satisfying the duplicate reception condition is a PDCP PDU that has been received on a single bearer, the UE may perform an operation of processing the PDCP PDU into a PDCP SDU to update a Robust Header Compression (ROHC) context (see RFC 3095) before discarding the PDCP PDU, and then discard the PDCP SDU. On the other hand, if the PDCP PDU satisfying the duplicate reception condition is a PDCP PDU that has been received on a multi-bearer, the UE may immediately discard the PDCP PDU without processing the PDCP PDU into an SDU. The reason for applying different operations as described above is as follows.

If the PDCP PDU satisfying the duplicate reception condition is a PDCP PDU that has been received on a single bearer, even though the PDCP PDU is a PDU received in duplicate, an important packet related to ROHC may be included in the PDCP PDU. This phenomenon may occur if ROHC is reset in the process such as handover. Therefore, even though the PDCP PDU received on a single bearer is a PDCP PDU received in duplicate, the UE may first process the PDCP PDU into a PDCP SDU to update the ROHC context, and then discard the PDCP SDU.

In the multi-bearer operation, since ROHC is not reset, it is not necessary for the UE to perform the operation of processing the packet received in duplicate to update the ROHC context. Therefore, the UE may immediately discard the PDCP PDU, if it is determined that the PDCP PDU is received in duplicate.

Figure 27:
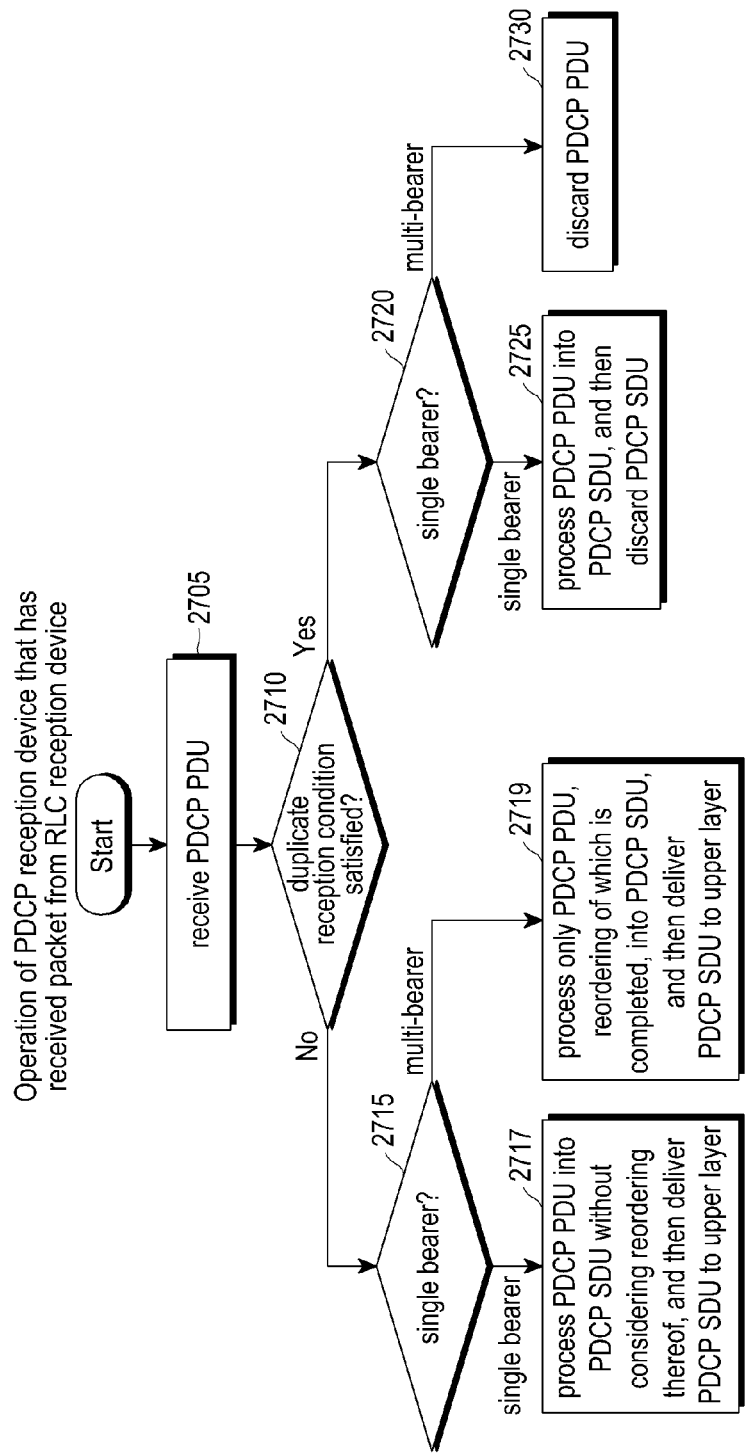
FIG. 27 illustrates an operation of determining whether a UE has received, in duplicate, a PDCP PDU according to an embodiment of the present disclosure.

FIG. 27 illustrates an operation of determining whether a UE has received, in duplicate, a PDCP PDU according to an embodiment of the present disclosure.

Referring to FIG. 27, in operation 2705, the PDCP reception device may receive a PDCP PDU from a lower layer. In operation 2710, the PDCP reception device may determine whether a sequence number of the PDCP SDU satisfies the duplicate reception condition. If the sequence number of the PDCP SDU does not satisfy the duplicate reception condition, the PDCP reception device may proceed to operation 2715, and if the sequence number of the PDCP SDU satisfies the duplicate reception condition, the PDCP reception device may proceed to operation 2720. In operation 2715, the PDCP reception device may determine whether the received PDCP PDU is delivered from a multi-bearer or from a single bearer. If the received PDCP PDU is delivered from a multi-bearer, the PDCP reception device may proceed to operation 2719, and if the received PDCP PDU is delivered from a single bearer, the PDCP reception device may proceed to operation 2717.

In operation 2717, the UE may process the received PDCP PDU into a PDCP SDU, without considering whether the received PDCP PDU is reordered, and then deliver the PDCP SDU to the upper layer. In operation 2719, if the received PDCP PDU is in sequence, the UE may immediately process the PDCP PDU into a PDCP SDU and then deliver the PDCP SDU to the upper layer, and if the received PDCP PDU is not in sequence (or is out of sequence), the UE may process the PDCP PDU into a PDCP SDU, after reordering of the PDCP PDU is completed, and then deliver the PDCP SDU to the upper layer. In other words, in operation 2719, the UE may process only the PDCP PDU, reordering of which is completed, into a PDCP SDU, and deliver the PDCP SDU to the upper layer. Here, processing a PDCP PDU into a PDCP SDU may mean converting a PDCP PDU into a PDCP SDU by performing an operation such as deciphering a PDCP PDU and decompressing a header thereof.

If the duplicate reception condition is satisfied in operation 2710, the PDCP reception device may determine in operation 2720 whether the bearer from which the PDCP PDU is delivered is a single bearer or a multi-bearer. If the bearer is a single bearer, the PDCP reception device may proceed to operation 2725, and if the bearer is a multi-bearer, the PDCP reception device may proceed to operation 2730. In operation 2725, the PDCP reception device may process the PDCP PDU into a PDCP SDU, and then discard the PDCP SDU. In operation 2730, the PDCP reception device may discard the PDCP PDU without processing the PDCP PDU into a PDCP SDU.

In the example of FIG. 27, as another operation of the UE, if a PDCP PDU, a half PDCP SDU or a PDCP SDU having the same sequence number as that of the received PDCP PDU is already stored in the PDCP reception buffer, the UE may perform different operations for a single bearer and a multi-bearer.

For example, if a PDCP SDU with the same sequence number as that of the received PDCP PDU is already stored in the PDCP reception buffer of a single bearer, the UE may decipher the PDCP PDU, decompress its header, and then discard the PDCP PDU. The reason for discarding the PDCP PDU after decompressing its header is to update the header decompression context by decompressing the header because the PDCP PDU transmitted in duplicate is highly likely to be a packet, a header of which is compressed as a more recent header compression context.

In addition, if a PDCP SDU, a half PDCP SDU or a PDCP PDU having the same sequence number as that of the received PDCP PDU is already stored in the PDCP reception buffer of a multi-bearer, the UE may decipher the PDCP PDU, process the deciphered PDCP PDU into a half PDCP SDU, and then discard the currently stored PDCP packet (e.g., PDCP PDU, half PDCP SDU or PDCP SDU) with the same sequence number, and store the half PDCP SDU.

In the case of a multi-bearer, if a header of an out-of-sequence half PDCP SDU is decompressed, header decompression of its subsequent half PDCP SDUs may be affected. Therefore, as described above, the UE may store the packet received in duplicate until the packet received in duplicate is reordered, without decompressing a header thereof.

Although not shown in the example of FIG. 27, as another operation of the UE, if a PDCP PDU or a PDCP SDU having the same sequence number as that of the received PDCP PDU is already stored in the PDCP reception buffer of a multi-bearer, the UE may perform another different operation.

For example, if a PDCP SDU with the same COUNT as COUNT of the received PDCP PDU is already stored in the PDCP reception buffer of a multi-bearer, the UE may decipher the PDCP PDU, decompress a header thereof, and then discard the PDCP PDU. The reason for discarding the PDCP PDU after decompressing its header is to update the header decompression context by decompressing the header because the PDCP PDU transmitted in duplicate is highly likely to be a packet, a header of which is compressed as a more recent header compression context.

In addition, if a PDCP PDU with the same COUNT as COUNT of the received PDCP PDU is already stored in the PDCP reception buffer of a multi-bearer, the UE may discard the stored PDCP PDU and store a newly received PDCP PDU. In the case of a single bearer, the reason for performing an operation different from the operation of discarding a PDCP PDU received in duplicate is that in the multi-bearer structure, in retransmitting a predetermined PDCP PDU, the UE may compress again a header as a more recent header compression context, and then retransmit the PDCP PDU. As another operation of the UE, in processing a PDCP packet (e.g., PDCP PDU or PDCP SDU) with the same COUNT as that of the received PDCP PDU, the UE may perform a different operation depending on whether the PDCP packet with the same COUNT is a PDCP SDU or a PDCP PDU.

If a PDCP packet with the same COUNT as COUNT of the received PDCP PDU is already stored, the UE may determine whether the stored PDCP packet is a PDCP PDU or a PDCP SDU, and if the stored PDCP packet is a PDCP PDU, the UE may discard the PDCP PDU without performing an additional operation. On the other hand, if the stored PDCP packet is a PDCP SDU, the UE may decompress a header of the received PDCP PDU, decipher the PDCP PDU, and then discard the PDCP PDU.

Now, a description will be made of a method for setting a Prioritized Bit Rate (PBR) for a multi-bearer according to an embodiment of the present disclosure.

In transmitting data using an uplink grant assigned by an ENB, a UE may determine which data the UE will transmit, taking into account the priority of a logical channel. If data is continuously generated in a high-priority logical channel, data of a low-priority logical channel may not be serviced for a long time, causing the problem that the minimum data transmission/reception for keeping a data session is also impossible. In order to solve this problem, the concept of PBR has been introduced. If PBR is set in a logical channel, the UE may increase a PBR-related token Bj by PBR for the logical channel in every Transmission Time Interval (TTI). In determining data to transmit, the UE may first consider the Bj. For example, even though transmittable data is present in a high-priority logical channel x, if Bj of the logical channel x is 0, the UE may preferentially transmit data of a logical channel, priority of which is low but Bj of which is not 0, by at least Bj. This operation follows the description in Section 5.7 of the standard TS36.321.

The PBR may be assigned and managed for each logical channel. However, if the logical channel is a local channel connected to a multi-bearer, it is preferable to operate the PBR taking into all the related logical channels, instead of independently operating the PBR for each logical channel. The reason is that the purpose of the PBR is to ensure the minimum transmission bandwidth for an arbitrary data service, and in the case of a multi-bearer, one service is related to two logical channels.

In the existing signaling system, parameters related to PBR may include prioritisedBitRate and bucketSizeDuration, and the parameters may be signaled for each logical channel. Bj is first initialized to zero (0), and then increases by prioritisedBitRate in every TTI. The maximum size of Bj is limited to a product of prioritisedBitRate and bucketSizeDuration. Generally, a specific radio bearer may be configured as a single bearer that is connected only with one logical channel. If the UE moves to a macro-cell area in the future, the single bearer may be reconfigured into a multi-bearer, and the UE may properly distribute PBRs of the multi-bearer to an SCG logical channel and an MCG logical channel according to a predetermined rule.

Figure 12:
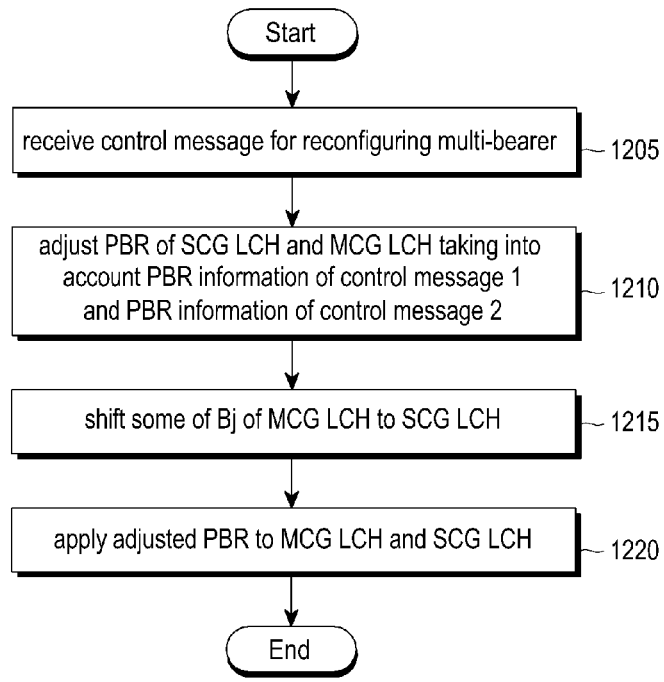
FIG. 12 illustrates a UE's operation of setting a Prioritized Bit Rate (PBR) for a multi-bearer according to an embodiment of the present disclosure.

FIG. 12 illustrates a UE's operation of setting a PBR for a multi-bearer according to an embodiment of the present disclosure.

Referring to FIG. 12, in operation 1205, the UE may receive a control message for instructing to reconfigure a single bearer into a multi-bearer. In operation 1210, the UE may adjust a PBR of an MCG logical channel and a PBR of an SCG logical channel to appropriate values, referring to PBR information of a control message 1 and a control message 2. The control message 2 means a control message for reconfiguring a single bearer into a multi-bearer, and the control message 1 means a control message containing PBR information about the single bearer. Typically, the control message 1 may be generated first, and the control message 2 may be generated later. There may be several methods for adjusting PBRs of the MCG logical channel and the SCG logical channel, and one of the methods presented below can be used.

PBR Setting Method 1 for Arbitrary Multi-Bearer x

If PBR of a logical channel of a bearer x is set as A in the control message 1 and PBR of an SCG Logical Channel (LCH) of a bearer x is set as B in the control message 2, PBR of the SCG LCH may be set as a signaled B and PBR of the MCG LCH may be adjusted to A-B.

PBR Setting Method 2 for Arbitrary Multi-Bearer x

If PBR information is present in the control message 2, PBR may be applied to an SCG LCH, and if PBR information is not present, PBR may be applied to an MCG LCH. In other words, if PBR of a logical channel of a bearer x is set as A in the control message 1 and PBR of an SCG LCH of a bearer x is set as B in the control message 2, PBR of the SCG LCH may be set as a signaled B and PBR of the MCG LCH may be adjusted to zero (0). Otherwise, if PBR for the SCG LCH of the bearer x is not set in the control message 2, PBR of the MCG LCH may be kept as A, and PBR of the SCG LCH may be set to 0.

PBR Setting Method 3 for Arbitrary Multi-Bearer x

An LCH to which PBR is to be applied may be specified through the control message 2. For example, PBR may be set as shown in Table 12 below.

TABLE 12

| PBR of LCH of bearer x in control message 1 | PBR of LCH of bearer x in control message 2 | PBR indicator of control message 2 | PBR of MCG LCH and SCG LCH |
|---|---|---|---|
| A | B | SCG | MCG LCH PBR = 0 SCG LCH PBR = B |
| A | B | MCG | MCG LCH PBR = B SCG LCH PBR = 0 |
| A | Absent | Absent | MCG LCH PBR = A SCG LCH PBR = 0 |
| A | Absent | SCG | MCG LCH PBR = 0 SCG LCH PBR = A |

For example, if PBR of a logical channel of a bearer x is notified as A in the control message 1 and PBR of a logical channel of a bearer x is set as B and a PBR indicator is set as MCG in the control message 2, the UE may adjust PBR of the MCG LCH to B and set PBR of the SCG LCH to 0. In operation 1215, the UE may shift a predetermined amount of Bj of the existing MCG LCH to the SCG LCH.

If the PBR setting method 1 is used, the UE may subtract a predetermined ratio of Bj for the MCG LCH, from the MCG LCH, and add it to the SCG LCH. Therefore, Bj of the SCG LCH may be initialized to the amount of Bj that is shifted in the MCG LCH, instead of being initialized to 0.

If the PBR setting method 2 or 3 is used, in a case where PBR is applied to the SCG, the whole of Bj of the MCG LCH may be shifted to the SCG LCH. If PBR is applied to the MCG, Bj of the MCG LCH may be kept intact.

In operation 1220, the UE may perform an operation related to PBR in the MCG LCH and the SCG LCH by applying the adjusted PBR and the adjusted Bj. In other words, the UE may perform an operation of increasing Bj by PBR in every TTI, and decreasing Bj as much as the amount of data transmitted.

Although it is assumed in various embodiments of the present disclosure that the MCG serving cell and the SCG serving cell both use the LTE technology, the two cell groups may use different wireless technologies. For example, the UE may exchange data with the MCG serving cell, using the LTE wireless technology, and may exchange data with the SCG serving cell, using another wireless technology (e.g., Wireless Fidelity (WiFi) technology or High Speed Packet Access (HSPA) technology). In the scenario where the UE transmits and receives data using different wireless technologies together, one PDCP device may perform reordering on the PDCP PDUs that are received through different wireless technologies, and distribute the PDCP PDUs to lower layer devices that use different wireless technologies. In this case, it is possible to apply the technologies (e.g., the timer-based reordering technology or the reordering operation switching procedure) presented throughout this specification. Herein, the multi-bearer may be defined as a bearer, in which one PDCP device is connected with two lower layers that use different wireless technologies and at least one of them is a lower layer that uses the LTE technology.

Now, a description will be made of a method in which an RLC device of a UE requests retransmission of a missing packet according to an embodiment of the present disclosure.

If a predetermined event occurs, the RLC reception device may generate an RLC STATUS PDU to report a sequence number of a normally received RLC PDU, and request retransmission of an RLC PDU, or some (e.g., an RLC PDU segment) of the RLC PDU, the RLC PDU or the RLC PDU segment being required to be retransmitted. For a normal operation of the RLC, the RLC reception device may follow the 3GPP standard TS36.322, and an RLC PDU may be interchangeably used with an Acknowledged Mode Data (AMD) PDU.

The RLC STATUS PDU may be significantly large in size depending on the radio channel conditions, and the UE may not transmit the whole RLC STATUS PDU with given transmission resources. In this case, the UE may optionally report only the information that is reportable in the given transmission resources.

For example, the reception status of a UE will be assumed to be as shown below.

Figure 13:
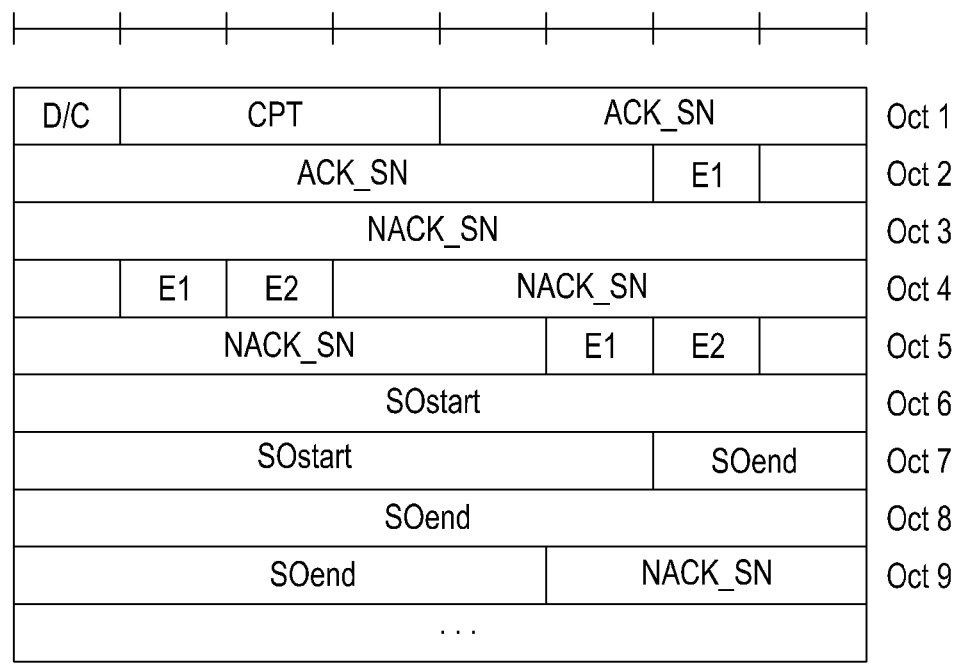
FIG. 13 illustrates a format of a status PDU according to an embodiment of the present disclosure.

Highest RLC sequence number received so far=100
Missing RLC PDUs=90 and 95
Missing RLC PDU segment=from 100th byte to 150th byte of a PDU A STATUS PDU may be configured with one ACK_SN, one or more NACK_SNs, zero (0) per NACK_SN, and one or more SOstart/SOend pairs, as shown in the example of FIG. 13 showing a format of the STATUS PDU. A STATUS PDU that should be configured in the above condition may be as follows, and the size of the STATUS PDU may be 101 bits.

ACK_SN=101
NACK_SN=90
NACK_SN=93; SOstart=100; SOend=150
NACK_SN=95

If the amount of transmission resources to be allocated to the RLC device is, for example, 16 bits, the UE may configure a STATUS PDU as shown below according to the amount of possible transmission resources.

ACK_SN=90

In other words, the UE may report only the information indicating that the UE has normally received up to the sequence number 89, and may not report on the remaining RLC PDUs.

In some cases, if the UE reports only some information as above, incorrect information may be transmitted.

FIG. 13 illustrates a format of a status PDU according to an embodiment of the present disclosure.

Referring to FIG. 13, several SOstart/SOend pairs may be contained for one NACK_SN, and if only part of the information is contained due to the amount of given transmission resources, the RLC device that has received the STATUS PDU may make a wrong determination. For example, the reception status of the RLC reception device at an arbitrary time may be as follows.

Highest RLC sequence number received so far=100
Missing RLC PDU segment=from 100th byte to 150th byte of a PDU [93], and from 180th byte to the last bytes of a PDU [93].

In other words, some (e.g., 1st~99th bytes and 151st~179th bytes) of the RLC PDU with a sequence number 93 has been normally received, and the other (e.g., 100th~150th bytes and 180th~the last bytes) of the RLC PDU with a sequence number 93 has not been normally received.

If the amount of transmission resources that the UE can use at the time an RLC STATUS PDU is triggered is only enough to include ACK_SN, NACK_SN and one SOstart/SOend pair, the UE may generate and transmit the following STATUS PDU.

ACK_SN=100
NACK_SN=93; SOstart=100; SOend=150

The RLC device that has received the STATUS PDU may discard the part of 180th~the last bytes of the RLC PDU with a sequence number 93 from the buffer, misjudging that the UE has normally received even the part of 180th~the last bytes. An operation of the RLC reception device for solving this problem will be described with reference to FIG. 14. Referring to other fields in FIG. 13, D/C field indicates whether the PDU is data PDU or control PDU, CPT (Control PDU Type) field indicates the type of the control PDU, E1 (Extension bit 1) field indicates whether a set of NACK_SN, E1, and E2 follow, and E2 (Extension bit 2) field indicates whether a set of SOstart and SOend follows. Oct 1 to Oct 9 indicate octets.

Figure 14:
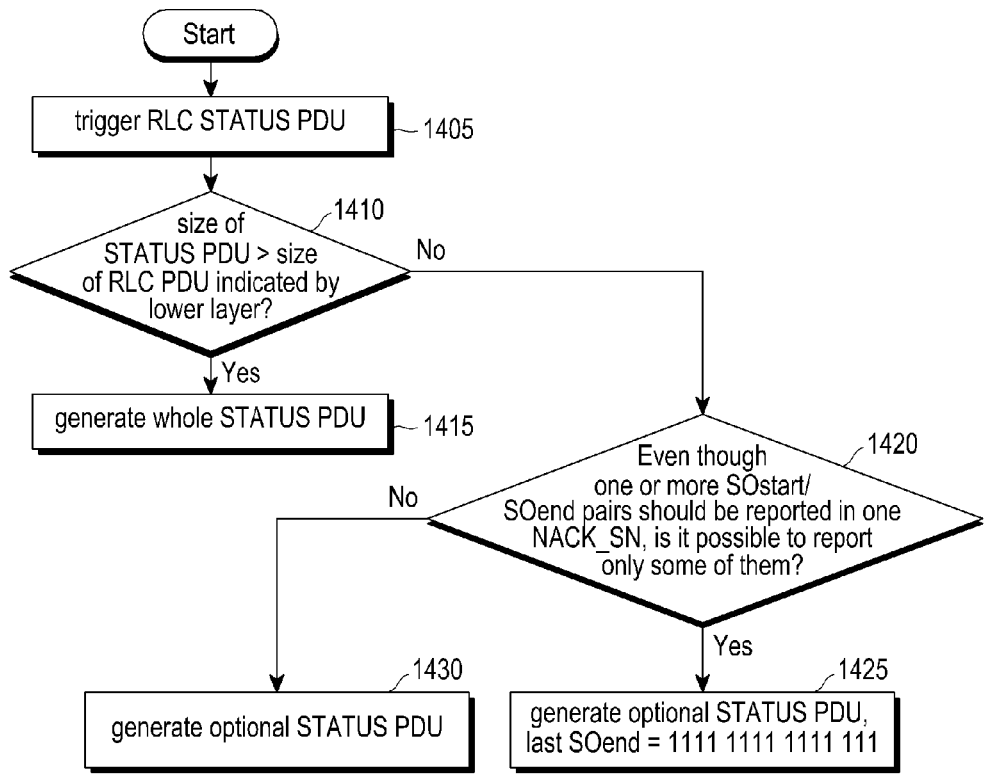
FIG. 14 illustrates an operation of an RLC reception device generating a status Protocol Data Unit (PDU) according to an embodiment of the present disclosure.

FIG. 14 illustrates an operation of an RLC reception device generating a status PDU according to an embodiment of the present disclosure.

Referring to FIG. 14, an RLC STATUS PDU may be triggered in operation 1405. The RLC STATUS PDU may be triggered if a t-Reordering timer expires in a situation where t-StatusProhibit is not driven, or if a first transmission opportunity occurs after an RLC PDU in which a poll bit is set is received.

In operation 1410, the RLC reception device may determine whether it can generate a STATUS PDU including all of ACK_SN, NACK_SN and SOstart/SOend that reflect the current reception status in the transmission opportunity, (e.g., determine whether the size of STATUS REPORT in which all the current statuses are reflected is less than the size of the transmittable RLC PDU). If so, the RLC reception device may proceed to operation 1415, and if not so, the RLC reception device may proceed to operation 1420.

In operation 1415, the UE may generate a STATUS PDU by writing ACK_SN, NACK_SN and SOstart/SOend therein so as to reflect the reception status at that time.

In operation 1420, the UE may determine whether the following Condition is satisfied. If the Condition is satisfied, the UE may proceed to operation 1425, and if the Condition is not satisfied, the UE may proceed to operation 1430.

Condition

When the UE generates a STATUS PDU according to the amount of given transmission resources (or the size of an RLC PDU provided by a lower layer), is only some of one or more SOstart/SOend pairs for one NACK_SN included in the STATUS PDU? In other words, can the UE report the reception status only for some segments with respect to the RLC PDU, one or more segments of which have not been received? In other words, can only some of several SOstart/SOend pairs be included?

In operation 1425, the RLC reception device may set a SOend value of the last SOstart/SOend pair included in the NACK_SN to a predetermined value (e.g., "1111111111111111"). If SOend is set to the above value, it means that the RLC reception device has not received the part from the byte indicated by the SOstart to the last byte. In other words, by setting a value of the last SOend to the above value, the RLC reception device may request transmission even for the successfully received segment, and may at least prevent the RLC transmission device from discarding the segment that the RLC transmission device has not received yet. In the above example, the following STATUS PDU may be generated.

ACK_SN=100
NACK_SN=93; SOstart=100; SOend=predetermined value

The transmission device that has received the STATUS PDU may not discard 151st~179th bytes of an RLC PDU with a sequence number 93.

As another operation, in operation 1425, the RLC reception device may cancel the triggered STATUS PDU, and trigger again a STATUS PDU in the next transmission opportunity. In other words, this is because in the next transmission opportunity, more transmission resources may be allocated, making it possible to include all the necessary information.

In operation 1430, the UE may determine up to which RLC PDU segment the UE will report NACK information according to the size of the RLC PDU, write in ACK_SN the sequence number of a missing RLC PDU following the last RLC PDU segment, and generate a STATUS PDU by sequentially writing an RLC PDU given to report NACK information, or NACK information for the RLC PDU segment. An operation of the RLC transmission device for solving this problem will be described with reference to FIG. 15.

Figure 15:
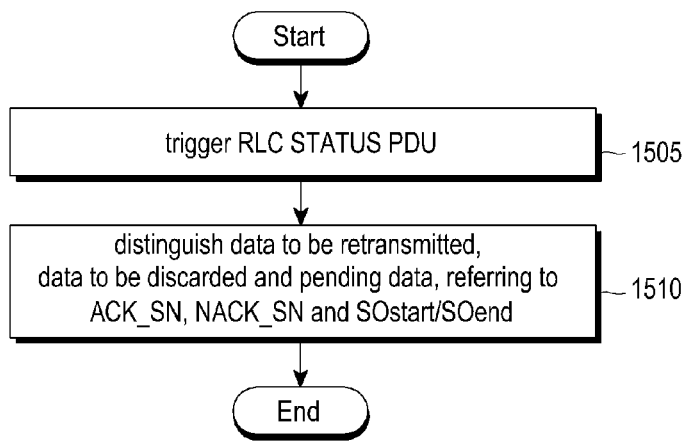
FIG. 15 illustrates an operation of an RLC transmission device receiving a status PDU according to an embodiment of the present disclosure.

FIG. 15 illustrates an operation of an RLC transmission device receiving a status PDU according to an embodiment of the present disclosure.

Referring to FIG. 15, the RLC transmission device may receive/trigger a STATUS PDU in operation 1505.

In operation 1510, the RLC transmission device may determine which RLC PDU and RLC PDU segment have been normally transmitted, using ACK_SN, NACK_SN, SOstart and SOend of the STATUS PDU, and may discard the normally transmitted packets from its transmission buffer and prepare to retransmit the packets, retransmission of which is required. In this case, the RLC transmission device may determine the data to be discarded from the transmission buffer, and the data to be retransmitted, as follows. Hereinafter, for convenience of description, NACK information configured with one NACK_SN and one or more SOstart/SOend pairs will be referred to as partial NACK information. An element containing meaningful information such as ACK_SN, NACK_SN, NACK_SN and SOstart/SOend will be referred to as a STATUS element.

The RLC transmission device may determine that it should retransmit all the RLC PDUs that are indicated only with NACK_SN in the STATUS PDU.

The RLC transmission device may determine that it should retransmit the RLC PDU segments that are reported to be missing by the partial NACK information included in the STATUS PDU.

The RLC transmission device may determine that the remaining segments except for the RLC PDU segments that are reported to be missing by the partial NACK information, other than the last STATUS element, in the partial NACK information included in the STATUS PDU, have been normally received, and discard the remaining segments.

If the last STATUS element of the STATUS PDU is partial NACK information, the RLC transmission device may not determine whether the remaining segments except for the RLC PDU segments that are reported to be missing by the partial NACK information have been received or not. In other words, the RLC transmission device may neither discard the remaining segments nor retransmit the remaining segments.

Now, a description will be made of a method in which a UE reports a plurality of categories and performs an HARQ operation by applying one of the categories according to an embodiment of the present disclosure.

In order for a UE and an ENB to perform data exchange, the ENB should recognize the capability of the UE. For example, information such as the UE's maximum downlink data rate and the UE's HARQ buffer performance may be the information that the ENB should be aware of in order to transmit downlink data to the UE. The capability information related to the UE's downlink data transmission/reception may be reported to the ENB in the form of a UE category. The following table shows the 'UE category' defined in the standard 36.306. If the UE categories are classified based on the UE's downlink data reception capability, category 1 corresponds to 10 Mbps, category 2 corresponds to 50 Mbps, category 3 corresponds to 100 Mbps, category 4 corresponds to 150 Mbps, and categories 5, 6 and 7 correspond to 300 Mbps, and category 8 corresponds to 3 Gbps.

TABLE 13

| UE Category | Maximum number of bits that UE can receive within one TTI (1 ms) | Total number of soft channel bits (Buffer size) | Maximum number of supportable downlink layers |
|---|---|---|---|
| Category 1 | 10296 | 250368 | 1 |
| Category 2 | 51024 | 1237248 | 2 |
| Category 3 | 102048 | 1237248 | 2 |
| Category 4 | 150752 | 1827072 | 2 |
| Category 5 | 299552 | 3667200 | 4 |
| Category 6 | 301504 | 3667200 | 2 |
| Category 6' | 301504 | 3667200 | 4 |
| Category 7 | 301504 | 3667200 | 2 |
| Category 7' | 301504 | 3667200 | 4 |
| Category 8 | 2998560 | 35982720 | 8 |

In Table 13, the categories 1~5 have been introduced in LTE Standard Release 8, and the categories 6~8 have been introduced in LTE Standard Release 10. In other words, a Release 8-based ENB may not understand the categories 6~8. The introduction of categories corresponding to other data rates in addition to the above categories may be required. For example, in LTE standard Release 12, the introduction of new categories 9 and 10 corresponding to 450 Mbps has been determined. Hereinafter, for convenience of description, the categories 1~5 will be referred to as a first category, the categories 6~8 will be referred to as a second category, and the categories 9~10 will be referred to as a third category. An ENB based on Release 8 and Release 9 may not understand the second category and the third category, an ENB based on Release 10 and Release 11 may not understand the third category, and an ENB based on Release 12 or later Release may understand all the categories. A UE may report several categories in some cases, since the UE cannot recognize the Release of the ENB. For example, a UE of the second category may report not only the second category but also the first category together. A UE of the third category may report not only the third category but also the second category and the first category together. Since the categories have a close relationship with the size of a soft buffer as described below, the UE and the ENB should apply the same category each other. Therefore, there is a need for a method in which the UE and the ENB apply the same categories for the UE that has reported a plurality of categories. Each item of the table will be described in more detail below.

In the table, by multiplying 'maximum number of bits that UE can receive within one TTI (1 ms)' by 1000, it is possible to convert the maximum number of bits into the maximum transfer rate per second of the system.

In the table, 'total number of soft channel bits' may not only be related to the buffer size of the UE, but also affect the rate matching operation. If 'total number of soft channel bits' is defined as Nsoft, 'soft buffer size for transport block' is defined as Noise-to-Interference Ratio ($N_{IR}$), and 'soft buffer size for code block' is defined as Ncb, a relationship of Equation (1) below may be given.

$$N_{IR} = \left\lfloor \frac{N_{soft}}{K_{MIMO} \cdot \min(M_{DL\_HARQ}, M_{limit})} \right\rfloor, \quad \text{Equation (1)}$$

$$N_{cb} = \min\left(\left\lfloor \frac{N_{IR}}{C} \right\rfloor, K_w\right)$$

Where $K_{MIMO}$ has a value of 2 or 1 depending on the transmission mode, and $\min(M_{DL\_HARQ}, M_{limit})$ generally has a value of 8. In addition, C represents the number of code blocks, and $K_W$ represents a length of a circular buffer and has a relationship of $K_W=3KII$ where KII represents an interleaver size of a sub block and has a length of 6144 bits. In other words, as shown in the above Equation, it can be understood that if a value of Nsoft affects a value of the $N_{IR}$ and a value of $N_{IR}/C$ is less than $K_W$, (in other words, if a high-speed data transmission/reception is in progress), the value of the $N_{IR}$ affects a value of Ncb. Since a puncturing/repetition pattern is affected depending on the value of Ncb, it can be understood that if a value of Nsoft between a UE and an ENB is misunderstood, it may cause a wrong operation. Other various matters related to, for example, rate matching may follow the standard 36.212.

Figure 18:
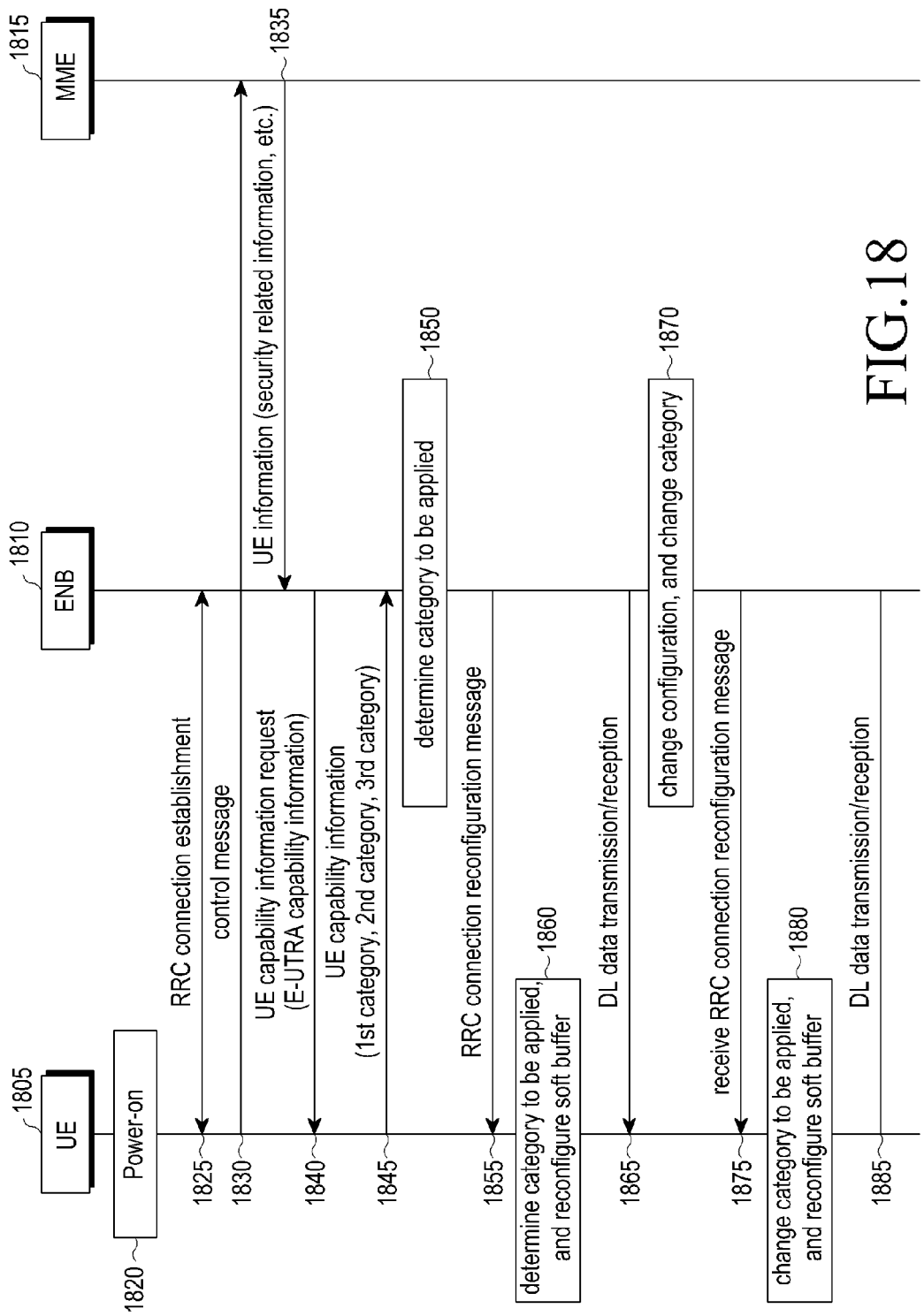
FIG. 18 illustrates an ENB's operation of performing downlink data transmission/reception with a UE that has reported three categories according to an embodiment of the present disclosure.

FIG. 18 illustrates an ENB's operation of performing downlink data transmission/reception with a UE that has reported three categories according to an embodiment of the present disclosure.

Referring to FIG. 18, in a mobile communication system including a UE 1805, an ENB 1810 and an MME 1815, the UE 1805 may be powered on in operation 1820. The UE 1805 may perform cell search, and if an accessible cell is detected, the UE 1805 may perform an RRC connection establishment procedure (see the standard 36.331) with the ENB 1810 through the cell, in operation 1825. In operation 1830, the UE 1805 may send a predetermined control message to the MME 1815 through the established RRC connection. The control message may be, for example, a service request message for requesting initiation of a service, or an attach request message for requesting initial registration. The MME 1815 may determine whether to accept the request of the UE 1805 through a predetermined procedure, and if the MME 1815 determines to provide a mobile communication service to the UE 1805, accepting the request, the MME 1815 may send a control message containing information related to the UE 1805 to the ENB 1810 in operation 1835. The control message may include the information (e.g., security key information, the UE's service profile information, etc.) that the ENB 1810 requires in order to perform data transmission/reception with the UE 1805. If the MME 1815 has capability information of the UE 1805, the MME 1815 may include even the capability information of the UE 1805 in the control message. If the MME 1815 does not have capability information of the UE 1805, the capability information may not be delivered to the ENB 1810, and the ENB 1810 may send a predetermined RRC control message to the UE 1805 in order to obtain the capability information of the UE 1805 in operation 1840. The control message refers to a UE capability information request message or (a UE capability enquiry message), and the control message may contain or have a field indicating capability information of which a Radio Access Technology (RAT) the ENB 1810 requests. The LTE ENB 1810 may set the field so that capability information for Evolved Universal Terrestrial Radio Access (E-UTRA) may be requested. Upon receiving the control message, the UE 1805 may determine capability information for which RAT has been requested, and if capability information for E-UTRA has been requested, the UE 1805 may generate a UE capability information message containing capability information related to the E-UTRA, and send the UE capability information message to the ENB 1810 in operation 1845. The control message may include information about at least one category.

If the capability of the UE 1805 corresponds to one of the categories 1~5, the UE 1805 may report only the first category corresponding to its own capability.

If the capability of the UE 1805 corresponds to one of the categories 6~8, the UE 1805 may report the second category corresponding to its own capability and the first category that is most similar to the second category. For example, a UE of the category 6 or 7 may report the category 4 as the first category, and a UE of the category 8 may report the category 5 as the first category.

If the capability of the UE 1805 is the category 9 or 10, the UE 1805 may report the third category corresponding to its own capability and the second category and the first category which are most similar to the third category. For example, a UE of the category 9 may report the category 9 as the third category, the category 6 as the second category, and the category 4 as the first category.

Upon receiving the capability information of the UE 1805, the ENB 1810 may determine a connection of the UE 1805 referring to the capability information, and determine which category the ENB 1810 will apply, in operation 1850.

The ENB 1810 may configure (or set) an antenna, a transmission mode, CA and the like, and may determine a category to be applied with respect to the configuration, according to a predetermined rule. The rule will be described in more detail below. In operation 1855, the ENB 1810 may send an RRC connection reconfiguration message containing the configuration information to the UE 1805. The control message may include information based on which the UE 1805 may determine which category the ENB 1810 has applied. The UE 1805 may configure the antenna, transmission mode, CA and the like by applying the configuration information in the control message. In operation 1860, the UE 1805 may determine which category the UE 1805 will apply, referring to the information in the control message, and reconfigure a downlink HARQ soft buffer depending on the determined category.

In operation 1865, the ENB 1810 may configure a downlink HARQ buffer by applying Nsoft of the determined category, and transmit downlink data to the UE using the HARQ buffer. For example, the UE 1805 may determine $N_{IR}$ by applying Nsoft of the determined category, and determine the size of the HARQ soft buffer depending on the $N_{IR}$. If Nsoft and $N_{IR}$ are changed, the UE 1805 may change the size of the soft buffer according to the change in Nsoft and $N_{IR}$. If the size of the reconfigured soft buffer is smaller than the size of the previous soft buffer, the UE 1805 may discard the data which is larger than the reconfigured soft buffer, among the data stored in the soft buffer, and keep only the data that is less than the reconfigured soft buffer. This operation will be referred to as a data management operation during soft buffer reconfiguration.

In operation 1865, the UE 1805 may receive downlink data from the ENB 1810 using the reconfigured soft buffer.

Thereafter, at an arbitrary time, the ENB 1810 may determine to change the configuration of the UE 1805. Accordingly, the category to be applied may be changed in operation 1870. For example, when the UE 1805 performs a handover to a new ENB, if the ENB 1810 cannot understand some of the categories of the UE 1805 since a version of the new ENB is lower than a version of the previous ENB, a new category should be applied. For example, for a handover, a target ENB may determine configuration information that the UE 1805 will apply after its handover, and deliver the configuration information to a source ENB, and the source ENB may send an RRC connection reconfiguration message containing the configuration information to the UE 1805 in operation 1875. The RRC connection reconfiguration message may contain a control message for instruction a handover, and the UE 1805 may establish downlink synchronization with the target cell indicated in the control message. The UE 1805 may also determine a category to be applied in the target cell, using the information contained in the RRC connection reconfiguration message. In operation 1880, the UE 1805 may reconfigure a downlink soft buffer depending on the category. In operation 1885, the UE may receive downlink data from the target cell using the reconfigured downlink soft buffer. In particular, the UE 1805 may perform a random access procedure in the target cell if its downlink synchronization with the target cell is established, and may initiate the use of the reconfigured downlink soft buffer if the random access procedure is completed.

Figure 19:
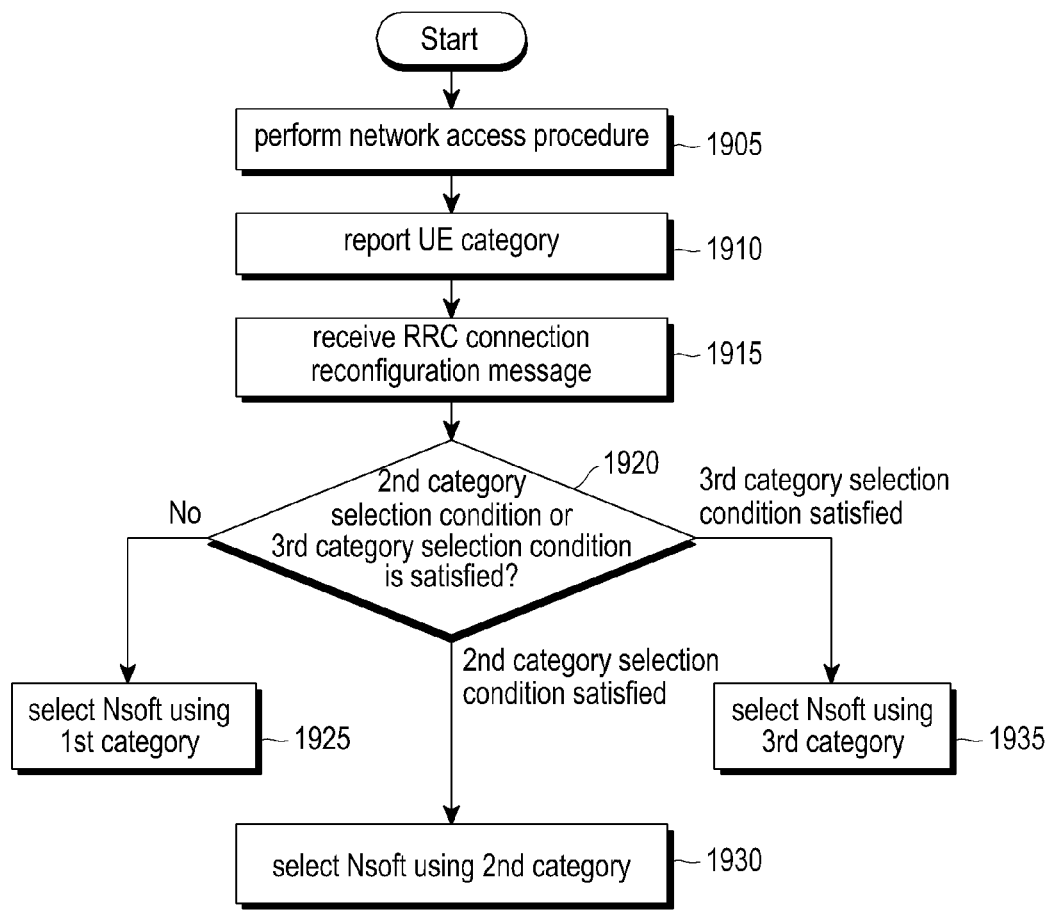
FIG. 19 illustrates a UE operation according to an embodiment of the present disclosure.

FIG. 19 illustrates a UE operation according to an embodiment of the present disclosure.

Prior to initiating the operation in FIG. 19, a UE may determine its own category. The category of the UE may be determined in its production process and stored in a non-volatile internal memory or the like. As described above, the UE may have at least one category. A UE belonging to the third category may have even the second category and the first category that an older ENB can recognize, just in case when the UE is connected with the older ENB. Thereafter, upon its power-on, the UE may select a proper cell the UE will camp on, through a cell search operation or the like, and perform a network access procedure through the cell in operation 1905. The UE may determine the size of a downlink soft buffer by applying Nsoft of the first category until the UE receives a first RRC connection reconfiguration message, and perform an HARQ operation.

Referring to FIG. 19, in operation 1910, the UE may report its own category while reporting the capability information. The UE may report the first category, the second category and the third category, and the UE may report the category 9 as the third category, the category 6 as the second category and the category 4 as the first category, or may report the category 10 as the third category, the category 7 as the second category and the category 4 as the first category.

In operation 1915, upon receiving an RRC connection reconfiguration message, the UE may reestablish the connection by applying the configuration information contained in the control message. In operation 1920, the UE may determine whether the information contained in the control message satisfies a second category selection condition or a third category selection condition. If the information satisfies none of the two conditions, the UE may proceed to operation 1925, and if the information satisfies the second category selection condition, the UE may proceed to operation 1930. Otherwise, if the information satisfies the third category selection condition, the UE may proceed to operation 1935.

In operation 1925, the UE may determine Nsoft by applying the first category. For example, if the UE has reported the category 9 as the third category, the category 6 as the second category and the category 4 as the first category, the UE may apply the category 4. If a value different from Nsoft currently in use is determined as a new Nsoft, or if $N_{IR}$ different from $N_{IR}$ currently in use is determined as a new Nsoft, the UE may perform a data management operation during soft buffer reconfiguration.

In operation 1930, the UE may determine Nsoft by applying the second category. For example, if the UE has reported the category 9 as the third category, the category 6 as the second category and the category 4 as the first category, the UE may apply the category 6. If a value different from Nsoft currently in use is determined as a new Nsoft, or if $N_{IR}$ different from $N_{IR}$ currently in use is determined as a new Nsoft, the UE may perform a data management operation during soft buffer reconfiguration.

In operation 1935, the UE may determine Nsoft by applying the third category. For example, if the UE has reported the category 9 as the third category, the category 6 as the second category and the category 4 as the first category, the UE may apply the category 9. If a value different from Nsoft currently in use is determined as a new Nsoft, or if $N_{IR}$ different from $N_{IR}$ currently in use is determined as a new Nsoft, the UE may perform a data management operation during soft buffer reconfiguration.

In this embodiment of the present disclosure, various examples of the second category selection condition and the third category selection condition may be as follows.

Second Category Selection Condition (1)

Among the serving cells, there is no serving cell in which Transmission Mode (TM) 10 is set, and there is at least one serving cell in which TM 9 is set.

Third Category Selection Condition (1)

Among the serving cell, there is at least one serving cell in which TM 10 is set.

In short, the UE may select a category based on the transmission mode that is set in the UE.

TM 9 and TM 10 are forward transmission modes that are defined in the standard 36.213. TM 9 is a mode that supports Single User-Multi-Input Multi-Output (SU-MIMO) having a maximum of 8 ranks, and TM 10 is a mode that supports Coordinated Multi Point transmission (CoMP). By associating in advance a transmission mode in which a high data rate is highly likely to be applied, with a category of a high data rate, the UE may be allowed to determine which category the UE will apply.

In other words, the UE may apply the second category if TM 9 is set, may apply the third category if TM 10 is set, and may apply the first category if none of the two TMs is set.

Second Category Selection Condition (2)

A maximum of two servicing cells are set for the UE, and there is at least one servicing cell in which TM 9 is set.

Third Category Selection Condition (2)

At least three serving cells are set for the UE.

In short, the UE may determine a category taking into account the CA status of the UE and the transmission mode of the UE.

A data rate of 450 Mbps is highly likely to be achieved if at least three serving cells are aggregated. Therefore, if the number of set serving cells is 3 or more, a definition may be given to apply the third category.

In other words, the UE may apply the third category if at least three serving cells are set, may apply the second category if a maximum of two serving cells are set and TM 9 is set, and may apply the first category if a maximum of two serving cells are set and TM 9 is not set.

Second Category Selection Condition (3)

At least one serving cell, in which TM 9 is set, is set, and 'UE category to be applied' control information is not included in the RRC reconfiguration control message.

Third Category Selection Condition (3)

'UE category to be applied' control information is included in the RRC reconfiguration control message.

In short, the UE may explicitly indicate which category the UE will apply, in the RRC reconfiguration control message. In particular, the UE may explicitly indicate only whether to apply the third category, and associate the second category with use/nonuse of TM 9, thereby making it possible to reduce the signaling overhead. In other words, the UE may apply the third category if information about the category to be applied is included, may apply the second category if the information is not present and TM 9 is set, and may apply the first category if the information is not present and TM 9 is not set.

Figure 16:
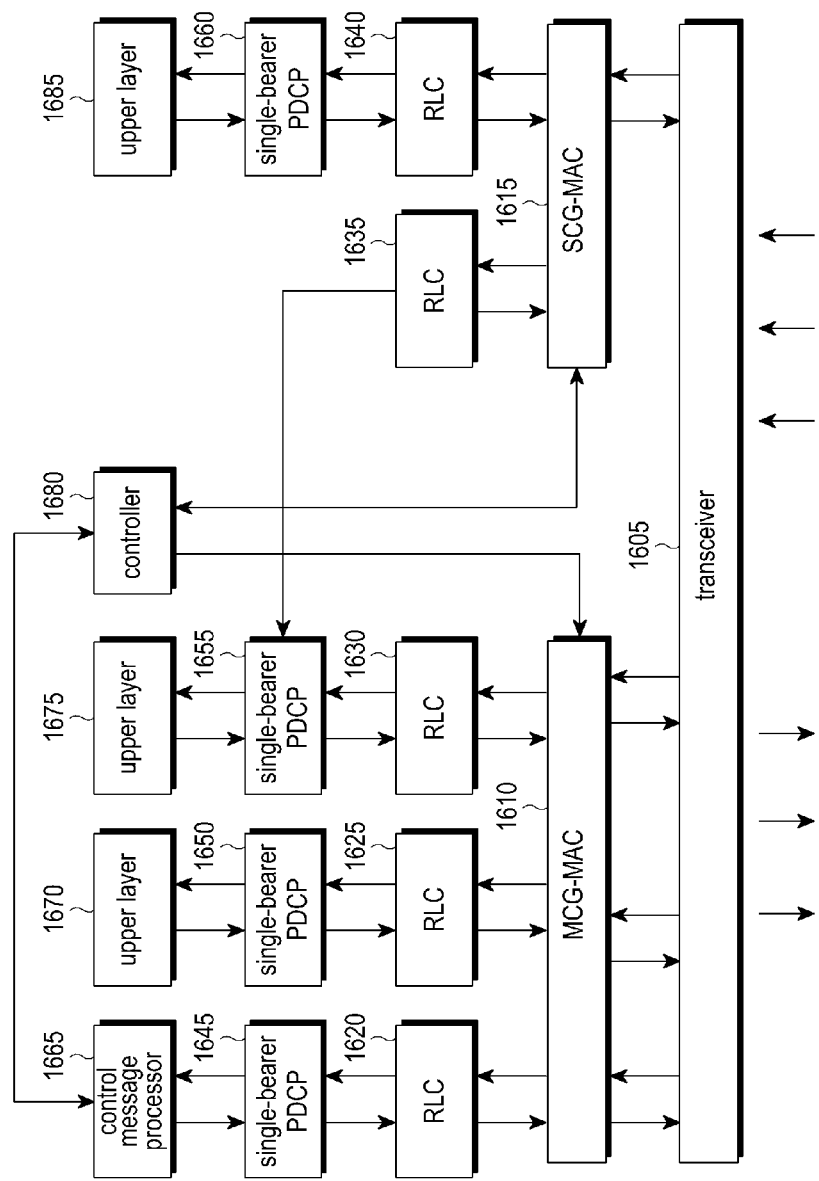
FIG. 16 is a block diagram illustrating a configuration of a UE in an LTE system according to an embodiment of the present disclosure.

FIG. 16 is a block diagram illustrating a configuration of a UE in an LTE system according to an embodiment of the present disclosure.

Referring to FIG. 16, a UE may include a control message processor 1665, various upper layer processors 1670, 1675 and 1685, a controller 1680, an SCG-MAC device 1615, an MCG-MAC device 1610, a transceiver 1605, PDCP devices 1645, 1650, 1655 and 1660, and RLC devices 1620, 1625, 1630, 1635 and 1640.

The transceiver 1605 may receive data and a predetermined control signal over a downlink channel of the serving cell, and transmit data and a predetermined control signal over an uplink channel of the serving cell. If a plurality of serving cells is set, the transceiver 1605 may perform data transmission/reception and control signal transmission/reception through the plurality of serving cells.

The MCG-MAC device 1610 may multiplex the data generated in the RLC devices 1620, 1625, 1630, 1635 and 1640, or may demultiplex the data received from the transceiver 1605 and deliver the demultiplexed data to proper RLC devices 1620, 1625, 1630, 1635 and 1640. The MCG-MAC device 1610 may also process Buffer Status Report (BSR) or Power Headroom Report (PHR) triggered for an MCG.

The control message processor 1665, which is an RRC layer device, may process a control message received from the ENB and take a necessary action. For example, the control message processor 1665 may receive an RRC control message and deliver a variety of configuration information to the controller 1680.

The upper layer processors 1670, 1675 and 1685 may be configured for each service. The upper layer processors 1670, 1675 and 1685 may process the data that is generated in a user service such as FTP or VoIP, and deliver the processed data to the PDCP devices 1645, 1650, 1655 and 1660.

The controller 1680 may check scheduling commands (e.g., uplink grants) that are received through the transceiver 1605, and control the transceiver 1605 and a multiplexer/demultiplexer so that uplink transmission may be performed with proper transmission resources at a proper time. The controller 1680 may perform various control functions for the UE operation shown in FIG. 15.

The PDCP devices 1645, 1650, 1655 and 1660 may be divided into single-bearer PDCP devices 1645, 1650 and 1660, and a multi-bearer PDCP device 1655. The single-bearer PDCP devices 1645, 1650 and 1660 may transmit and receive data through only the MCG or the SCG, and may be connected with one RLC transmission/reception device. The multi-bearer PDCP device 1655 may transmit and receive data through the MCG and the SCG. The RLC devices 1620, 1625, 1630, 1635 and 1640 may perform the operations described FIGS. 14 and 15. The multi-bearer PDCP device 1655 may perform the PDCP operations shown in FIGS. 5 to 7, and the controller 1680 may collectively control various control operations shown in FIGS. 5 to 12. In addition, the controller 1680 may collectively control various control operations shown in FIGS. 18 to 29.

Figure 17:
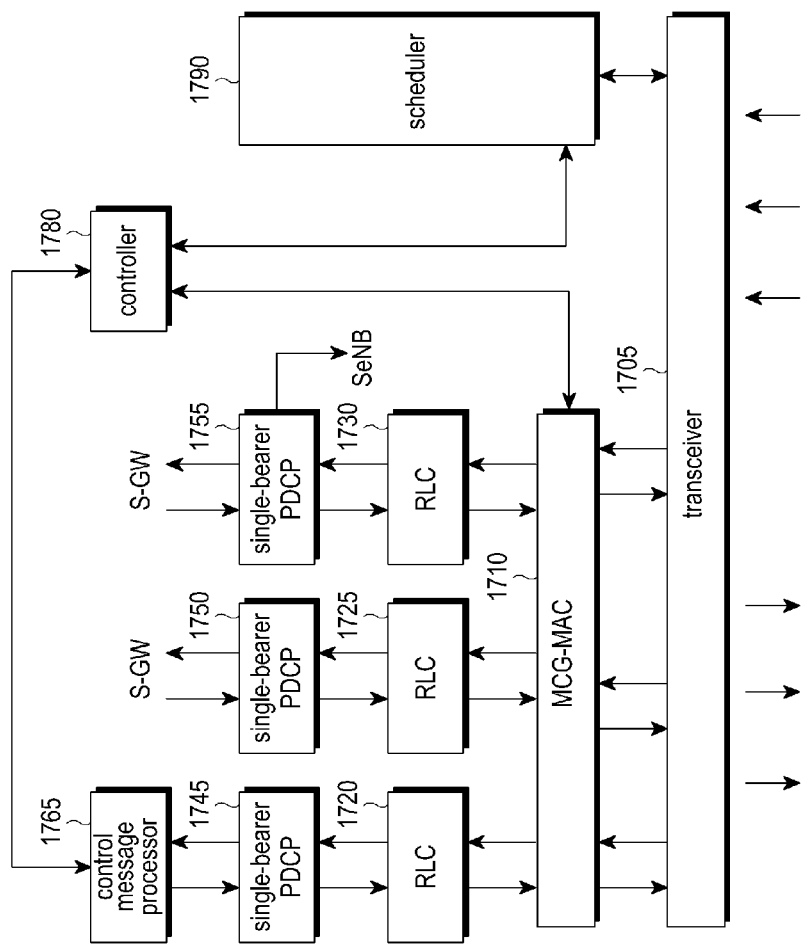
FIG. 17 is a block diagram illustrating a configuration of an ENB in an LTE system according to an embodiment of the present disclosure.

FIG. 17 is a block diagram illustrating a configuration of an ENB in an LTE system according to an embodiment of the present disclosure.

Referring to FIG. 17, an ENB may include a MAC device 1710, a control message processor 1765, a controller 1780, a transceiver 1705, PDCP devices 1745, 1750, and 1755, RLC devices 1720, 1725, and 1730, and a scheduler 1790.

The transceiver 1705 may transmit data and a predetermined control signal using a downlink carrier, and receive data and a predetermined control signal using an uplink carrier. If a plurality of carriers is set, the transceiver 1705 may perform data transmission/reception and control signal transmission/reception using the plurality of carriers.

The MAC device 1710 may multiplex the data generated in the RLC devices 1720, 1725, and 1730, or may demultiplex the data received from the transceiver 1705 and deliver the demultiplexed data to proper RLC devices 1720, 1725, and 1730 or the controller 1780. The control message processor 1765 may process a control message sent by the UE and take a necessary action, or may generate a control message to be sent to the UE, and deliver the control message to the lower layer.

The scheduler 1790 may allocate transmission resources to the UE at a proper time taking into account the UE's buffer status and channel status, and control the transceiver 1705 to process the signal transmitted by the UE or to transmit a signal to the UE.

The PDCP devices 1745, 1750, and 1755 may be divided into single-bearer PDCP devices 1745 and 1750 and a multi-bearer PDCP device 1755. The single-bearer PDCP devices 1745 and 1750 may transmit and receive data through only the MCG or the SCG, and may be connected with one RLC transmission/reception device. The multi-bearer PDCP device 1755 may transmit and receive data through the MCG and the SCG. The multi-bearer PDCP device 1755 may perform the PDCP operations shown in FIGS. 5 to 7, and the controller 1780 may collectively control various control operations shown in FIGS. 5 to 12. In addition, the controller 1780 may collectively control various control operations shown in FIGS. 18, 19, and 21 to 29. The RLC devices 1720, 1725, 1730, 1735, and 1740 may perform the operations shown in FIGS. 14 and 15.

As is apparent from the foregoing description, according to various embodiments of the present disclosure, the transmission/reception speed of the UE may be further improved by aggregating carriers between different ENBs.

In addition, according to various embodiments of the present disclosure, PDCP reordering may be efficiently performed during bearer reconfiguration between a single bearer and a multi-bearer in the communication environment that uses a multi-bearer, like CA.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a user equipment (UE) in a wireless communication system, the method comprising:
    if a packet data convergence Protocol (PDCP) entity is associated with two RLC entities, reordering PDCP protocol data units (PDUs), using a timer associated with reordering;
    processing the reordered PDCP PDUs into one or more PDCP service data units (SDUs); and
    when the timer expires, restarting the timer based on a determination that at least one of the one or more PDCP SDUs is left.

2. The method of claim 1, further comprising:
    receiving, a control message for a reconfiguration, from an evolved node B (eNB); and
    performing, based on the control message, the reconfiguration for associating a PDCP entity which has been associated to one RLC entity, with two RLC entities.

3. The method of claim 1, further comprising:
    discarding at least one PDCP PDU received in duplicate among the PDCP PDUs without processing the at least one PDCP PDU received in duplicate into a PDCP SDU.

4. The method of claim 1, wherein the reordering of the PDCP PDUs is performed based on a count value that is associated with a hyper frame number (HFN) and a PDCP sequence number (SN) of a received packet.

5. The method of claim 4, wherein the one or more PDCP SDUs are delivered to an upper layer in an order of the count value.

6. A method of a user equipment (UE) in a wireless communication system, the method comprising:
    if a packet data convergence protocol (PDCP) entity which has been associated with two RLC entities by a reconfiguration is associated with one RLC entity, reordering PDCP protocol data units (PDUs), using a timer associated with reordering based on a predetermined condition;
    processing the reordered PDCP PDUs into one or more PDCP service data units (SDUs); and
    when the timer expires, restarting the timer based on a determination that at least one of the one or more PDCP SDUs is left.

7. The method of claim 6, further comprising:
receiving a control message for the reconfiguration from an evolved node B (eNB); and
performing the reconfiguration based on the control message.

8. The method of claim 6, further comprising:
processing at least one PDCP PDU received in duplicate among the PDCP PDUs, into a PDCP SDU, and then discarding the at least one PDCP PDU received in duplicate.

9. The method of claim 6, wherein the reordering is performed based on a count value that is associated with a hyper frame number (HFN) and a PDCP sequence number (SN) of a received packet.

10. The method of claim 9, wherein the one or more PDCP SDUs are delivered to an upper layer in an order of the count value.

11. The method of claim 6, wherein the predetermined condition comprises reestablishment of a lower layer.

12. A user equipment (UE) in a wireless communication system, the UE comprising:
a receiver configured to receive data; and
a controller configured to:
process the data into packet data convergence protocol (PDCP) protocol data units (PDUs);
reorder the PDCP PDUs using a timer associated with reordering if a PDCP entity is associated with two RLC entities;
process the reordered PDCP PDUs into one or more PDCP service data units (SDUs); and
when the timer expires, restart the timer based on a determination that at least one of the one or more PDCP SDUs is left.

13. The UE of claim 12, wherein the controller is further configured to receive a control message for a reconfiguration from an evolved node B (eNB), and to perform, based on the control message, the reconfiguration for associating a PDCP entity which has been associated to one RLC entity, with two RLC entities.

14. The UE of claim 12, wherein the controller is further configured to discard at least one PDCP PDU received in duplicate among the PDCP PDUs without processing the at least one PDCP PDU received in duplicate into a PDCP SDU.

15. The UE of claim 12, wherein the controller is further configured to perform the reordering of the PDCP PDUs based on a count value that is associated with a hyper frame number (HFN) and a PDCP sequence number (SN) of a received packet.

16. The UE of claim 15, wherein the controller is further configured to deliver the one or more PDCP SDUs to an upper layer in an order of the count value.

17. A user equipment (UE) in a wireless communication system, the UE comprising:
a receiver configured to receive data; and
a controller configured to:
process the data into packet data convergence protocol (PDCP) protocol data units (PDUs);
reorder the PDCP PDUs, using a timer associated with the reordering of the PDCP PDUs based on a predetermined condition if a PDCP entity which has been associated with two RLC entities by a reconfiguration is associated with one RLC entity;
process the reordered PDCP PDUs into one or more PDCP service data units (SDUs); and
when the timer expires, restart the timer based on a determination that at least one of the one or more PDCP SDUs is left.

18. The UE of claim 17, wherein the controller is further configured to receive a control message for the reconfiguration from an evolved node B (eNB), and to perform the reconfiguration based on the control message.

19. The UE of claim 17, wherein the controller is further configured to process at least one PDCP PDU received in duplicate among the PDCP PDUs, into a PDCP SDU, and then discard the at least one PDCP PDU received in duplicate.

20. The UE of claim 17, wherein the controller is further configured to perform the reordering based on a count value that is associated with a hyper frame number (HFN) and a PDCP sequence number (SN) of a received packet.

21. The UE of claim 20, wherein the controller is further configured to deliver the one or more PDCP SDUs to an upper layer in an order of the count value.

22. The UE of claim 17, wherein the predetermined condition comprises reestablishment of a lower layer.

* * * * *